US012289435B2

United States Patent
Tomizawa et al.

(10) Patent No.: US 12,289,435 B2
(45) Date of Patent: Apr. 29, 2025

(54) DISPLAY DEVICE

(71) Applicant: Japan Display Inc., Tokyo (JP)

(72) Inventors: Kazunari Tomizawa, Tokyo (JP); Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/527,869

(22) Filed: Dec. 4, 2023

(65) Prior Publication Data

US 2024/0187561 A1 Jun. 6, 2024

(30) Foreign Application Priority Data

Dec. 5, 2022 (JP) ................................. 2022-194467

(51) Int. Cl.
*H04N 13/312* (2018.01)

(52) U.S. Cl.
CPC ................................. *H04N 13/312* (2018.05)

(58) Field of Classification Search
CPC .................................................... H04N 13/312
USPC ........................................................... 349/15
See application file for complete search history.

(56) References Cited

U.S. PATENT DOCUMENTS

| | | | |
|---|---|---|---|
| 2006/0098281 A1 | 5/2006 | Fukushima et al. | |
| 2010/0277657 A1 | 11/2010 | Fukushima et al. | |
| 2012/0274667 A1* | 11/2012 | Kuwayama | G09G 5/10 345/87 |
| 2013/0027909 A1* | 1/2013 | Kim | H04N 13/373 362/97.1 |
| 2013/0201424 A1* | 8/2013 | Uchida | G02F 1/133606 349/64 |
| 2017/0264891 A1* | 9/2017 | Iwasaki | H04N 13/373 |
| 2019/0035364 A1* | 1/2019 | Iwasaki | G09G 5/003 |

FOREIGN PATENT DOCUMENTS

JP 3865762 B2 1/2007

* cited by examiner

*Primary Examiner* — Charles S Chang
(74) *Attorney, Agent, or Firm* — K&L Gates LLP

(57) ABSTRACT

A display device includes: a display panel with pixels; a light source with light emission points; an acquirer configured to acquire viewpoint information; and a controller configured to control image display based on the viewpoint information on positions of viewpoints and an arrangement direction of the viewpoints. The controller is configured to drive some or all of pixels positioned on straight lines each connecting a corresponding one of the light emission points to a corresponding one of the viewpoints based on a relative rotation angle between the display panel and the arrangement direction and a relative positional relation between the viewpoints and the light emission points. The light emission points are individually switchable between a turned-on state and a turned-off state. A pitch of the light emission points is smaller than a pitch of light emission points controlled to be turned on when outputting an individual image to each viewpoint.

14 Claims, 38 Drawing Sheets

| RELATIVE ANGLE | 0° | 45° | 90° |
|---|---|---|---|
| HUMAN | HF | HF | HF |
| LIGHT SOURCE CONTROL | EXAMPLE 1 + EXAMPLE 2 OR EXAMPLE 3 + EXAMPLE 4 | EXAMPLE 1 + EXAMPLE 2 OR EXAMPLE 3 + EXAMPLE 4 | EXAMPLE 1 + EXAMPLE 3 OR EXAMPLE 2 + EXAMPLE 4 |
| RELATION BETWEEN OUTPUT AND PERCEPTION (PLAN VIEWPOINT) | | | |
| RELATION BETWEEN OUTPUT AND PERCEPTION (SECTIONAL VIEWPOINT) | | | |

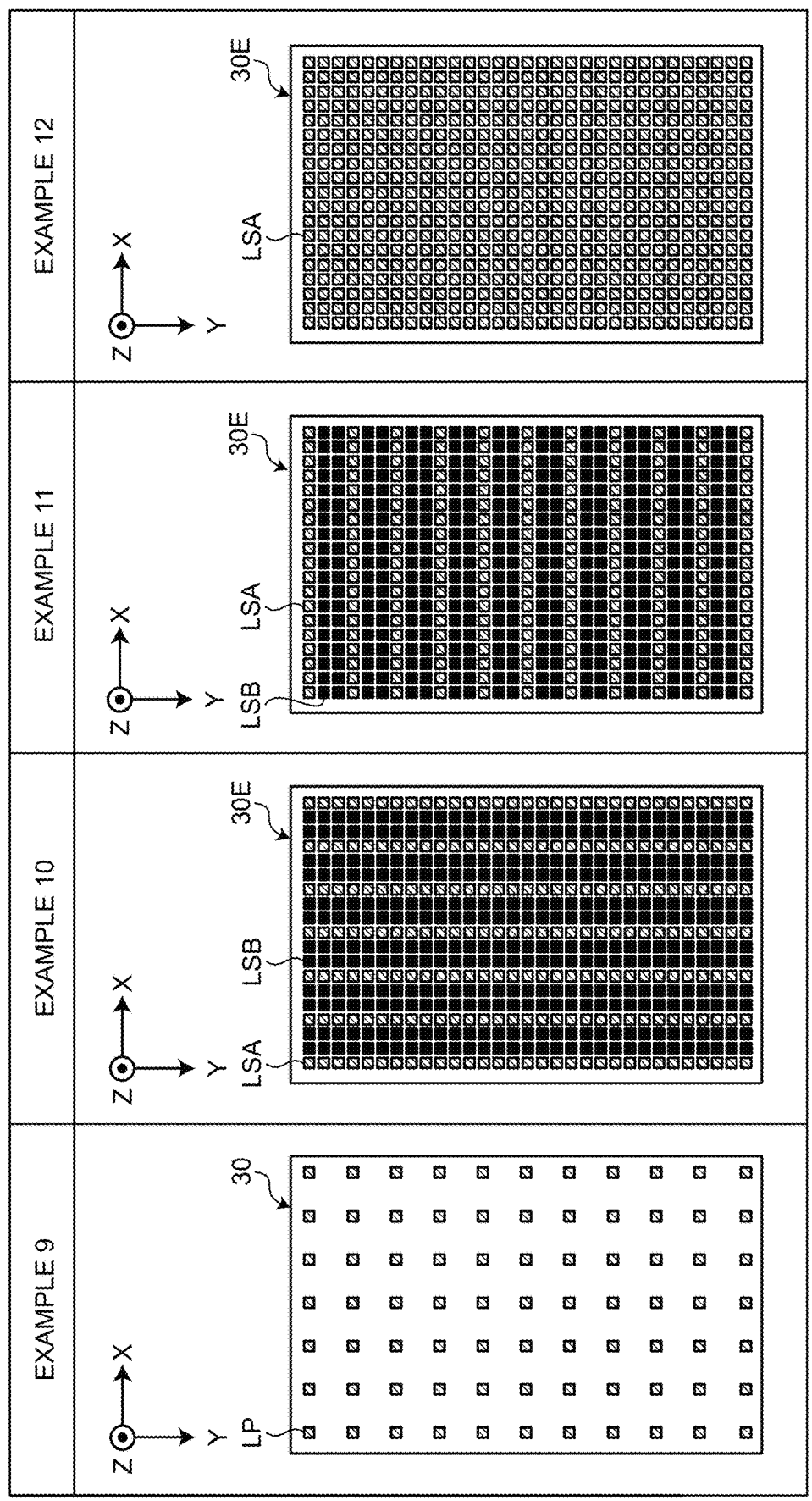

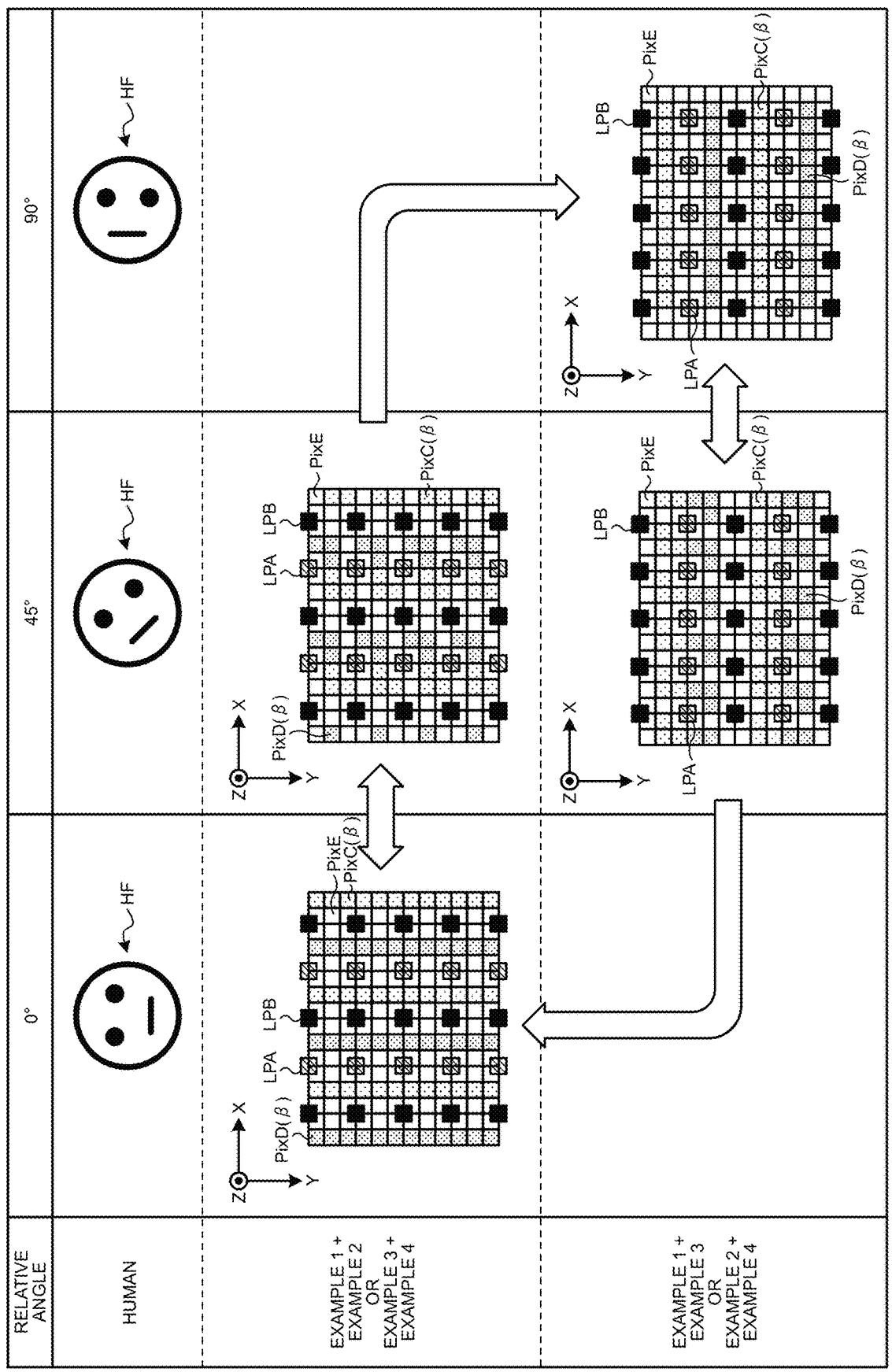

DISPLAY DEVICE

CROSS-REFERENCE TO RELATED APPLICATION

This application claims the benefit of priority from Japanese Patent Application No. 2022-194467 filed on Dec. 5, 2022, the entire contents of which are incorporated herein by reference.

BACKGROUND

1. Technical Field

What is disclosed herein relates to a display device.

2. Description of the Related Art

As described in Japanese Patent No. 3865762, a display device capable of displaying individual images to a plurality of viewpoints by using an image separation body such as a parallax barrier has been known.

An image separation body such as a parallax barrier has a fixed arrangement direction of a plurality of viewpoints to which individual images can be output. However, the relation between the arrangement direction of a plurality of viewpoints and a display device is not necessarily fixed. For example, the relation between a display device included in a portable terminal device such as a smartphone and the arrangement direction of the eyes of a user to which images are to be output from the display device is not fixed. Individual images could not be output to a plurality of viewpoints, depending on the relation between the arrangement direction of the plurality of viewpoints and a display device, with an image separation body such as a parallax barrier.

For the foregoing reasons, there is a need for a display device capable of more flexibly adapting to the relation between the arrangement direction of a plurality of viewpoints and the display device.

SUMMARY

According to an aspect, a display device includes: a liquid crystal display panel provided with a plurality of pixels; a light source provided with a plurality of light emission points and configured to emit light to the plurality of pixels; an acquirer configured to acquire viewpoint information of a user viewing the liquid crystal display panel; and a controller configured to control image display on a basis of the viewpoint information. The viewpoint information includes information related to positions of a plurality of viewpoints and information indicating an arrangement direction of the plurality of viewpoints. The controller is configured to perform display drive of some or all of pixels positioned on straight lines each connecting a corresponding one of the light emission points to a corresponding one of the viewpoints on a basis of a relative rotation angle between the liquid crystal display panel and the arrangement direction and a relative positional relation between the viewpoints and the light emission points, the some or all of pixels included in the plurality of pixels. The plurality of light emission points are individually switchable between a turned-on state and a turned-off state. A first pitch of the plurality of light emission points arranged in a predetermined direction is smaller than a second pitch of some of the light emission points in the predetermined direction, the some of the light emission points controlled to be turned on when outputting an individual image to each of the plurality of viewpoints

BRIEF DESCRIPTION OF THE DRAWINGS

FIG. 17 is a schematic diagram illustrating an outline of drive control of the pixel PixU in accordance with the position of intersection between the pixel PixU and the emission line of light from a light emission point to a viewpoint;

FIG. 29 is a schematic diagram illustrating an example of the relation between a relative angle rot and the feasibility of individual image output to a plurality of viewpoints when the disposition control described with reference to FIGS. 10 and 11 is reflected in a case in which the relation between the pitch of pixels and the pitch of light emission points that a light source has is 1:2 in both X and Y directions;

FIG. 33 is an explanatory diagram illustrating the principle of drive control of pixels Pix when display output control with virtual light emission points set is applied in display panel operation control in which light source control to generate a column of turned-on points or a row of turned-on points is applied to the light source;

FIG. 34 is a schematic diagram illustrating an example in which both the control to turn on a larger number of light emission points in a range in which it is possible to maintain a visually recognizable state of an individual image at each of a plurality of viewpoints and the display output control with virtual light emission points set, described with reference to FIG. 22, are applied;

FIG. 37 is an explanatory diagram for description of an example in which the pitch of light emission points turned on for visual recognition of an individual image at each of a plurality of viewpoints is three times larger than the pitch of provided light emission points; and FIG. 38 is a schematic view illustrating an exemplary application of hysteresis control.

DETAILED DESCRIPTION

An embodiment of the present disclosure is described below with reference to the drawings. What is disclosed herein is only an example, and any modifications that can be easily conceived by those skilled in the art while maintaining the main purpose of the invention are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

Figure 1:
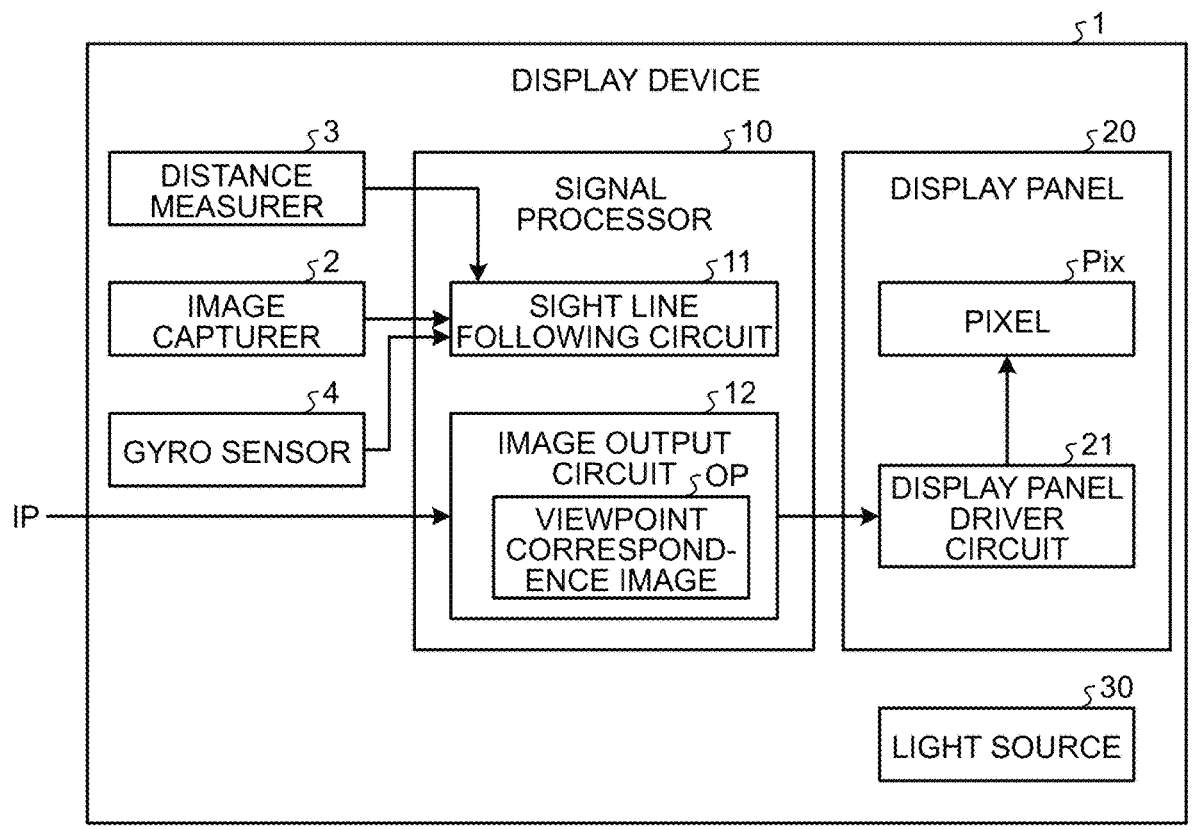
FIG. 1 is a block diagram illustrating a main configuration of a display device.

FIG. 1 is a block diagram illustrating a main configuration of a display device 1. The display device 1 includes an image capturer 2, a distance measurer 3, a signal processor 10, a display panel 20, and a light source 30. The display device 1 is an information processing device (information processing terminal device) such as a smartphone having an image capturing function achieved by the image capturer 2, a distance measurement function achieved by the distance measurer 3, and an image display function achieved by the signal processor 10, the display panel 20, and the light source 30.

The image capturer 2 captures an image. Specifically, the image capturer 2 includes an image capturing element such as a complementary metal oxide semiconductor (CMOS) image sensor. The image capturer 2 generates image data based on an electric signal output from the image capturing element.

The distance measurer 3 measures the distance between the display device 1 and a target to be image-captured that the image capturer 2 faces. Specifically, the distance measurer 3 includes, for example, a light emitting device and a light detector that constitute a time-of-flight (ToF) sensor. The distance measurer 3 including such a ToF sensor measures the distance based on the time difference between a light emission timing at which the light emitting device emits light and a sensing timing at which a laser beam emitted by the light emitting device and reflected by the target to be image-captured is sensed by the light detector. A specific mechanism with which the distance measurer 3 measures distance is not limited to that described above but may be a mechanism using, for example, what is called contrast auto focus (AF) provided in a camera. In the mechanism, a distance determined as the distance of focusing on an image by the AF function of the image capturer 2 is obtained as the distance measured by the distance measurer 3. In the embodiment, the image capturer 2 and the distance measurer 3 cooperatively function as an acquirer configured to acquire information indicating the positions of two viewpoints (a first viewpoint E1 (right eye) and a second viewpoint E2 (left eye) to be described later) of a user facing the display panel 20.

The image capturer 2 is provided to capture an image of a user viewing an image display surface of the display panel 20. The distance measurer 3 is provided to measure the distance between the image display surface of the display panel 20 and the user viewing the image display surface. Specifically, the image capturer 2 and the distance measurer 3 are disposed on, for example, one surface side of a housing of the display device 1 on which the image display surface of the display panel 20 is exposed.

The signal processor 10 includes a sight line following circuit 11 and an image output circuit 12. The sight line following circuit 11 acquires information related to the position of a viewpoint of the user relative to the display panel 20 based on output from the image capturer 2 and the distance measurer 3. Details of the viewpoint position information will be described later.

The image output circuit 12 outputs, to the display panel 20, image data corresponding to the position of the viewpoint based on the viewpoint position information acquired by the sight line following circuit 11. The image data output from the image output circuit 12 is, for example, image data based on an image signal IP input to the display device 1 from external information processing, but may be image data stored in advance in a storage device included in the display device 1. The image output circuit 12 generates a viewpoint correspondence image OP from the image data based on the image signal IP or from the image data stored in advance in the storage device included in the display device 1. The image output circuit 12 outputs, to the display panel 20, data of images corresponding to the viewpoint positions acquired by the sight line following circuit 11, in the viewpoint correspondence image OP.

Figure 2:
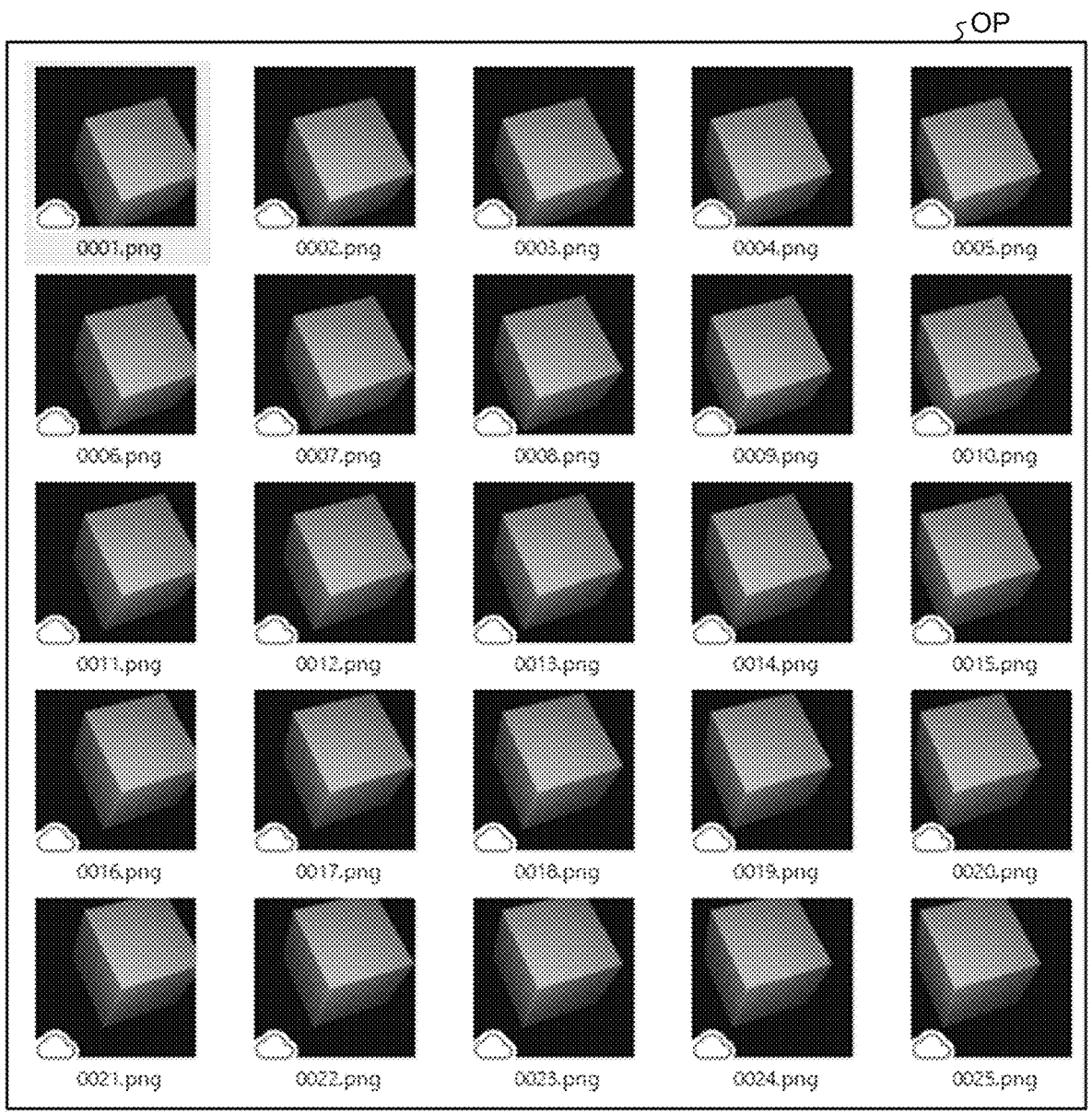
FIG. 2 illustrates examples of a viewpoint correspondence image.

FIG. 2 illustrates examples of the viewpoint correspondence image OP. As illustrated in FIG. 2, the viewpoint correspondence image OP includes a plurality of pieces of image data. The pieces of image data included in the viewpoint correspondence image OP correspond to different viewpoints (more specifically, viewpoints corresponding to one eye of a viewer). FIG. 2 exemplarily illustrates 25 pieces of data in the portable network graphics (PNG) format with sequential file names "0001" to "0025", but the file names, the format, and the number of images included in the viewpoint correspondence image OP are not limiting examples but are changeable as appropriate. The image output circuit 12 outputs, to the display panel 20, the data of images corresponding to the viewpoint positions acquired by the sight line following circuit 11, in image data, in the viewpoint correspondence image OP including a plurality of images as exemplarily illustrated in FIG. 2.

As illustrated in FIG. 1, the display panel 20 includes a display panel driver circuit 21. The display panel driver circuit 21 includes a circuit such as a display driver integrated circuit (DDIC) configured to perform various kinds of processing related to image display on the display panel 20. The display panel driver circuit 21 drives a plurality of pixels Pix included in the display panel 20 in accordance with the image data output from the image output circuit 12.

Figure 3:
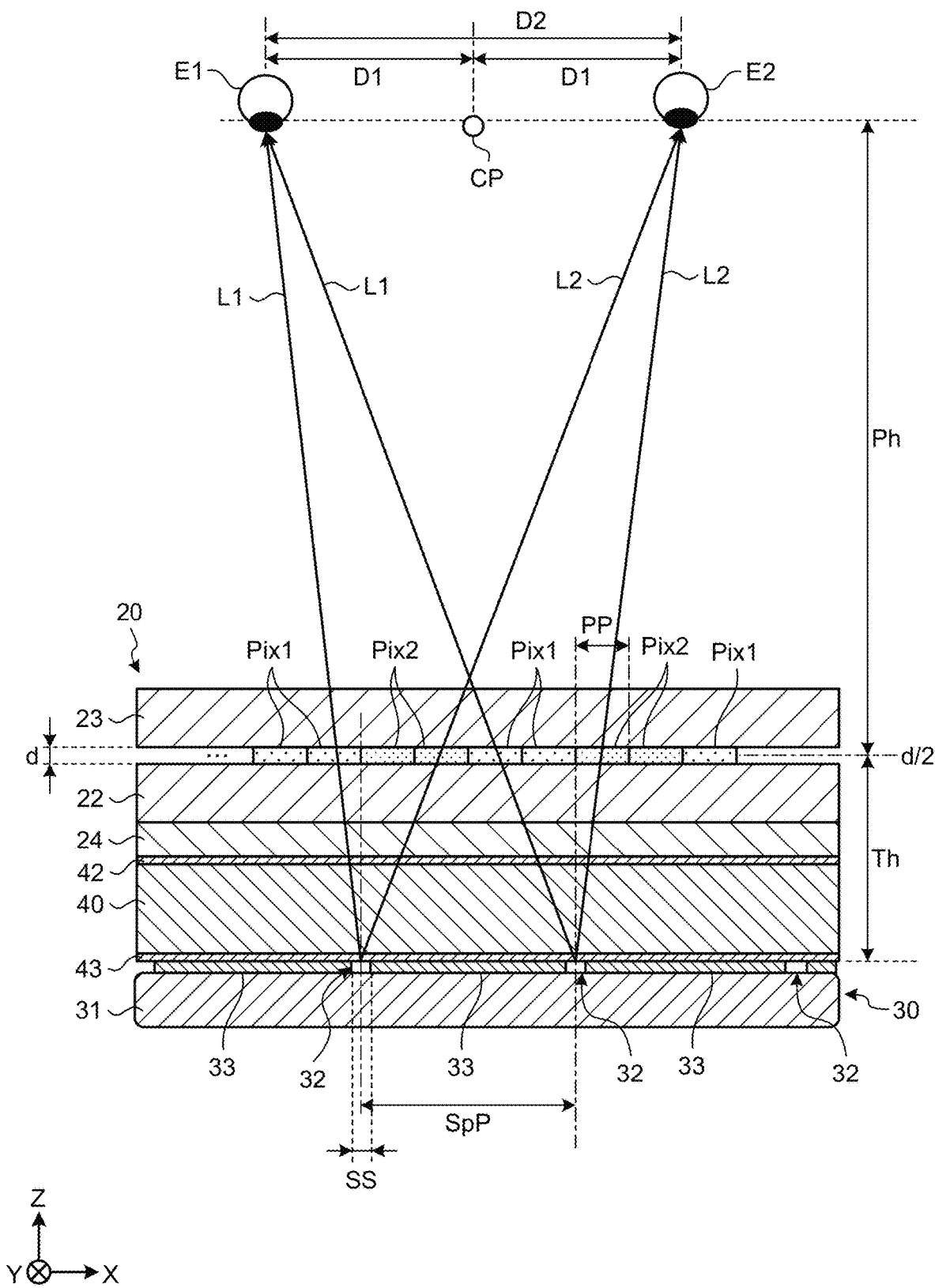
FIG. 3 is a schematic diagram illustrating a multilayered structure of a display panel.

FIG. 3 is a schematic diagram illustrating a multilayered structure of the display panel 20. As illustrated in FIG. 3, the display panel 20 includes a first substrate 22 and a second substrate 23. The first substrate 22 and the second substrate 23 are light-transmitting substrates such as glass substrates. The first substrate 22 and the second substrate 23 are stacked with a liquid crystal layer interposed therebetween. The liquid crystal layer is sealed between the first substrate 22 and the second substrate 23. The display panel 20 is what is called a liquid crystal display panel.

Hereinafter, a direction in which the first substrate 22 and the second substrate 23 face each other is defined as a Z direction. In addition, one of two directions orthogonal to the Z direction is defined as an X direction, and the other direction is defined as a Y direction. The X direction and the Y direction are orthogonal to each other.

A multilayered structure is formed on a surface of the first substrate 22 on the second substrate 23 side. The multilayered structure is formed with, for example, a plurality of layers such as a first electrode layer in which a plurality of pixel electrodes are formed, a second electrode layer in which a common electrode provided with a reference potential for the pixels Pix is formed, a circuit formation layer in which a switching element for individually transmitting a signal to each pixel electrode, a wiring coupled to the switching element, and the like are formed, and insulating layers insulating these layers from one another. The pixel electrodes are individually provided at sub pixels included in each pixel Pix. Each pixel Pix is driven under control of the display panel driver circuit 21 and controlled so that the orientation of the liquid crystal molecule overlapping the position of each corresponding pixel electrode at a plan viewpoint twists in accordance with the potential difference the common electrode and the pixel electrode. The plan viewpoint is the viewpoint of a front view of a plane (X-Y plane) orthogonal to the Z direction.

As illustrated in, for example, FIG. 16 to be described later, each pixel Pix includes a plurality of sub pixels. For example, each pixel Pix includes a sub pixel provided with a color filter that transmits light in red (R), a sub pixel provided with a color filter that transmits light in green (G), and a sub pixel provided with a color filter that transmits light in blue (B). It is not essential that each pixel Pix includes all of these sub pixels, and for example, one of two adjacent pixels Pix may include sub pixels in some colors among sub pixels in a plurality of colors, and the other pixel may include any other sub pixel. Some or all pixels Pix may include a sub pixel provided with a color filter that transmits light in a color different from the colors exemplarily described above. A sub pixel provided with a colorless filter or not provided with a color filter may be additionally provided, and light from this sub pixel is perceived as, for example, white (W). When each pixel Pix includes the above-described three sub pixels, the shape of the pixel Pix is preferably a square (with the same length in the X direction and the Y direction) but may be a rectangle in which either sides in the X direction or sides in the Y direction are longer than the others.

The second substrate 23 is provided with, for example, the color filters individually provided for the sub pixels included in each pixel Pix, and a black matrix that functions as a partition for the color filters of the sub pixels. The common electrode may be provided at the second substrate 23 instead of the first substrate 22.

A pixel pitch PP illustrated in FIG. 3 is the width of a second pixel Pix2 in the X direction. Although a first pixel Pix1 and the second pixel Pix2 are differently illustrated in FIG. 3, the first pixel Pix1 and the second pixel Pix2 are pixels Pix having the same configuration with no difference therebetween. Thus, the width of each pixel Pix in the X direction is the pixel pitch PP. Precisely, the pixel pitch PP in the X-direction is the distance between the X-directional center line of one side of the black matrix enclosing one pixel Pix and the X-directional center point of the other side thereof, wherein the one side is positioned on one end side of the one pixel Pix in the X direction, the other side is positioned on the other end side of the one pixel Pix in the X direction. Alternatively, the pixel pitch may be the center-to-center distance between the sub pixels of the same color in pixels adjacent to each other when viewed in the X direction.

The display panel 20 faces the light source 30 through a polarization layer 24 and a spacer 40. The polarization layer 24 is provided on the first substrate 22 side (display panel back surface side) of the display panel 20. The spacer 40 is a plate light-transmitting member disposed to face the first substrate 22 with the polarization layer 24 interposed therebetween, and is made of, for example, glass. A bonding layer 42 is interposed between the spacer 40 and the polarization layer 24. The bonding layer 42 bonds the polarization layer 24 to the spacer 40. When a support member for holding the interval between the light source 30 and the polarization layer 24 can be provided, a space layer may be provided therebetween.

As illustrated in, for example, FIG. 3, the light source 30 includes a surface light source 31, light emission points 32, and a light-shielding member 33. The surface light source 31 functions as a surface light source that emits light from at least a surface on the display panel 20 side. As a specific configuration, the surface light source 31 includes a light guiding plate facing the display panel 20 in the Z direction, and a light source element (for example, a light emitting diode (LED)) configured to emit light to the light guiding plate in a direction orthogonal to the Z direction. Disposition of the surface light source 31 illustrated in FIG. 3 indicates the disposition of the light guiding plate, and illustration of the light source element is omitted. The light emission points 32 are holes provided in the light-shielding member 33. The light-shielding member 33 covers the entire surface of the surface light source 31 on the spacer 40 side except for places at which the light emission points 32 are formed. A bonding layer 43 is interposed between the light-shielding member 33 and the spacer 40. The bonding layer 43 bonds the polarization layer 24 to the spacer 40. The bonding layers 42 and 43 are double-sided adhesive light-transmitting functional films such as optical clear adhesive (OCA). The light source 30 emits light generated by the surface light source 31 from the light emission points 32 to the display panel 20.

A light emission point pitch SpP illustrated in FIG. 3 is the interval between the X-directional center lines of light emission points 32 adjacent to each other in the X direction. The light emission point pitch SpP is 4n or 6n times longer than the pixel pitch PP. The number n is a natural number.

The number n is, for example, 1 but may be equal to or larger than 2. FIG. 3 exemplarily illustrates a case in which the light emission point pitch SpP is four times longer than the pixel pitch PP. An opening diameter SS illustrated in FIG. 3 is the opening diameter of each light emission point 32 at the plan viewpoint. The opening diameter SS is equal to or shorter than the pixel pitch PP. More specifically, the planar shape of each light emission point 32 is preferably the same as the shape of each pixel Pix or a similar shape smaller than each pixel Pix (refer to FIG. 11, for example).

As described above, the image output circuit 12 outputs, to the display panel 20, the image data corresponding to the viewpoint position acquired by the sight line following circuit 11 in the viewpoint correspondence image OP. Hereinafter, unless otherwise stated, an image means an image displayed on the display panel 20 in accordance with the image data output from the image output circuit 12. The display panel 20 performs display corresponding to the image data. Thus, the display panel 20 displays an image corresponding to the viewpoint position acquired by the sight line following circuit 11. FIG. 3 schematically illustrates the display panel 20 in a state in which images corresponding to the first viewpoint E1 and the second viewpoint E2 are displayed. The first pixel Pix1 is a pixel Pix controlled to display the image corresponding to the first viewpoint E1. The second pixel Pix2 is a pixel Pix controlled to display the image corresponding to the second viewpoint E2.

The first viewpoint E1 corresponds to the right eye of a user. The second viewpoint E2 corresponds to the left eye of the user. A middle point CP is the middle point of a straight line between the first viewpoint E1 and the second viewpoint E2. The position of the middle point CP typically corresponds to the position of the nose of the user in a direction in which the first viewpoint E1 and the second viewpoint E2 are arranged. FIG. 3 illustrates a case in which the first viewpoint E1 and the second viewpoint E2 are arranged in the X direction. Assume that the X-directional distance between the first viewpoint E1 and the middle point CP, and the X-directional distance between the second viewpoint E2 and the middle point CP are each a distance D1, and the X-directional distance between the first viewpoint E1 and the second viewpoint E2 is a distance D2. In this case, the distance D2 is two times longer than the distance D1.

Coordinates indicating the position of the middle point CP with respect to a predetermined origin of the display panel 20 can be expressed as (pos_x, pos_y, pos_h). The coordinate pos_x is the coordinate of the middle point CP in the X direction. The coordinate pox y is the Y-directional coordinate of the middle point CP. The coordinate pox h is the Z-directional position of the middle point CP. The coordinates in the X and Y directions of the predetermined origin of the display panel 20 may correspond to, for example, the position of one of the four apexes of a display region that is rectangular at the plan viewpoint and includes the pixels Pix disposed in the display panel 20. Alternatively, the origin may be the center of a display region of the display panel 20. The Z-directional position of the predetermined origin of the display panel 20 may correspond to the position on the Z-directional center line of a pixel Pix (for example, the first pixel Pix1 or the second pixel Pix2 illustrated in FIG. 3). Specifically, the Z-directional center line of each pixel Pix is the Z-directional center line of the liquid crystal layer sealed between the first substrate 22 and the second substrate 23 and is set preferably, for example, at a height position of d/2 when d represents a cell gap of the display panel 20. The position of the predetermined origin of the display panel 20 is not limited thereto and may be arbitrary position. Hereinafter, unless otherwise stated, the term "origin" means the predetermined origin of the display panel 20.

The sight line following circuit 11 determines the positions of the two eyes (right and left eyes) of the user in an image captured by the image capturer 2. The determination is performed based on, for example, pattern matching, but the present disclosure is not limited thereto and the determination may be performed based on, for example, image identification using machine learning or the like. Information indicating the relation between a position in the image capturing area of the captured image and coordinates in the X and Y directions is held by the signal processor 10 in advance and prepared so that the information can be referred by the sight line following circuit 11. The sight line following circuit 11 sets, as the middle point CP, the middle point between the right and left eyes in the image captured by the image capturer 2 and determines the coordinates of the middle point CP in the X and Y directions. Such a method of determining the position of the middle point CP is merely exemplary, the present disclosure is not limited thereto, and the method is changeable as appropriate. For example, the sight line following circuit 11 may determine the middle point CP based on the positional relation between the positions of the two eyes (right and left eyes) of the user included in the image captured by the image capturer 2 and the position of the nose of the user. The sight line following circuit 11 acquires, as the value of pos_h, the value of the distance measured by the distance measurer 3. The sight line following circuit 11 determines, as the middle point CP, the middle point between the right and left eyes in the image captured by the image capturer 2 and sets the Z-directional position of the middle point CP as pos_h. In this manner, the sight line following circuit 11 derives the viewpoint position information.

The light emitted from each of the emission points 32 reaches the first and second viewpoints E1 and E2. The first pixel Pix1 is positioned on an emission line L1 of the light from each light emission point 32 to the first viewpoint E1. The second pixel Pix2 is positioned on an emission line L2 of the light from each light emission point 32 to the second viewpoint E2. An image output by the first pixel Pix1 and an image output by the second pixel Pix2 are different from each other. The image output by the first pixel Pix1 corresponds to the position of the first viewpoint E1. The image output by the second pixel Pix2 corresponds to the position of the second viewpoint E2. More specifically, for example, the image of 0014.png in FIG. 2 is employed as a right-eye viewpoint image, the image of 0012.png is employed as a left-eye viewpoint image, and these images are combined by the signal processor and displayed as one image (stereoscopic display image). More specifically, for example, on condition that a stereoscopic display image, the image 0014.png, and the image 0012.png have the same number of pixels, when a left-eye image, a left-eye image, a right-eye image, and a right-eye image need to be sequentially displayed at pixels (n, m+1) (this notation means the (m+1)-th pixel on the n-th row; the same applies in the rest of this paragraph), (n, m+2), (n, m+3), (n, m+4) of a pixel row in the stereoscopic display image, pixels (signals) corresponding to (n, m+1) and (n, m+2) of the stereoscopic display image uses pixel signals corresponding to (n, m+1) and (n, m+2) from the image 0012.png as the left-eye image. Similarly, pixels (signals) corresponding to (n, m+3) and (n, m+4) of the stereoscopic display image uses pixel signals corresponding to (n, m+3) and (n, m+4) from the image 0014.png as a right-eye image. There may be a pixel Pix that does not need to display any images, depending on the relation between the viewpoint position of the user and each light source (light emission point 32). In such a case, the pixel Pix displays an image having the lowest luminance (for example, black image). The image output circuit 12 outputs image data including image data corresponding to a plurality of viewpoints (for example, the first viewpoint E1 and the second viewpoint E2) to the display panel 20 so that such a mixed image is displayed.

The Z-directional distance between the Z-directional center line of each pixel Pix and the middle point CP can be expressed as a distance Ph. The magnitude of the distance Ph corresponds to the magnitude of the value of pos_h described above. The Z-directional distance between the Z-directional center line of each pixel Pix and the start point of light emission from the light emission points 32 can be expressed as a distance Th. The distance Th is significantly shorter than the distance Ph. Thus, the Z-directional center line of each pixel Pix may be defined on the same plane as the pixel electrodes or may be defined on the same plane as the back or front surface of the second substrate 23 or the front surface of a cover glass provided on the display panel 20. In the embodiment, the Z-directional position of the emission start point of the light from the light emission point 32 is on the boundary line between the light-shielding member 33 and the bonding layer 43.

Figure 4:
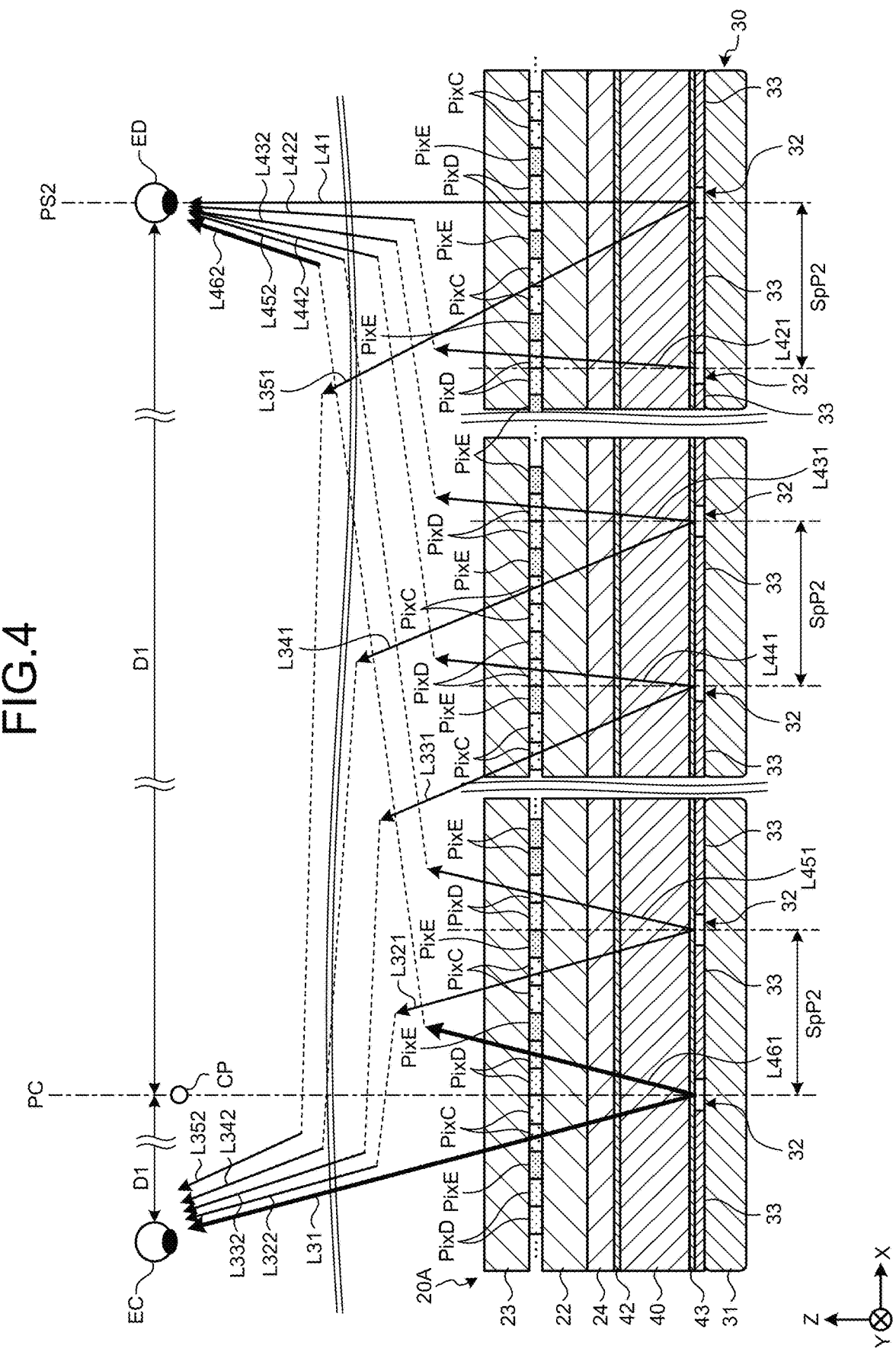
FIG. 4 is a sectional view illustrating an example in which a light emission point pitch is six times longer than a pixel pitch.

The following describes, with reference to FIG. 4, the relation between the light emission point pitch (for example, the light emission point pitch SpP or the light emission point pitch SpP2) of the light emission points 32 adjacent to each other in the X direction and the pitch (pixel pitch PP) of the pixels Pix arranged in the X direction, and the relation between the light emission point pitch and light emitted from the light emission points 32 to the respective viewpoints. FIG. 4 is a sectional view illustrating a section of a display panel 20A along a plane (X-Z plane) orthogonal to the Y direction like the display panel 20 in FIG. 3. The display panel 20 illustrated in FIG. 1 may be the display panel 20A illustrated in FIG. 4 or the following diagrams.

FIG. 4 is a sectional view illustrating an example in which the light emission point pitch SpP2 is six times longer than the pixel pitch PP unlike the light emission point pitch SpP illustrated in FIG. 3. In FIG. 4 and other drawings to be referred in description of the embodiment, an emission line L(m) 1 and an emission line L(m) 2 coupled to each other through a dashed line constitute one emission line of light in reality. For example, an emission line L321 is part of the emission line L(m) 1 in the case of m=32 and indicates the emission line of light just having emitted from one light emission point 32. An emission line L322 is part of the emission line L(m) 2 in the case of m=32 and indicates that the emission line is reaching a first viewpoint EC. The distance between the display panel 20 and a viewpoint is significantly longer than the pixel pitch PP and the like, and the illustration manner applied in the following description is a way of illustrating their relation in one diagram. In FIG. 4, m is a natural number of 32 to 35 or a natural number of 42 to 45. The emission line of light when m is a natural number of 32 to 35 and an emission line L31 are each the emission line of light passing through a first pixel PixC and reaching the first viewpoint EC. The emission line of light when m is a natural number of 42 to 45 and an emission line L41 are each the emission line of light passing through a second pixel PixD and reaching a second viewpoint ED. In FIG. 4, a line extending in the Z direction and passing through the second viewpoint ED is illustrated as a dashed and single-dotted line PS2.

A first viewpoint EC is one of the first viewpoint E1 and the second viewpoint E2 (refer to FIG. 3). The second viewpoint ED is the other of the first viewpoint E1 and second viewpoint E2. When the first viewpoint EC is the first viewpoint E1, the first pixel PixC is the first pixel Pix1 (refer to FIG. 3). When the second viewpoint ED is the second viewpoint E2, the second pixel PixD is the second pixel Pix2 (refer to FIG. 3).

As illustrated in FIG. 4, the display panel 20A has a configuration in which six pixels Pix are arranged in the light emission point pitch SpP2 that is the interval between the X-directional center lines of two light emission points 32 adjacent to each other in the X direction. At the plan viewpoint, the X-directional positions of the X-directional center lines of two light emission points 32 overlap the X-directional position of the boundary line between two pixels Pix adjacent to each other in the X direction.

For example, as illustrated in FIG. 4, two pixels Pix out of the six pixels Pix are controlled as the first pixels PixC. Other two pixels Pix out of the six pixels Pix are controlled as the second pixels PixD. Pixels Pix that are neither the first pixels PixC nor the second pixels PixD included in the six pixels Pix are controlled as third pixels PixE. The third pixel PixE is a pixel Pix that is set so as to have the lowest degree of light transmission (for example, black display).

As illustrated with the emission line L41, the emission line of light reaching the second viewpoint ED through a second pixel PixD opposite to the second viewpoint ED in the Z direction extends in the Z direction. In other words, the emission line of light from a light emission point 32 opposite to the second viewpoint ED in the Z direction extends in the Z direction. In FIG. 4, a line extending in the Z direction and passing through the second viewpoint ED is illustrated as a dashed and single-dotted line PS2. When the first light emission point 32 that emits light of the emission line L41 is assumed as a reference point, light reaching the second viewpoint ED from a second light emission point 32 at a position separated in the X direction from the first light emission point 32 has an emission line at a larger tilt angle relative to the Z direction as the X-directional distance from the first light emission point 32 is longer, as illustrated with the emission lines L42, L43, L44, L45, and L46. Among the plurality of pixels Pix, pixels Pix to be controlled as second pixels PixD are determined based on such emission lines of light. Similarly, as indicated by the relation between the emission line L31, L32, L33, L34, L35, or L36 and the corresponding first pixel PixC, among the plurality of pixels Pix, pixels Pix to be controlled as first pixels PixC are determined based on the emission line of light emitted from the light emission points 32 and reaching the first viewpoint EC.

Depending on the difference between the tilt angles of the emission lines L42, L43, L44, L45, and L46 relative to the Z direction, there are places where the disposition of every two pixels Pix in the X direction is not necessarily appropriate as the X-directional disposition of pixels Pix to be controlled as second pixels PixD. Similarly, there are places where the disposition at equal intervals in the X direction is not necessarily appropriate as the X-directional disposition of pixels Pix to be controlled as first pixels PixC. In accordance with such disposition control of first pixels PixC and second pixels PixD, third pixels PixE may be disposed as appropriate or the degree of light transmission may be controlled on a sub pixel basis as described later with reference to FIG. 17 and other drawings. With such disposition control, it is possible to more reliably reduce the probability of generating crosstalk.

In FIG. 4, the middle point CP is positioned on a dashed and single-dotted line PC overlapping the X-directional center line of one light emission point 32, but it is not essential that the middle point CP is a position overlapping the X-directional center line of the light emission point 32. The correspondence relation between the following: light from each light emission point 32; the positional relation of a first viewpoint EC and a second viewpoint ED in accordance with the position of the middle point CP; and control of each pixel Pix as a first pixel PixC or a second pixel PixD is as described above with reference to FIG. 4 irrespective of the position of the middle point CP.

Figure 5:
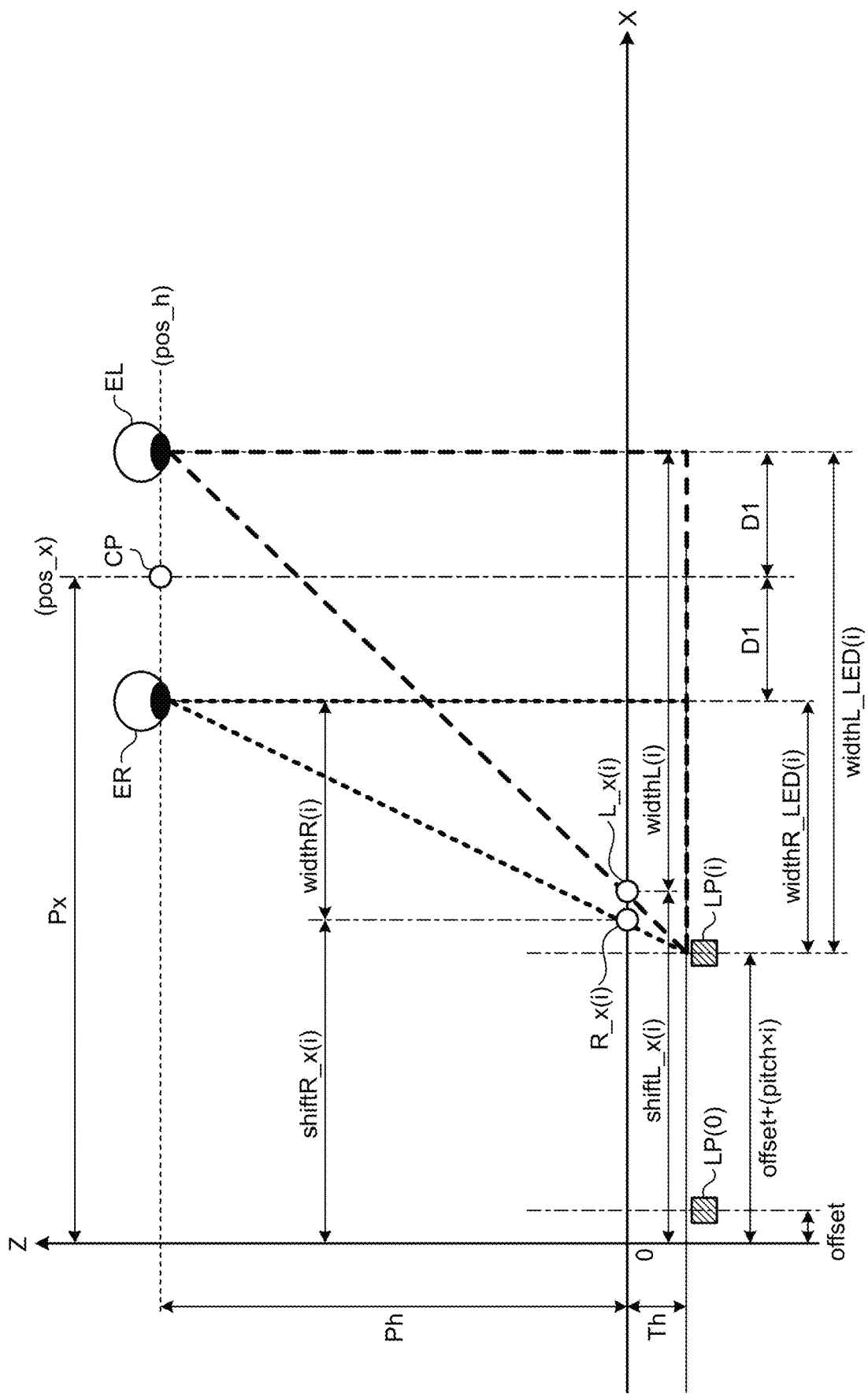
FIG. 5 is a diagram illustrating various parameters related to determination of the X-directional coordinate of a pixel positioned on the emission line of light between a light emission point of light from the (i+1)-th light source with respect to the origin in the X direction and a viewpoint.

The following describes the basic principle of drive control of pixels Pix in accordance with the relative positional relation between a viewpoint and the emission start point of light with reference to FIG. 5.

FIG. 5 is a diagram illustrating various parameters related to determination of the X-directional coordinate R_x(i) or L_x(i) of a pixel Pix positioned on the emission line extending from a light emission point LP(i) that is the (i+1)-th light emission point counted from the origin in the X direction to the corresponding one of viewpoints ER and EL.

A light emission point LP(0) illustrated in FIG. 5 indicates the emission start point of light from a light emission point disposed at the closest (first) position to the origin in the X direction. The light emission point LP(i) indicates the emission start point of light from a light emission point disposed at the (i+1)-th closest position to the origin in the X direction. For example, in a case of i=1, a light emission point LP(1) indicates the emission start point of light from a light emission point disposed at the closest position next to the light emission point LP(0) to the origin in the X direction, which means that the light emission point LP(1) indicates the secondary closest position. Thus, i is an integer equal to or larger than zero.

In FIG. 5, the X-directional distance between the origin and the light emission point LP(0) is denoted by "offset". The X-directional distance between the origin and the light emission point LP(i) can be expressed as "offset+(pitch×i)". The magnitude of the value of "pitch" corresponds to the magnitude of the light emission point pitch SpP or the magnitude of the light emission point pitch SpP2 described above. The values "offset" and "offset+(pitch×i)" are values determined in advance in accordance with the design of the display device 1 and are parameters that can be referred in calculation related to determination of the X-directional coordinates R_x(i) and L_x(i).

The magnitude of the distance Ph, which is described above with reference to FIG. 3 and illustrated in FIG. 5, corresponds to the magnitude of the value of pos_h. The magnitude of a distance Px illustrated in FIG. 5 corresponds to the magnitude of the value of pos_x. The Z-directional distance between the origin and each of the light emission point LP(0) and the light emission point LP(i) is the distance Th described above. The values of pos_h and pos_x can be acquired by the image capturer 2 and the distance measurer 3.

Hereinafter, the X-directional distance between the origin and the coordinate R_x(i) is denoted by shiftR_x(i). The X-directional distance between the coordinate R_x(i) and the viewpoint ER is denoted by widthR(i). The X-directional distance between the light emission point LP(i) and the viewpoint ER is denoted by widthR_LED(i). The viewpoint ER is the right-eye viewpoint of the user and is one of the first viewpoint E1 or EC and the second viewpoint E2 or ED.

The X-directional distance between the origin and the coordinate L_x(i) is denoted by shiftL_x(i). The X-directional distance between the coordinate L_x(i) and the viewpoint EL is denoted by widthL(i). The X-directional distance between the light emission point LP(i) and the viewpoint EL is denoted by widthL_LED(i). The viewpoint EL is the left-eye viewpoint of the user and is the other of the first viewpoint E1 or EC and the second viewpoint E2 or ED.

The value widthR_LED(i) can be expressed as Expression (1) below. In Expression (1) and other expressions, D1 is a value indicating the magnitude of the distance D1 described above with reference to FIG. 3 and illustrated in FIG. 5. The value indicating the magnitude of the distance D1 may be a predetermined value based on the average value of typical users. In the embodiment, the distance D1 is, for example, 31.25 millimeters (mm), but the present disclosure is not limited thereto and the distance D1 is changeable as appropriate.

$$\text{width}R\_LED(i)=\text{pos}\_x-D1-\{\text{offset}+(\text{pitch}\times i)\} \quad (1)$$

The value widthR(i) can be expressed as Expression (2) below. In Expression (2) and other expressions, Th is a value indicating the magnitude of the distance Th. The distance Th is determined in advance in accordance with the design of the display device 1. A method of determining the distance Th in designing will be described later.

$$\text{width}R(i)=\text{width}R\_LED(i)\times\text{pos}\_h/(\text{pos}\_h+Th) \quad (2)$$

The value shiftR_x(i) can be expressed as Expression (3) below.

$$\text{shift}R\_x(i)=\text{pos}\_x-D1-\text{width}R(i) \quad (3)$$

The value R_x(i) can be expressed as Expression (4) below. In Expression (4) and other expressions, PP is a value indicating the magnitude of the pixel pitch PP. The pixel pitch PP is determined in advance in accordance with the design of the display device 1. In Expression (4) and other expressions, int( ) represents calculation of an integer value obtained by rounding a value in the parentheses off to the closest whole number.

$$R\_x(i)=\text{int}(\text{shift}R\_x(i)/PP) \quad (4)$$

The value widthL_LED (i) can be expressed as Expression (5) below.

$$\text{width}L\_LED(i)=\text{pos}\_x+D1-\{\text{offset}+(\text{pitch}\times i)\} \quad (5)$$

The value widthL_(i) can be expressed as Expression (6) below.

$$\text{width}L(i)=\text{width}L\_LED(i)\times\text{pos}\_h/(\text{pos}\_h+Th) \quad (6)$$

The value shiftL_x (i) can be expressed as Expression (7) below.

$$\text{shift}L\_x(i)=\text{pos}\_x+D1-\text{width}L\_(i) \quad (7)$$

The value L_x (i) can be expressed as Expression (8) below.

$$L\_x(i)=\text{int}(\text{shift}L\_x(i)/PP) \quad (8)$$

The display output control in accordance with the positions of the first viewpoint E1 or EC and the second viewpoint E2 or ED, which is described above with reference to FIGS. 3 and 4, can be achieved by setting a pixel Pix in a disposition corresponding to R_x(i) as the first pixel Pix1 or PixC and a pixel Pix in a disposition corresponding to L_x(i) as the second pixel Pix2 or PixD.

Figure 6:
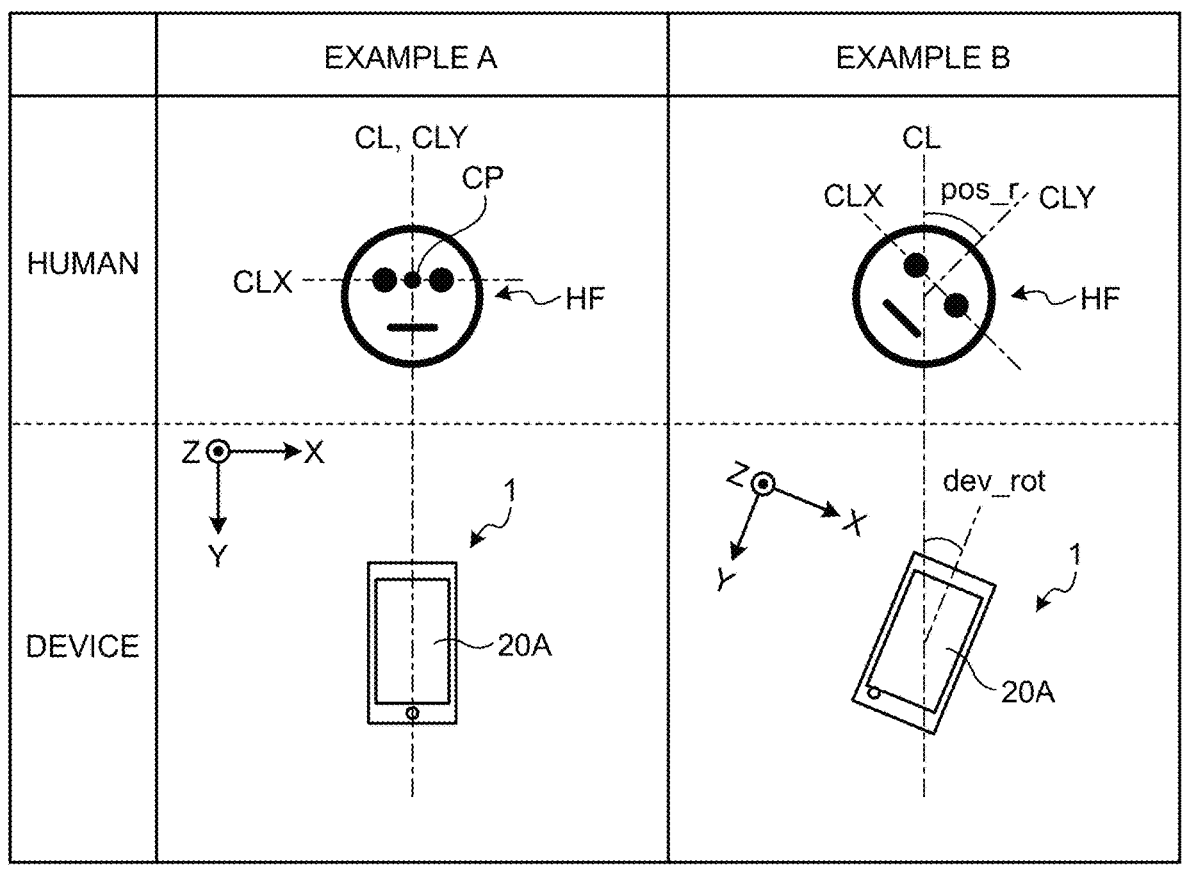
FIG. 6 is a schematic diagram illustrating examples A and B of the relative angle relation between a human face and the display device including the display panel.
Figure 7:
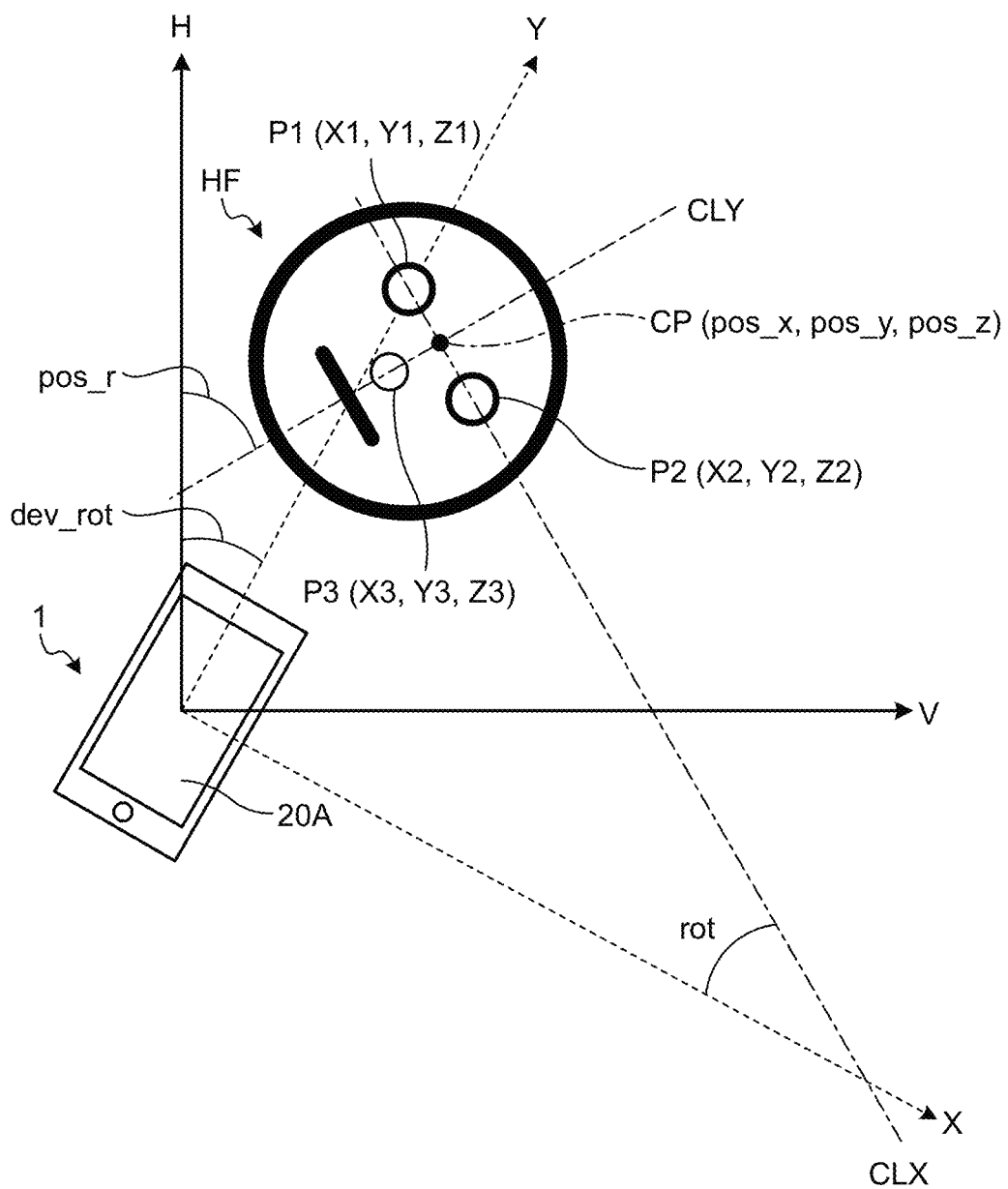
FIG. 7 is a schematic diagram illustrating an example of the angle difference between a face and the display panel with respect to a vertical line and a horizontal line.

The following describes, with reference to FIGS. 6 and 7, the relative relation between the arrangement direction of the two eyes of a human and the X and Y directions corresponding to the disposition of pixels Pix in the display panel 20A.

FIG. 6 is a schematic diagram illustrating examples A and B of the relative angle relation between a human face HF and the display device 1 including the display panel 20A. The Y direction is the longitudinal direction of the display panel 20A illustrated in a rectangular shape in FIG. 6 and other drawings.

In the example A in FIG. 6, a reference line CLX extends in the arrangement direction of the two eyes of the face HF and passes through the middle point CP. The reference line CLX is parallel to the X direction of the display panel 20A. Both a midline CLY of the face HF (refer to "example B" and FIG. 7) and a line dividing the display panel 20A into two in the X direction overlap a straight line CL. The straight line CL is parallel to the Y direction. In the case of the example A, the arrangement direction of the first viewpoint E1 or EC and the second viewpoint E2 or ED extends along the X direction as described above with reference to FIGS. 3 and 4. Thus, the display output control based on the description with reference to FIGS. 3 and 4 is directly applicable in the example A.

However, in the example B illustrated in FIG. 6, neither the midline CLY of the face HF nor the line dividing the display panel 20A into two in the X direction overlaps the straight line CL. An angle pos_r that is the angle of the face HF relative to the straight line CL is different from an angle dev_rot that is the angle of the display panel 20A relative to the straight line CL. The angle pos_r is an angle formed between the midline CLY and the straight line CL. The angle dev_rot is an angle formed between the Y direction and the straight line CL.

In the example A, it can be considered that the angle pos_r and the angle dev_rot are both 0 degrees (°).

FIG. 7 is a schematic diagram illustrating an example of the angle difference between the face HF and the display panel 20A with respect to a vertical line H and a horizontal line V. The vertical line H extends in the direction of Earth's gravity. The horizontal line V extends along a plane orthogonal to the vertical line H. The vertical line H illustrated in FIG. 7 corresponds to the straight line CL in FIG. 6.

The face HF illustrated in FIG. 7 includes positions P1, P2, and P3. The position P1 represents the position of the first viewpoint E1 or EC. The position P2 represents the position of the second viewpoint E2 or ED. The position P3 represents a predetermined position (for example, the position of the nose) overlapping the midline of the face HF. Coordinates representing the positions P1, P2, and P3 are acquired based on image data captured by the image capturer 2 and the distance measurer 3.

As a specific example, with an image processing technology using OpenCV, the sight line following circuit 11 can determine an X-directional coordinate and a Y-directional coordinate of each of the positions of the two eyes and nose of the human face HF. The sight line following circuit 11 performs processing of deriving the reference line CLX passing through the positions P1 and P2. The sight line following circuit 11 also performs processing of deriving the midline CLY as a straight line orthogonal to the reference line CLX and passing through the position P3. The sight line following circuit 11 sets the middle point between the positions P1 and P2 as middle point CP and derives the coordinates (pos_x, pos_y, pos_z) of the middle point CP based on the coordinates (X1, Y1, Z1) of the position P1 and the coordinates (X2, Y2, Z2) of the position P2. Typically, the middle point CP overlaps an intersection between the reference line CLX and the midline CLY. The Z-directional coordinates (Z1, Z2, Z3) of the positions P1, P2, and P3 are measured by the distance measurer 3. The Z-directional coordinate (pos_z) of the middle point CP is handled as the distance Ph.

The sight line following circuit 11 also acquires, from a gyro sensor 4 included in the display device 1, information (tilt information) indicating the tilt direction of the display panel 20A relative to the vertical line H and the horizontal line V. The sight line following circuit 11 derives the angle dev_rot based on the tilt information. The sight line following circuit 11 determines the orientations of the X and Y directions of the display panel 20A relative to the vertical line H and the horizontal line V based on the relation of the angle dev_rot with the vertical line H and the horizontal line V.

The sight line following circuit 11 also derives a relative angle rot formed between the reference line CLX and the X direction. In the following description, the relative angle rot having a positive value means that the midline CLY of the face HF forms an angle in the clockwise direction relative to the Y direction of the display panel 20A. The relative angle rot having a negative value means that the midline CLY of the face HF forms an angle in the anticlockwise direction relative to the Y direction of the display panel 20A. The relative angle rot can be expressed, for example, in the range of −180 degrees (°) to 180 degrees (°). The angle pos_r is the summed value of the angle dev_rot and the relative angle rot.

The image output circuit 12 refers to information indicating the coordinates (pos_x, pos_y, pos_z) of the middle point CP and information indicating the relative angle rot (or the angle pos_r and the angle dev_rot) among various kinds of information derived and determined by the sight line following circuit 11, and performs various kinds of processing related to display output control to display the viewpoint correspondence images OP on the display panel 20A. Details thereof will be described below.

Applying the control of pixels Pix along the X direction to the first pixels Pix1 or PixC and the second pixels Pix2 or PixD, which is described above with reference to FIGS. 3 and 4, cannot achieve output of individual images to a plurality of viewpoints in some cases depending on the relative angle rot. The following describes the relation between the relative angle rot and the feasibility of stereoscopic viewing.

Figure 8:
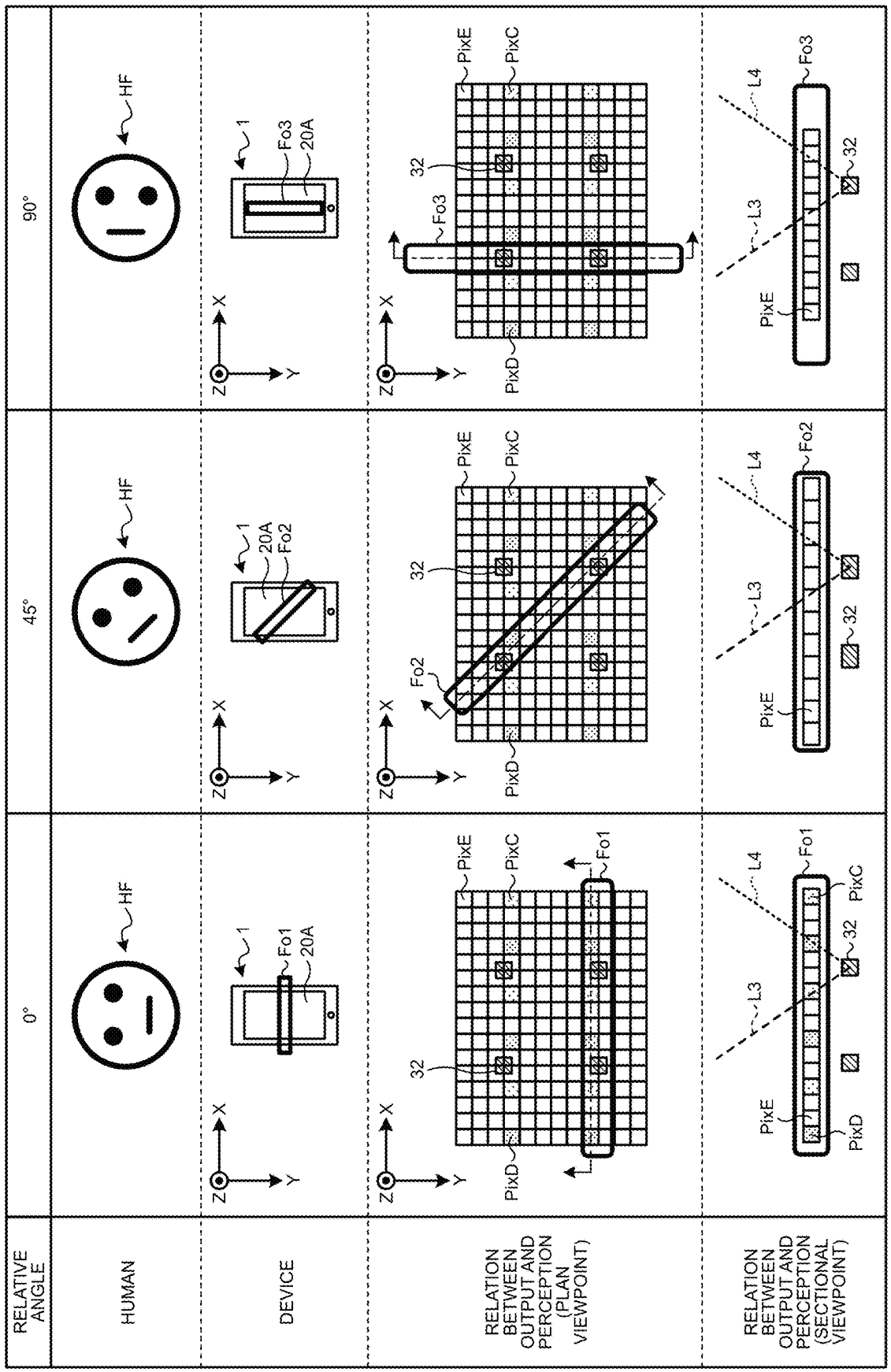
FIG. 8 is a schematic diagram illustrating an example of the relation between a relative angle and the feasibility of individual image output to a plurality of viewpoints by applying control of pixels Pix along the X direction to a first pixel PixC and a second pixel PixD, which is described with reference to FIGS. 3 and 4.

FIG. 8 is a schematic diagram illustrating an example of the relation between the relative angle rot and the feasibility of individual image output to a plurality of viewpoints by applying the control of pixels Pix along the X direction to the first pixels PixC and the second pixels PixD, which is described above with reference to FIGS. 3 and 4.

In FIG. 8, the row "Human" schematically illustrates the orientation of the human face HF relative to the display panel 20A illustrated in the row "Device". In the row "Device", a region to which the sight line of the human is directed in the display panel 20A of the display device 1 is illustrated as any of regions Fo1, Fo2, and Fo3. "Relation between output and perception (planar viewpoint)" schematically illustrates the relation between a light emission point 32 and a pixel Pix at a part of the display panel 20A including any of the regions Fo1, Fo2, and Fo3 illustrated in the row "Device". "Relation between output and perception (sectional viewpoint)" illustrates a section at a position illustrated with a dashed and single-dotted line and arrows in "Relation between output and perception (planar viewpoint)".

Assume that the relative angle rot is 0 degrees (°). As schematically illustrated in the region Fo1 in "Relation between output and perception (sectional viewpoint)", light L3 having passed through each first pixel PixC reaches the first viewpoint EC and light L4 having passed through each second pixel PixD reaches the second viewpoint ED by applying the control of pixels Pix along the X direction to the first pixels PixC and the second pixels PixD, which is described above with reference to FIGS. 3 and 4. In other words, when the relative angle rot is 0 degrees (°), output of individual images to a plurality of viewpoints can be achieved by applying the control of pixels Pix along the X direction to the first pixels PixC and the second pixels PixD, which is described above with reference to FIGS. 3 and 4.

Assume that the relative angle rot is 45 degrees (°). As schematically illustrated in the region Fo2 in "Relation between output and perception (sectional viewpoint)", the emission line of light between each first pixel PixC and the first viewpoint EC and the emission line of light between each second pixel PixD and the second viewpoint ED are not established only by simply applying the control of pixels Pix along the X direction to the first pixels PixC and the second pixels PixD, which is described above with reference to FIGS. 3 and 4. In other words, when the relative angle rot is 45 degrees (°), it is difficult to achieve output of individual images to a plurality of viewpoints only by simply applying the control of pixels Pix along the X direction to the first pixels PixC and the second pixels PixD, which is described above with reference to FIGS. 3 and 4. When the relative angle rot is 90 degrees (°), the same occurs as in the case in which the relative angle rot is 45 degrees (°), as schematically illustrated in the region Fo3 in "Relation between output and perception (sectional viewpoint)".

Figure 9:
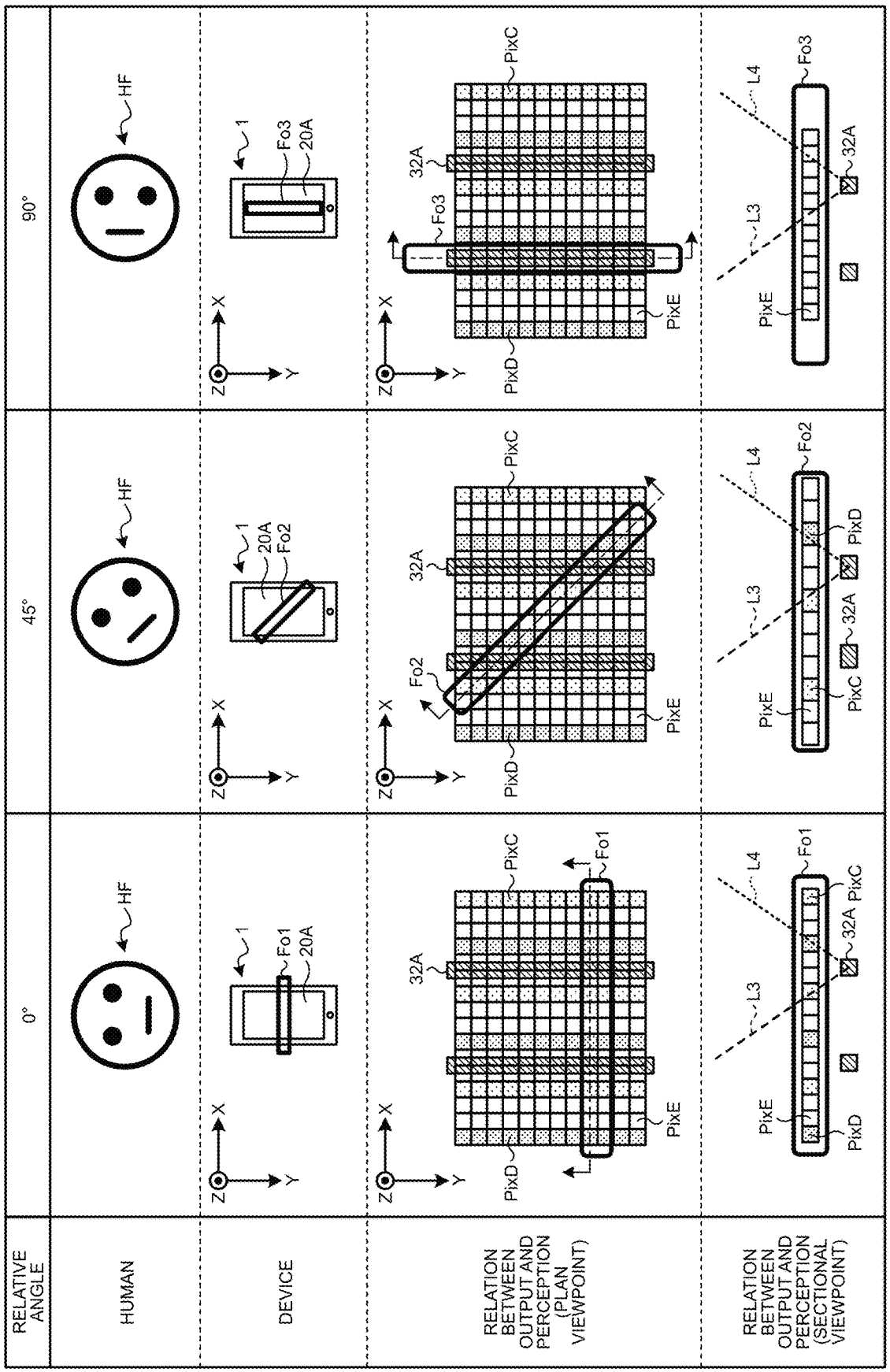
FIG. 9 is a schematic diagram illustrating another example of the relation between the relative angle and the feasibility of individual image output to a plurality of viewpoints by applying the control of pixels Pix along the X direction to the first pixel PixC and the second pixel PixD, which is described with reference to FIGS. 3 and 4.

FIG. 9 is a schematic diagram illustrating another example of the relation between the relative angle rot and the feasibility of individual image output to a plurality of viewpoints by applying the control of pixels Pix along the X direction to the first pixels PixC and the second pixels PixD, which is described above with reference to FIGS. 3 and 4. In the configuration illustrated in FIG. 9, a line light source 32A is provided in place of the light emission point 32 described above with reference to FIG. 8. The light emission point 32 illustrated in FIG. 8 is a hole or light-emitting element that functions as what is called a point light source. The line light source 32A illustrated in FIG. 9 is a slit or light-emitting element that functions as a linear light source in the Y direction.

In the case in which the line light source 32A is employed in place of the light emission point 32, as well, when the relative angle rot is 0 degrees (°), output of individual images to a plurality of viewpoints can be achieved by applying the control of pixels Pix along the X direction to the first pixels PixC and the second pixels PixD, which is described above with reference to FIGS. 3 and 4. In the case in which the line light source 32A is employed in place of the light emission point 32, when the relative angle rot is 45 degrees (°), output of individual images to a plurality of viewpoints can be achieved by applying the control of pixels Pix along the X direction to the first pixels PixC and the second pixels PixD, which is described above with reference to FIGS. 3 and 4, as illustrated in the column of "45°" in FIG. 9, but this is not assured. When the relative angle rot is 90 degrees) (°, irrespective of the light emission point 32 or the line light source 32A, it is difficult to achieve output of individual images to a plurality of viewpoints only by simply applying the control of pixels Pix along the X direction to the first pixels PixC and the second pixels PixD, which is described above with reference to FIGS. 3 and 4.

As described above with reference to FIGS. 8 and 9, depending on the relative angle rot, it is difficult to achieve output of individual images to a plurality of viewpoints only by simply applying the control of pixels Pix along the X direction to the first pixels Pix1 or PixC and the second pixels Pix2 or PixD, which is described above with reference to FIGS. 3 and 4 in some cases. Thus, in the embodiment, processing (relative angle correspondence processing) for more appropriately controlling the disposition of the first pixels Pix1 or PixC and the second pixels Pix2 or PixD in accordance with the relative angle rot is performed. The following describes an outline of the processing with reference to FIGS. 10 to 12.

Figure 10:
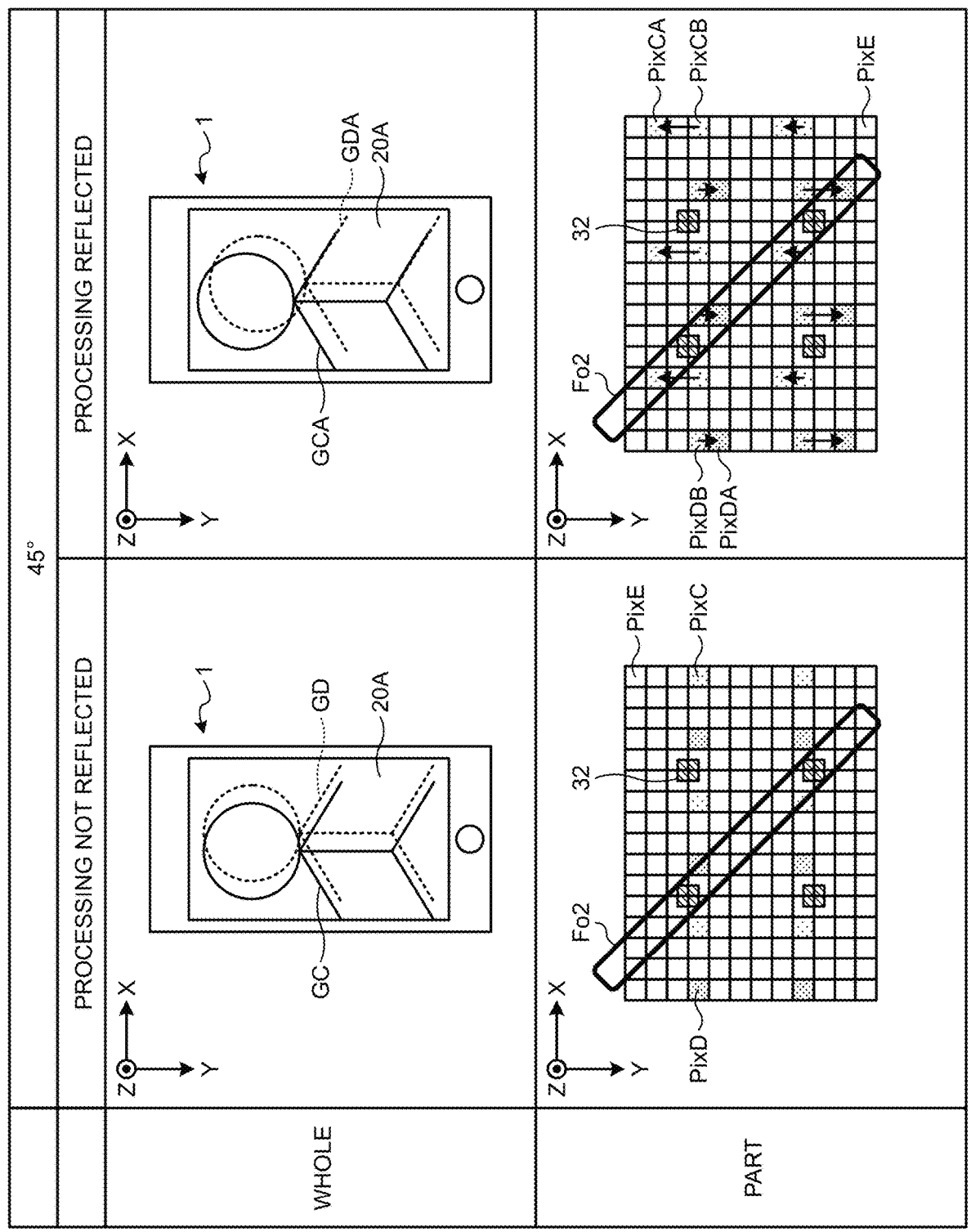
FIG. 10 is a schematic diagram illustrating exemplary pixel arrangement control when the relative angle is 45 degrees (°)
Figure 11:
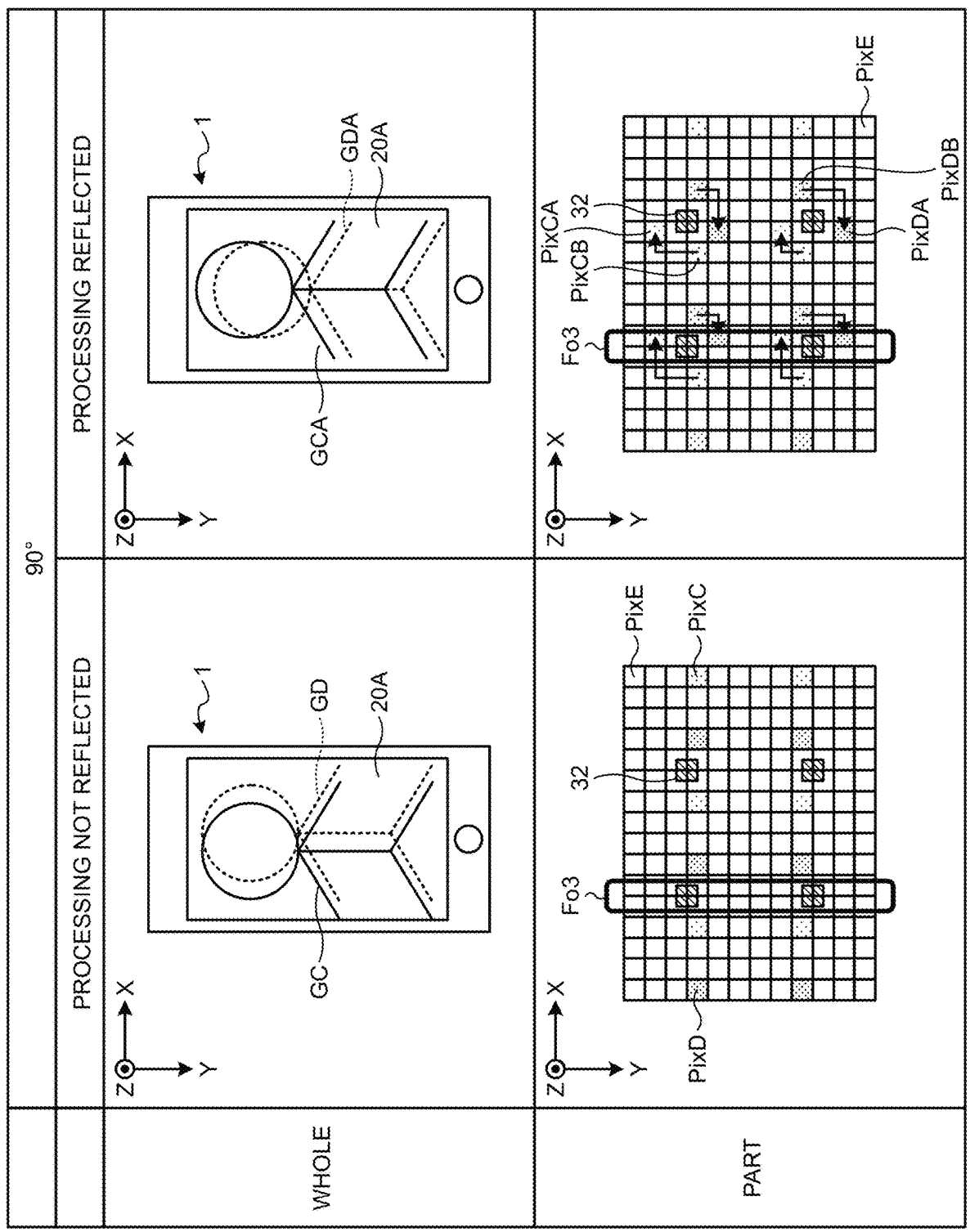
FIG. 11 is a schematic diagram illustrating exemplary pixel arrangement control when the relative angle is 90 degrees (°)

FIG. 10 is a schematic diagram illustrating exemplary pixel arrangement control when the relative angle rot is 45 degrees (°). FIG. 11 is a schematic diagram illustrating exemplary pixel arrangement control when the relative angle rot is 90 degrees (°). Disposition control of the first pixels PixC and the second pixels PixD in the column of "Processing not reflected" in each of FIGS. 10 and 11 is the same as in the column of "45°" in FIG. 8. In the embodiment, pixel disposition control in accordance with the relative angle rot is performed as illustrated in the column of "Processing reflected".

In FIGS. 10 and 11, a first pixel PixCB and a first pixel PixDB are pixels corresponding to a first pixel PixC and a second pixel PixD, respectively, when the control of pixels Pix along the X direction is applied to the first pixels Pix1 or PixC and the second pixels Pix2 or PixD, which is described above with reference to FIGS. 3 and 4. In addition, a first pixel PixCA and a second pixel PixDA are pixels corresponding to a first pixel PixC and a second pixel PixD, respectively, which are determined by the relative angle correspondence processing applied in the embodiment.

For example, consider a case in which when the control of pixels Pix along the X direction on the first pixels Pix1 or PixC and the second pixels Pix2 or PixD, which is described above with reference to FIGS. 3 and 4, is reflected, output is performed so that a first image GC and a second image GD are arranged in the X direction in the display panel 20A as illustrated in the row "Whole" of the column of "Processing not reflected" in FIGS. 10 and 11. The first image GC is an image perceived with light passing through each first pixel PixC. The second image GD is an image perceived with light passing through each second pixel PixD. When the relative angle rot is 0 degrees (°), stereoscopic viewing is established with the first image GC and the second image GD illustrated in the row "Whole" of the column of "Processing not reflected". However, when the relative angle rot is 45 degrees (°) or 90 degrees (°), it is difficult to establish stereoscopic viewing with the first image GC and the second image GD illustrated in the row "Whole" of the column of "Processing not reflected".

Thus, as illustrated in the row "Whole" of the column of "Processing reflected" in FIGS. 10 and 11, pixel disposition control in accordance with the relative angle rot is performed so that a first image GCA and a second image GDA correspond to the arrangement direction of the two eyes of the face HF in the display panel 20A. The first image GCA is an image perceived with light passing through each first pixel PixCA. The second image GDA is an image perceived with light passing through each second pixel PixDA. As understood from comparison between the first images GC and GCA and comparison between the second images GD and GDA, the first image GCA is the same as the first image GC. The second image GDA is the same as the second image GD. However, the relative position-angle relation between the first image GCA and the second image GDA is different from the relative position-angle relation between the first image GC and the second image GD. The relative position-angle relation between the first image GCA and the second image GDA is shifted in accordance with the relative angle rot so that the images correspond to the arrangement direction of the two eyes of the face HF. Processing related to disposition control of the first pixels PixCA and the second pixels PixDA is performed so that such a relative position-angle relation between the first image GCA and the second image GDA is established.

Figure 12:
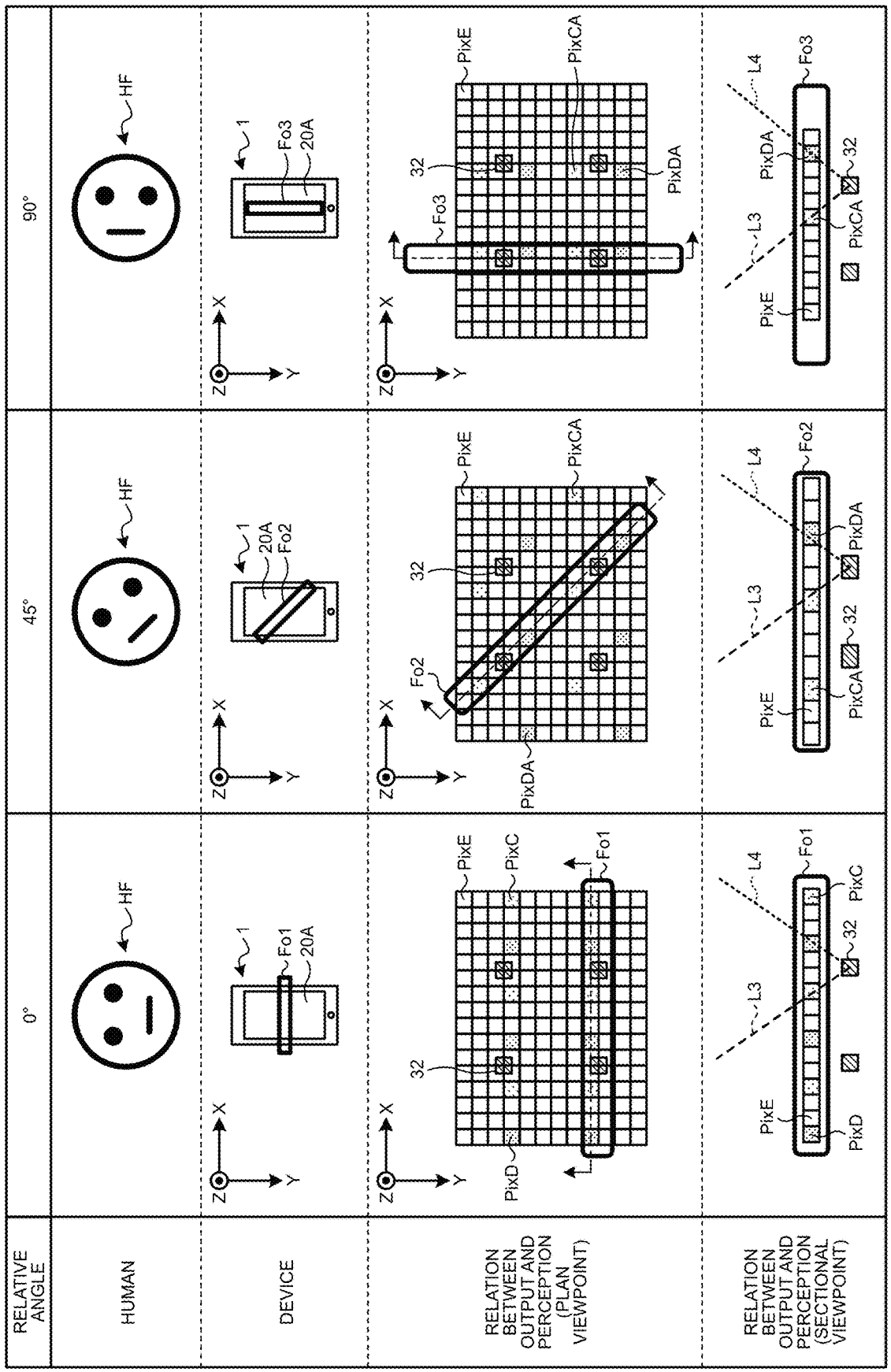
FIG. 12 is a schematic diagram illustrating an example of the relation between the relative angle and the feasibility of individual images output to a plurality of viewpoints when disposition control described with reference to FIGS. 10 and 11 is reflected.

FIG. 12 is a schematic diagram illustrating an example of the relation between the relative angle rot and the feasibility of individual images output to a plurality of viewpoints when the disposition control described above with reference to FIGS. 10 and 11 is reflected. As illustrated in the column "45°" in FIG. 12 and the column "90°", when the disposition control described above with reference to FIGS. 10 and 11 is reflected, the light L3 having passed through each first pixel PixCA reaches the first viewpoint EC and the light L4 having passed through each second pixel PixDA reaches the second viewpoint ED. Thus, output of individual images to a plurality of viewpoints can be achieved by the disposition control described above with reference to FIGS. 10 and 11.

The description with reference to FIGS. 10 to 12 is made for an example in which the relative angle rot is 45 degrees (°) or 90 degrees (°), but in the embodiment, irrespective of the value of the relative angle rot, the disposition of the first pixels PixCA and the second pixels PixDA relative to a light emission point LP such as the light emission point 32 or the line light source 32A can be made correspond to the arrangement direction of the two eyes of the face HF. In other words, in the embodiment, irrespective of the relative angle rot, output of individual images to a plurality of viewpoints can be achieved by applying the control of pixels Pix along the X direction to the first pixels PixC and the second pixels PixD, which is described above with reference to FIGS. 3 and 4.

The following describes more specific processing contents related to the disposition control described above with reference to FIGS. 10 to 12.

Figure 13:
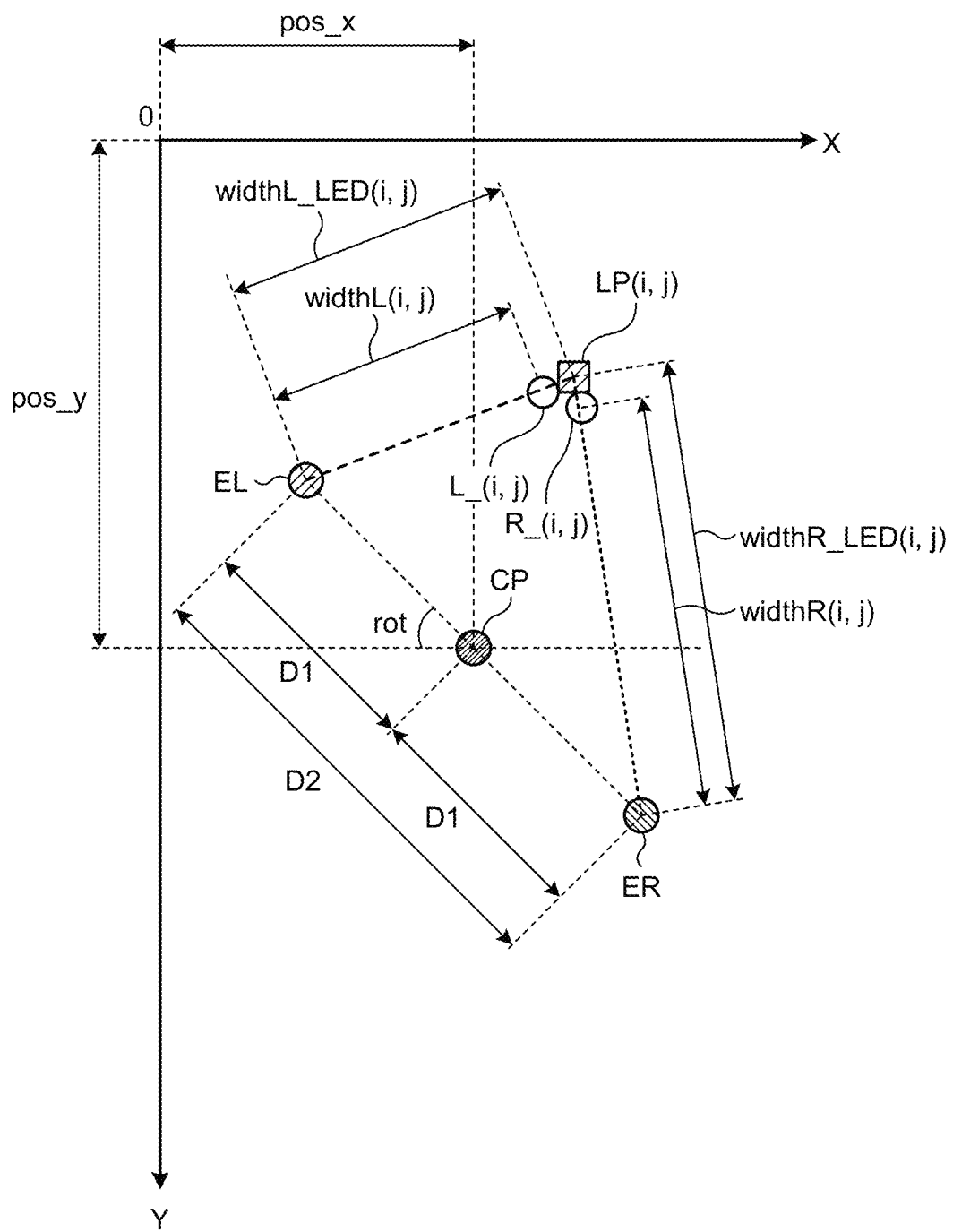
FIG. 13 is a diagram illustrating various parameters related to derivation of coordinates R_(i, j) and coordinates L_(i, j) based on the positional relation between a light emission point positioned at coordinates LP(i, j) and a viewpoint.

FIG. 13 is a diagram illustrating various parameters related to derivation of coordinates $R\_(i, j)$ and $L\_(i, j)$ based on a light emission point LP positioned at the coordinates LP(i, j) and the positional relation between the viewpoints ER and EL.

As described above, the X-directional distance between the origin and the light emission point LP(i) can be expressed as "offset+(pitch×i)". Hereinafter, LEDx(i) in an expression means LEDx(i)=offset+(pitch×i). When light emission points LP are disposed in a matrix of rows and columns in the X and Y directions, the coordinates of each light emission point LP include not only information of the X-directional coordinate (i) described above but also information of the Y-directional coordinate (j). The light emission point LP(j) indicates the emission start point of light from a light emission point (for example, a light emission point 32) disposed at the (j+1)-th closest position to the origin in the Y direction. Thus, j is an integer equal to or larger than zero. The light emission point LP(0) and the light emission point LP(i) in FIG. 5 are the light emission point LP(0) or the light emission point LP(j) in FIG. 14. Thus, when light emission points LP are disposed in a matrix of rows and columns in the X and Y directions, the coordinates LP(i, j) of each light emission point LP include information indicating the X-directional coordinate and the Y-directional coordinate.

The distance between the origin and the light emission point LP(j) in the Y direction can be expressed as "offset_Y+ (pitch_Y×j)", where offset_Y represents the distance between the origin and the light emission point LP(i, 0) in the Y direction. Hereinafter, LEDy(j) in an expression means LEDy(j)=offset_Y+(pitch_Y×j). The magnitude of the value of "pitch_Y" corresponds to the interval between the Y-directional center lines of two light emission points LP adjacent to each other in the Y direction. The values "offset_Y" and "offset_Y+(pitch_Y×j)" are values determined in advance in accordance with the design of the display device 1 and are parameters that can be referred in calculation related to determination of the Y-directional the coordinate Y (j).

The coordinates of the viewpoint ER are denoted by (PosR_x, PosR_y). The symbol PosR_x represents the coordinate of the viewpoint ER in the X direction. The symbol PosR_y represents the coordinate of the viewpoint ER in the Y direction. The coordinate PosR_x can be expressed as Expression (9) below. The coordinate PosR_y can be expressed as Expression (10) below. The symbol "sin" in Expression (10) and Expressions (14) and (23) to be described later represents sine. The symbol "cos" in Expression (9) and Expressions (13) and (24) to be described later represents cosine. The symbol "rot" in each expression represents the value of the relative angle rot.

$$PosR\_x=pos\_x+D1\times cos(rot/180) \quad (9)$$

$$PosR\_y=pos\_y+D1\times sin(rot/180) \quad (10)$$

The length of the emission line of light between the center of the light emission point LP positioned at the coordinates LP(i, j) and the viewpoint ER is denoted by a length widthR_LED. In addition, the length on the emission line of light between the coordinates R_(i, j) and the viewpoint ER is denoted by a length widthR. The coordinates R_(i, j) are located on the emission line of light between the center of the light emission point LP positioned at the coordinates LP(i, j) and the viewpoint ER, and are coordinates with respect to which a pixel Pix is positioned in the Z direction. The ratio of the length widthR and the length widthR_LED can be expressed as Expression (11) below. The position pos_h in Expression (11) and Expression (15) to be described later is derived by the distance measurer 3 as described above. The symbol "th" in Expression (11) and Expression (15) to be described later is predetermined as a design matter. The length widthR_LED can be expressed as Expression (12).

$$width:widthR\_LED=pos\_h:(pos\_h+th) \quad (11)$$

$$widthR\_LED=\{(LEDx-PosR\_x)^2+(LEDy-PosR\_y)^2\}^{1/2} \quad (12)$$

The coordinates of the viewpoint EL are denoted by (PosL_x, PosL_y). The symbol PosL_x represents the coordinate of the viewpoint EL in the X direction. The symbol PosL_y represents the coordinate of the viewpoint EL in the Y direction. The coordinate PosL_x can be expressed as Expression (13) below. The coordinate PosR_y can be expressed as Expression (14) below.

$$PosL\_x=pos\_x-D1\times cos(rot/180) \quad (13)$$

$$PosL\_y=pos\_y-D1\times sin(rot/180) \quad (14)$$

The length of the emission line of light between the center of the light emission point LP positioned at the coordinates LP(i, j) and the viewpoint EL is denoted by a length widthL_LED. The length on the emission line of light between the coordinates L_(i, j) and the viewpoint EL is denoted by a length widthL. The coordinates L_(i, j) are coordinates that are located on the emission line of light between the center of the light emission point LP positioned at the coordinates LP(i, j) and the viewpoint EL, and are coordinates with respect to which a pixel Pix is positioned in the Z direction. The ratio of the length widthL and the length widthL_LED can be expressed as Expression (15) below. The length widthL_LED can be expressed as Expression (16).

$$widthL:widthL\_LED=pos\_h:(pos\_h+th) \quad (15)$$

$$widthL\_LED=((LEDx-PosL\_x)^2+(LEDy-PosL\_y)^2)^{1/2} \quad (16)$$

Figure 14:
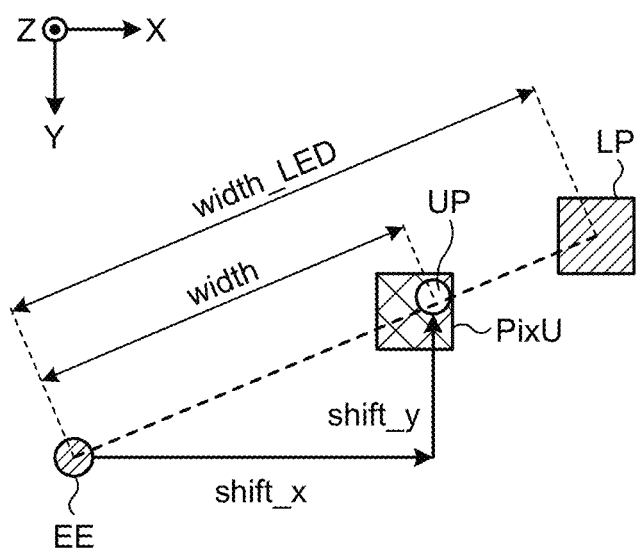
FIG. 14 is a schematic diagram illustrating the relation between a length "width" and a pixel PixU through which light from a light emission point positioned at the coordinates LP(i, j) to a viewpoint passes.

FIG. 14 is a schematic diagram illustrating the relation between the length "width" and a pixel PixU. The pixel PixU is a pixel Pix through which light from the light emission point LP positioned at the coordinates LP(i, j) to a viewpoint EE passes. Hereinafter, the pixel PixU means a pixel Pix through which light (light beam) from the light emission point LP to the viewpoint EE passes, and encloses a passing point UP to be described later. The length "width" is the length widthR or the length widthL. A length width LED illustrated in FIG. 14 is the length widthR_LED when the length "width" is the length widthR. The length width LED is widthL_LED when the length "width" is the length widthL. The viewpoint EE illustrated in FIG. 14 and FIG. 22 to be described later is the viewpoint ER when the length "width" is the length widthR. The viewpoint EE is the viewpoint EL when the length "width" is the length widthL. The passing point UP illustrated in FIG. 14 is R_(i, j) when the length "width" is the length widthR. The passing point UP is L_(i, j) when the length "width" is the length widthL.

When the length "width" is the length widthR, coordinates at which the pixel PixU is positioned are denoted by (shiftR_x, shiftR_y). The symbol shiftR_x represents the coordinate of the pixel PixU in the X direction in this case. The symbol shiftR_y represents the coordinate of the pixel PixU in the Y direction in this case. The coordinate shiftR_x can be expressed as Expression (17) below. The coordinate shiftR_y can be expressed as Expression (18) below.

$$shiftR\_x=posR\_x+(LEDx-posR\_x)\times widthR/widthR\_LED \quad (17)$$

$$shiftR\_y=posR\_y+(LEDy-posR\_y)\times widthR/widthR\_LED \quad (18)$$

When the length "width" is the length widthL, coordinates at which the pixel PixU is positioned are denoted by (shiftL_x, shiftL_y). The symbol shiftL_x represents the coordinate of the pixel PixU in the X direction in this case. The symbol shiftL_y represents the coordinate of the pixel PixU in the Y direction in this case. The coordinate shiftL_x can be expressed as Expression (19) below. The coordinate shiftL_y can be expressed as Expression (20) below.

$$shiftL\_x=posL\_x+(LEDx-posL\_x)\times widthL/widthL\_LED \quad (19)$$

$$shiftL\_y=posL\_y+(LEDy-posL\_y)\times widthL/widthL\_LED \quad (20)$$

As illustrated with the positional relation between the passing point UP and the pixel PixU in FIG. 14, the passing point UP does not necessarily pass through the center of the pixel PixU.

Figure 15:
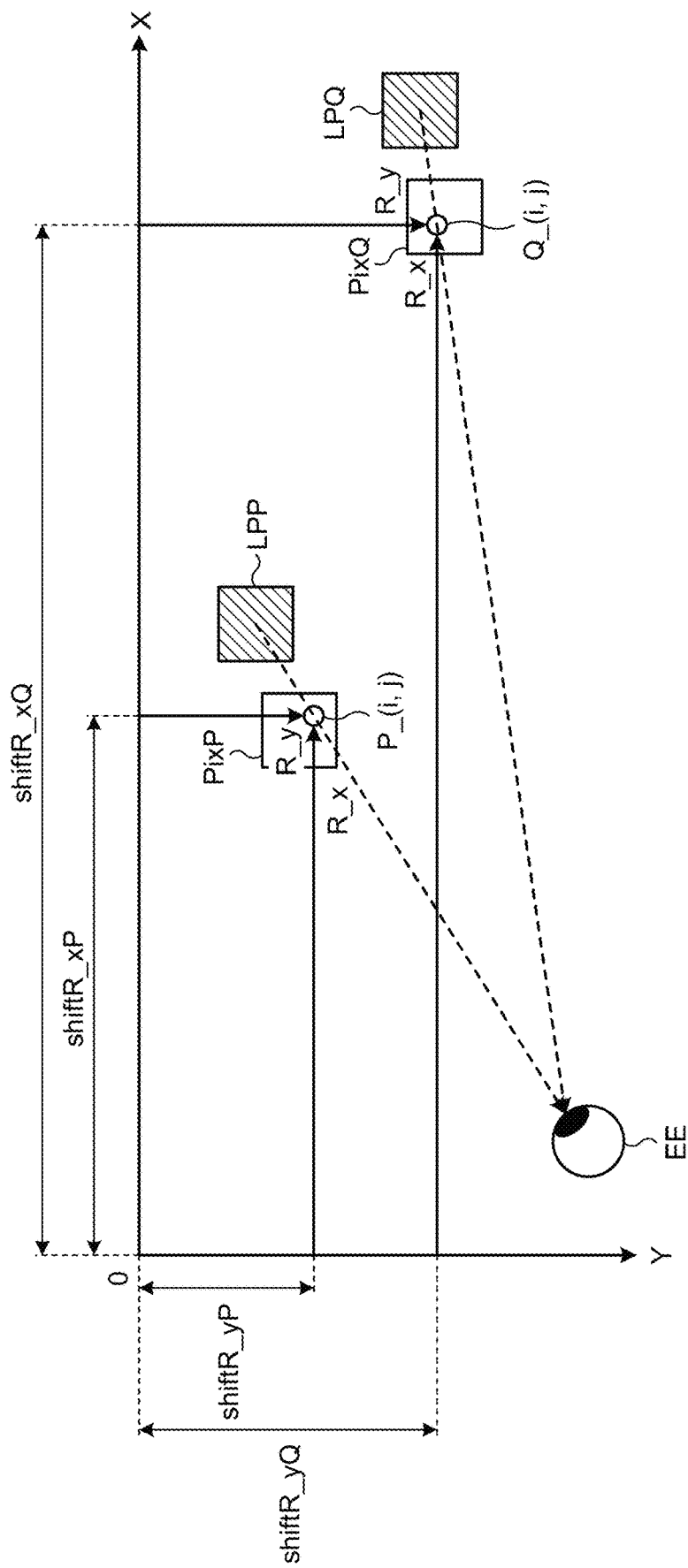
FIG. 15 is a schematic diagram illustrating an example of the difference between the position of a passing point P_(i, j) at a pixel positioned on the emission line of light from a light emission point LPP to a viewpoint and the position of a passing point Q_(i, j) at a pixel positioned on the emission line of light from a light emission point LPQ to the viewpoint.

FIG. 15 is a schematic diagram illustrating an example of the difference between the position of a passing point P_(i, j) at a pixel PixP positioned on the emission line of light from a light emission point LPP to the viewpoint EE and the position of a passing point Q_(i, j) at a pixel PixQ positioned on the emission line of light from a light emission point LPQ to the viewpoint EE. The passing point P_(i, j) and the passing point Q_(i, j) are passing points UP different from each other. The light emission points LPP and LPQ are any of a plurality of light emission points LP for the viewpoint EE, and the position of the light emission point LPP is different from the position of the light emission point LPQ. The passing points P_(i, j) and Q_(i, j) are the passing point UP. Specifically, the symbol shiftR_xP represents the coordinate of the passing point P_(i, j) in the X direction. The symbol shiftR_yP represents the coordinate of the passing point P_(i, j) in the Y direction. The symbol shiftQ_xP represents the coordinate of the passing point Q_(i, j) in the X direction. The symbol shiftQ_yP represents the coordinate of the passing point Q_(i, j) in the Y direction.

As exemplarily illustrated in FIG. 15, the passing point P_(i, j) is positioned near a lower-right part of the pixel PixP. The passing point Q_(i, j) is positioned near an upper-left part of the pixel PixQ. In this manner, the position of the passing point UP in the pixel PixU varies in accordance with the positional relation between the light emission point LP and the viewpoint EE.

In the embodiment, drive control of a pixel Pix is performed in accordance with the positional relation between the passing point UP and the pixel PixU, in other words, the position of intersection between the emission line of light from the light emission point LP to the viewpoint EE and the pixel Pix. Specifically, the image output circuit 12 calculates a determination variable R_x from the x coordinate of one passing point UP (shiftR_x, shiftR_y) based on Expression (21) below. The image output circuit 12 also calculates a determination variable R_y from the y coordinate of the one passing point UP based on Expression (22) below. Various calculations (for example, Expressions (9) to (20) described above) prerequisite for Expressions (21) and (22) are performed by the image output circuit 12 based on (pos_x, pos_y, pos_h) and the relative angle rot derived by the sight line following circuit 11 and the basic principle based on Expressions (1) to (8) described above with reference to FIG. 5.

$$R\_x = \text{shiftR}\_x/PP - \text{int}(\text{shiftR}\_x/PP) \quad (21)$$

$$R\_y = \text{shiftR}\_y/PP - \text{int}(\text{shiftR}\_y/PP) \quad (22)$$

These determination coefficients indicate the passing point UP in the pixel PixU. More specifically, the determination coefficients indicate the position of the passing point UP in the pixel PixU when viewed from an end part of the pixel PixU (for example, a corner A at the upper-left upper end of a pixel illustrated in FIG. 16) closest to the origin set on the display surface. Furthermore specially, in a case where R_x=0 and R_y=0, the passing point UP is positioned at the corner A. In a case where R_x=½ and R_y=½, the passing point UP is positioned at the center of the pixel PixU. In a case where R_x=1 and R_y=1, the passing point UP is positioned at an opposing corner AA to the corner A.

Figure 16:
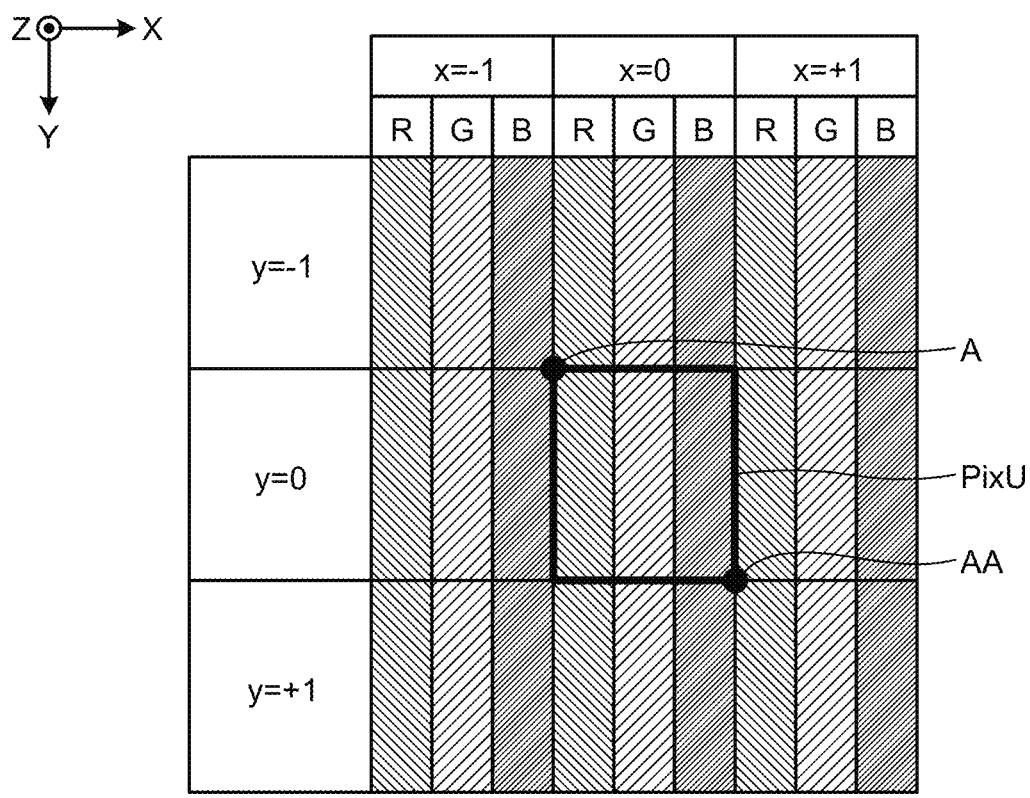
FIG. 16 is a diagram illustrating a coordinate system with respect to a pixel PixU.
Figure 17:
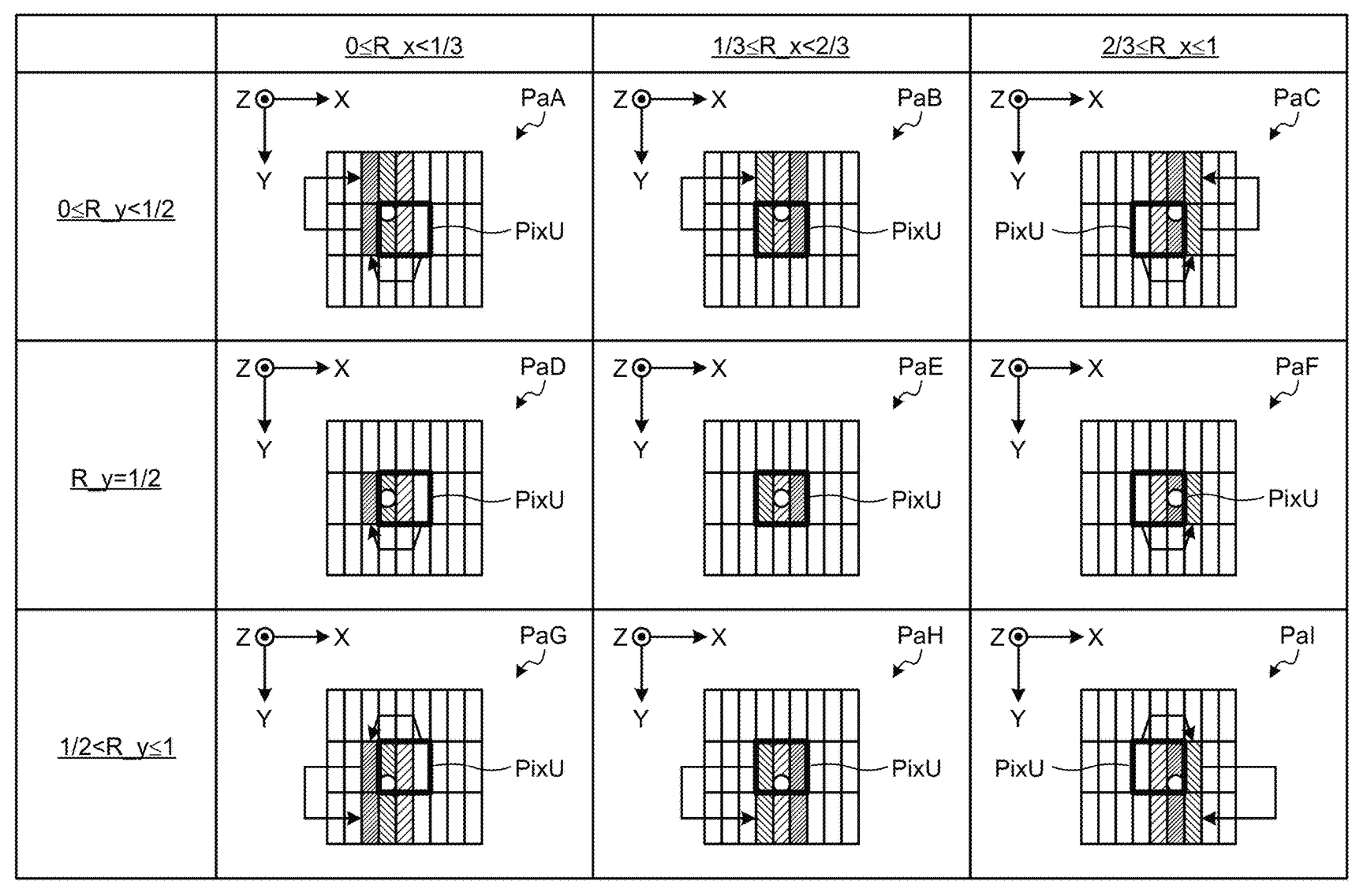

FIG. 16 is a diagram illustrating a coordinate system with respect to the pixel PixU. FIG. 17 is a schematic diagram illustrating an outline of drive control of the pixel PixU in accordance with the position of intersection between the emission line of light from the light emission point LP to the viewpoint EE and the pixel PixU. The image output circuit 12 applies sub-pixel control adapted to the determination variables R_x and R_y as sub-pixel control related to the pixel PixU corresponding to the passing point UP at the coordinates (shiftR_x, shiftR_y) with which the determination variables R_x and R_y are calculated by Expressions (21) and (22) described above. Specifically, as illustrated in FIG. 17, the image output circuit 12 applies control adapted to a pixel signal allocated to the pixel PixU to sub pixels included in at least one of the pixel PixU and a pixel Pix adjacent to the pixel PixU in accordance with a combination of the value of the determination variable R_x and the value of the determination variable R_y.

In the following description with reference to FIGS. 16 and 17, one end side in the X direction means the left side in the drawings. The other end side in the X direction means the right side in the drawings. One end side in the Y direction means the upper side in the drawings. The other end side in the Y direction means the lower side in the drawings.

In description of the embodiment, as illustrated in FIG. 16, each pixel Pix includes a first sub pixel R, a second sub pixel G, and a third sub pixel B. The first sub pixel R, the second sub pixel G, and the third sub pixel B are arranged in the order as listed from the one end side in the X direction toward the other end side. Each pixel Pix including one first sub pixel R, one second sub pixel G, and one third sub pixel B has, for example, a substantially square shape as a whole. Each of the first sub pixel R, the second sub pixel G, and the third sub pixel B has a rectangular shape with a longitudinal direction along the Y direction. A plurality of pixels Pix are disposed in a matrix of rows and columns in the X and Y directions.

In description of sub-pixel control patterns PaA, PaB, PaC, PaD, PaE, PaF, PaG, PaH, and PaI with reference to FIG. 17, a sub pixel as a control target is described with reference to the coordinate system illustrated in FIG. 16. The coordinate system with x and y coordinates illustrated in FIG. 16 is a relative coordinate system with respect to the pixel PixU and does not directly correspond to the above-described values of (i, j).

In FIG. 16, the pixel PixU is positioned at the coordinates of x=0 and y=0. The coordinates of the pixel PixU are denoted by (x, y)=(0, 0). The x coordinate of a pixel Pix adjacent to the pixel PixU and positioned on the one end side in the X direction is x=−1. The term "adjacent" means "adjacent to the pixel PixU in any of the X direction, the Y direction, and an oblique direction". The oblique direction means a direction intersecting both the X and Y directions and orthogonal to the Z direction. The x coordinate of a pixel Pix adjacent to the pixel PixU and positioned on the other end side in the X direction is x=1. The Y coordinate of a pixel Pix adjacent to the pixel PixU and positioned on the one end side in the Y direction is y=−1. The Y coordinate of a pixel Pix adjacent to the pixel PixU and positioned on the other end side in the Y direction is y=1. For example, a pixel Pix at (x, y)=(−1, −1) means a pixel Pix adjacent to the pixel PixU and positioned on the one end side of the pixel PixU in the X direction and the one end side thereof in the Y direction.

In a case where $0 \leq R\_x \leq \frac{1}{3}$ and $0 \leq R\_y < \frac{1}{2}$, the passing point UP in the pixel PixU is located at a position closer to the one end side in the X direction and closer to the one end side in the Y direction. More specifically, the passing point UP in the pixel PixU is positioned in a sub pixel (first sub pixel R) on the one end side and positioned in the upper half of the sub pixel. In this case, the image output circuit 12 applies the control pattern PaA. In the control pattern PaA, the third sub pixel B at (x, y)=(−1, −1), the first sub pixel R and the second sub pixel G at (x, y)=(0, −1), the third sub pixel B at (x, y)=(−1, 0), and the first sub pixel R and the second sub pixel G of the pixel PixU are application targets of control adapted to a pixel signal. Specifically, pixel control adapted to the gradation value of blue (B) among the gradation values of red (R), green (G), and blue (B) indicated by an RGB pixel signal provided to the pixel PixU is applied in a distributing manner to the third sub pixel B at (x, y)=(−1, −1) and the third sub pixel B at (x, y)=(−1, 0). In addition, pixel control adapted to the gradation values of red (R) and green (G) is applied in a distributing manner to the first sub pixel R and the second sub pixel G at (x, y)=(0, −1) and the first sub pixel R and the second sub pixel G of the pixel PixU. Details of the gradation value distribution in pixel control will be described later. With this control, the passing point UP is positioned at a central part in a view of all sub pixels turned on for the passing point UP.

In a case where ⅓≤R_x<⅔ and 0≤R_y<½, the passing point UP in the pixel PixU is located at a position at or near the middle position between the one end side and the other end side in the X direction and closer to the one end side in the Y direction. More specifically, the passing point UP in the pixel PixU is positioned in a sub pixel (second sub pixel G) at the center and positioned in the upper half of the sub pixel. In this case, the image output circuit 12 applies the control pattern PaB. In the control pattern PaB, the first sub pixel R, the second sub pixel G, and the third sub pixel B at (x, y)=(0, −1) and the first sub pixel R, the second sub pixel G, and the third sub pixel B of the pixel PixU are application targets of control adapted to a pixel signal. Specifically, pixel control adapted to the gradation values of red (R), green (G), and blue (B) indicated by an RGB pixel signal provided to the pixel PixU is applied in a distributing manner to the first sub pixel R, the second sub pixel G, and the third sub pixel B at (x, y)=(0, −1) and the first sub pixel R, the second sub pixel G, and the third sub pixel B of the pixel PixU. With this control, the passing point UP is positioned at a central part in a view of all sub pixels turned on for the passing point UP.

In a case where ⅔≤R_x≤1 and 0≤R_y<½, the passing point UP in the pixel PixU is located at a position closer to the other end in the X direction and closer to the one end side in the Y direction. More specifically, the passing point UP in the pixel PixU is positioned in a sub pixel (third sub pixel G) on the other end side and positioned in the upper half of the sub pixel. In this case, the image output circuit 12 applies the control pattern PaC. In the control pattern PaC, the second sub pixel G and the third sub pixel B at (x, y)=(0, −1), the first sub pixel R at (x, y)=(1, −1), the second sub pixel G and the third sub pixel B of the pixel PixU, and the first sub pixel R at (x, y)=(1, 0) are application targets of control adapted to a pixel signal.

Specifically, pixel control adapted to the gradation value of red (R) among the gradation values of red (R), green (G), and blue (B) indicated by an RGB pixel signal provided to the pixel PixU is applied in a distributing manner to the first sub pixel R at (x, y)=(1, −1) and the first sub pixel R at (x, y)=(1, 0). In addition, pixel control adapted to the gradation values of green (G) and blue (B) is applied in a distributing manner to the second sub pixel G and the third sub pixel B at (x, y)=(0, −1) and the second sub pixel G and the third sub pixel B of the pixel PixU. With this control, the passing point UP is positioned at a central part in a view of all sub pixels turned on for the passing point UP.

In a case where 0≤R_x<⅓ and R_y=½, the passing point UP in the pixel PixU is located closer to the one end side in the X direction and at the middle position between the one end side and the other end side in the Y direction. More specifically, the passing point UP in the pixel PixU is positioned in a sub pixel (first sub pixel R) on the one end side and positioned at or near the center of the sub pixel in the upper-lower direction (Y direction). In this case, the image output circuit 12 applies the control pattern PaD. In the control pattern PaD, the third sub pixel B at (x, y)=(−1, 0) and the first sub pixel R and the second sub pixel G of the pixel PixU are application targets of control adapted to a pixel signal. Specifically, pixel control adapted to the gradation value of blue (B) among the gradation values of red (R), green (G), and blue (B) indicated by an RGB pixel signal provided to the pixel PixU is applied to the third sub pixel B at (x, y)=(−1, 0). In addition, pixel control adapted to the gradation values of red (R) and green (G) is applied to the first sub pixel R and the second sub pixel G of the pixel PixU. With this control, the passing point UP is positioned at a central part in a view of all sub pixels turned on for the passing point UP.

In a case where ⅓≤R_x<⅔ and R_y=½, the passing point UP in the pixel PixU is located at or near the middle position between the one end side and the other end side in the X direction and at the middle position between the one end side and the other end side in the Y direction. More specifically, the passing point UP in the pixel PixU is positioned in a sub pixel (second sub pixel G) at the center and positioned at or near the center of the sub pixel in the upper-lower direction (Y direction). In this case, the image output circuit 12 applies the control pattern PaE. In the control pattern PaE, the first sub pixel R, the second sub pixel G, and the third sub pixel B of the pixel PixU are application targets of control adapted to a pixel signal. Specifically, pixel control adapted to the gradation values of red (R), green (G), and blue (B) indicated by an RGB pixel signal provided to the pixel PixU is applied to the first sub pixel R, the second sub pixel G, and the third sub pixel B of the pixel PixU. With this control, the passing point UP is positioned at a central part in a view of all sub pixels turned on for the passing point UP.

In a case where ⅔≤R_x≤1 and R_y=½, the passing point UP in the pixel PixU is located closer to the other end side in the X direction and at the middle position between the one end side and the other end side in the Y direction. More specifically, the passing point UP in the pixel PixU is positioned in a sub pixel (third sub pixel G) on the other end side and positioned at or near the center of the sub pixel in the upper-lower direction (Y direction). In this case, the image output circuit 12 applies the control pattern PaF. In the control pattern PaF, the second sub pixel G and the third sub pixel B of the pixel PixU and the first sub pixel R at (x, y)=(1, 0) are application targets of control adapted to a pixel signal. Specifically, pixel control adapted to the gradation value of red (R) among the gradation values of red (R), green (G), and blue (B) indicated by an RGB pixel signal provided to the pixel PixU is applied to the first sub pixel R at (x, y)=(1, 0). In addition, pixel control adapted to the gradation values of green (G) and blue (B) is applied to the second sub pixel G and the third sub pixel B of the pixel PixU. With this control, the passing point UP is positioned at a central part in a view of all sub pixels turned on for the passing point UP.

In a case where 0≤R_x<⅓ and ½<R_y≤1, the passing point UP in the pixel PixU is located at a position closer to the one end side in the X direction and closer to the other end side in the Y direction. More specifically, the passing point UP in the pixel PixU is positioned in a sub pixel (first sub pixel R) on the one end side and positioned in the lower half of the sub pixel. In this case, the image output circuit 12 applies the control pattern PaG. In the control pattern PaG, the third sub pixel B at (x, y)=(−1, 0), the first sub pixel R and the second sub pixel G of the pixel PixU, the third sub pixel B at (x, y)=(−1, 1), and the first sub pixel R and the second sub pixel G at (x, y)=(0, 1) are application targets of control adapted to a pixel signal. Specifically, pixel control adapted to the gradation value of blue (B) among the gradation values of red (R), green (G), and blue (B) indicated by an RGB pixel signal provided to the pixel PixU is applied in a distributing manner to the third sub pixel B at $(x, y)=(-1, 0)$ and the third sub pixel B at $(x, y)=(-1, 1)$. In addition, pixel control adapted to the gradation values of red (R) and green (G) is applied in a distributing manner to the first sub pixel R and the second sub pixel G of the pixel PixU and the first sub pixel R and the second sub pixel G at $(x, y)=(0, 1)$. With this control, the passing point UP is positioned at a central part in a view of all sub pixels turned on for the passing point UP.

In a case where $\frac{1}{3} \leq R\_x < \frac{2}{3}$ and $\frac{1}{2} < R\_y \leq 1$, the passing point UP in the pixel PixU is located at a position at or near the middle position between the one end side and the other end side in the X direction and closer to the other end side in the Y direction. More specifically, the passing point UP in the pixel PixU is positioned in a sub pixel (second sub pixel G) at the center and positioned in the lower half of the sub pixel. In this case, the image output circuit 12 applies the control pattern PaH. In the control pattern PaH, the first sub pixel R, the second sub pixel G, and the third sub pixel B of the pixel PixU and the first sub pixel R, the second sub pixel G, and the third sub pixel B at $(x, y)=(0, 1)$ are application targets of control adapted to a pixel signal.

Specifically, pixel control adapted to the gradation values of red (R), green (G), and blue (B) indicated by an RGB pixel signal provided to the pixel PixU is applied in a distributing manner to the first sub pixel R, the second sub pixel G, and the third sub pixel B of the pixel PixU and the first sub pixel R, the second sub pixel G, and the third sub pixel B at $(x, y)=(0, 1)$. With this control, the passing point UP is positioned at a central part in a view of all sub pixels turned on for the passing point UP.

In a case where $\frac{2}{3} \leq R\_x \leq 1$ and $\frac{1}{2} < R\_y \leq 1$, the passing point UP in the pixel PixU is located at a position closer to the other end in the X direction and closer to the other end side in the Y direction. More specifically, the passing point UP in the pixel PixU is positioned in a sub pixel (third sub pixel G) on the other end side and positioned in the lower half of the sub pixel. In this case, the image output circuit 12 applies the control pattern PaI. In the control pattern PaI, the second sub pixel G and the third sub pixel B of the pixel PixU, the first sub pixel R at $(x, y)=(1, 0)$, the second sub pixel G and the third sub pixel B at $(x, y)=(0, 1)$, and the first sub pixel R at $(x, y)=(1, 1)$ are application targets of control adapted to a pixel signal. Specifically, pixel control adapted to the gradation value of red (R) among the gradation values of red (R), green (G), and blue (B) indicated by an RGB pixel signal provided to the pixel PixU is applied in a distributing manner to the first sub pixel R at $(x, y)=(1, 0)$ and the first sub pixel R at $(x, y)=(1, 1)$. In addition, pixel control adapted to the gradation values of green (G) and blue (B) is applied in a distributing manner to the second sub pixel G and the third sub pixel B of the pixel PixU and the second sub pixel G and the third sub pixel B at $(x, y)=(0, 1)$. With this control, the passing point UP is positioned at a central part in a view of all sub pixels turned on for the passing point UP.

The following describes details of the gradation value distribution in pixel control. The image output circuit 12 applies gradation value control adapted to the value of R_y in the control patterns PaA, PaB, PaC, PaD, PaE, PaF, PaG, PaH, and PaI.

Specifically, in the control patterns PaA, PaB, and PaC, the first sub pixels R, the second sub pixels G, and the third sub pixels B are controlled such that the gradation values of the first sub pixel R, the second sub pixel G, and the third sub pixel B positioned at y=−1 (positioned in the upper half of the pixel PixU) become equal to $(0.5-R\_y) \times 100\%$ of the gradation values of red (R), green (G), and blue (B) indicated by a pixel signal to the pixel PixU. In addition, in the control patterns PaA, PaB, and PaC, the first sub pixels R, the second sub pixels G, and the third sub pixels B are controlled such that the gradation values of the first sub pixel R, the second sub pixel G, and the third sub pixel B positioned at y=0 become equal to $(0.5+R\_y) \times 100\%$ of the gradation values of red (R), green (G), and blue (B) indicated by a pixel signal to the pixel PixU. In other words, in this control, as the passing point UP is closer to a pixel in the upper half of the pixel PixU, gradation value distribution to the pixel in the upper half is larger, but the distribution is half of that to the pixel PixU at maximum.

In the control patterns PaD, PaE, and PaF, the first sub pixels R, the second sub pixels G, and the third sub pixels B are controlled such that the gradation values of the first sub pixel R, the second sub pixel G, and the third sub pixel B positioned at y=0 become equal to the gradation values of red (R), green (G), and blue (B) indicated by a pixel signal to the pixel PixU.

In the control patterns PaG, PaH, and PaI, the first sub pixels R, the second sub pixels G, and the third sub pixels B are controlled such that the gradation values of the first sub pixel R, the second sub pixel G, and the third sub pixel B positioned at y=0 become equal to $(1.5-R\_y) \times 100\%$ of the gradation values of red (R), green (G), and blue (B) indicated by a pixel signal to the pixel PixU. In addition, in the control patterns PaG, PaH, and PaI, the first sub pixels R, the second sub pixels G, and the third sub pixels B are controlled such that the gradation values of the first sub pixel R, the second sub pixel G, and the third sub pixel B positioned at y=1 become equal to $(-0.5+R\_y) \times 100\%$ of the gradation values of red (R), green (G), and blue (B) indicated by a pixel signal to the pixel PixU. In other words, in this control, as the passing point UP is closer to a pixel in the lower half of the pixel PixU, gradation value distribution to the pixel in the lower half is larger, but the distribution is half of that to the pixel PixU at maximum.

Figure 18:
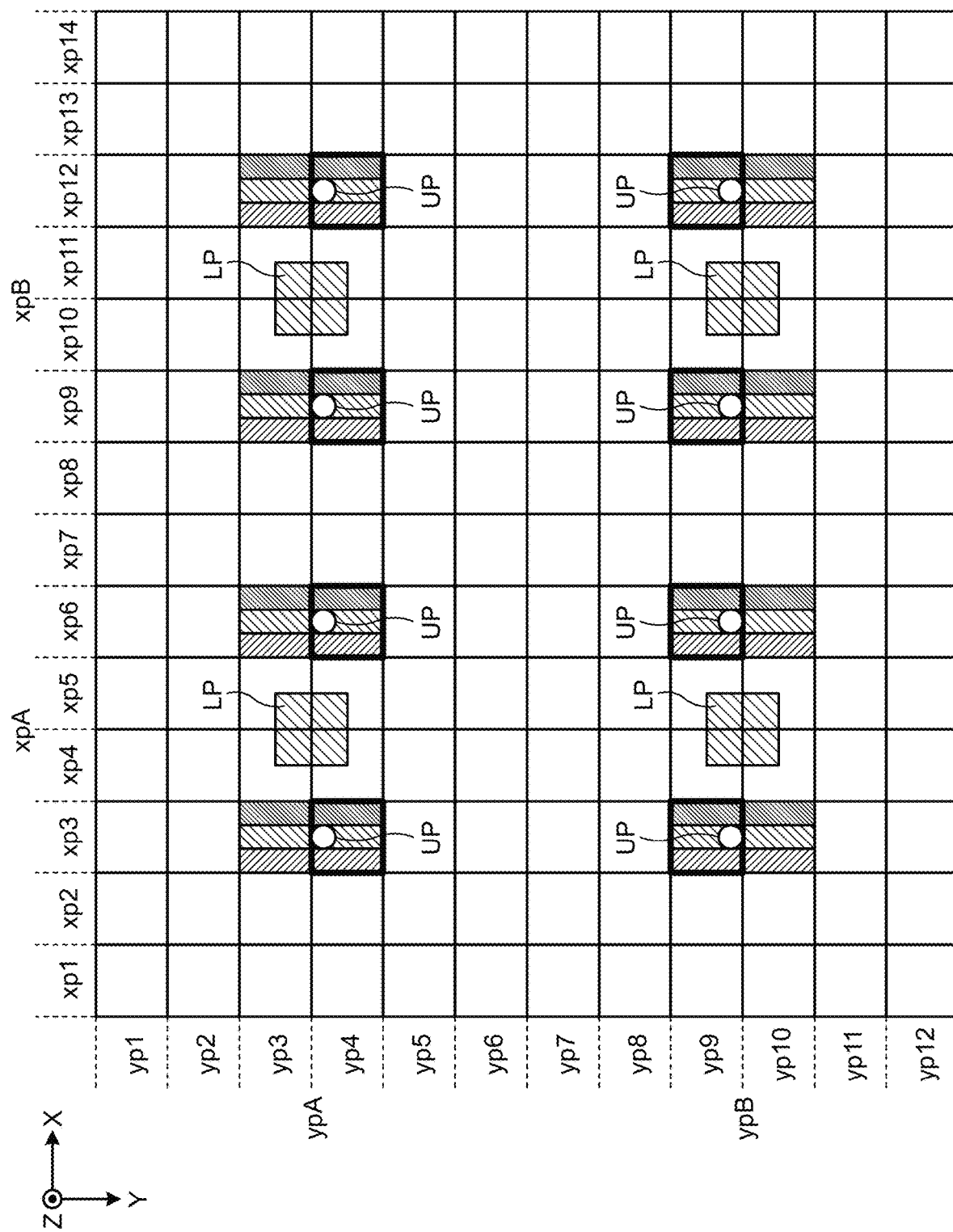
FIG. 18 is a diagram illustrating an example of display output to which sub-pixel control described with reference to FIG. 17 is applied.
Figure 19:
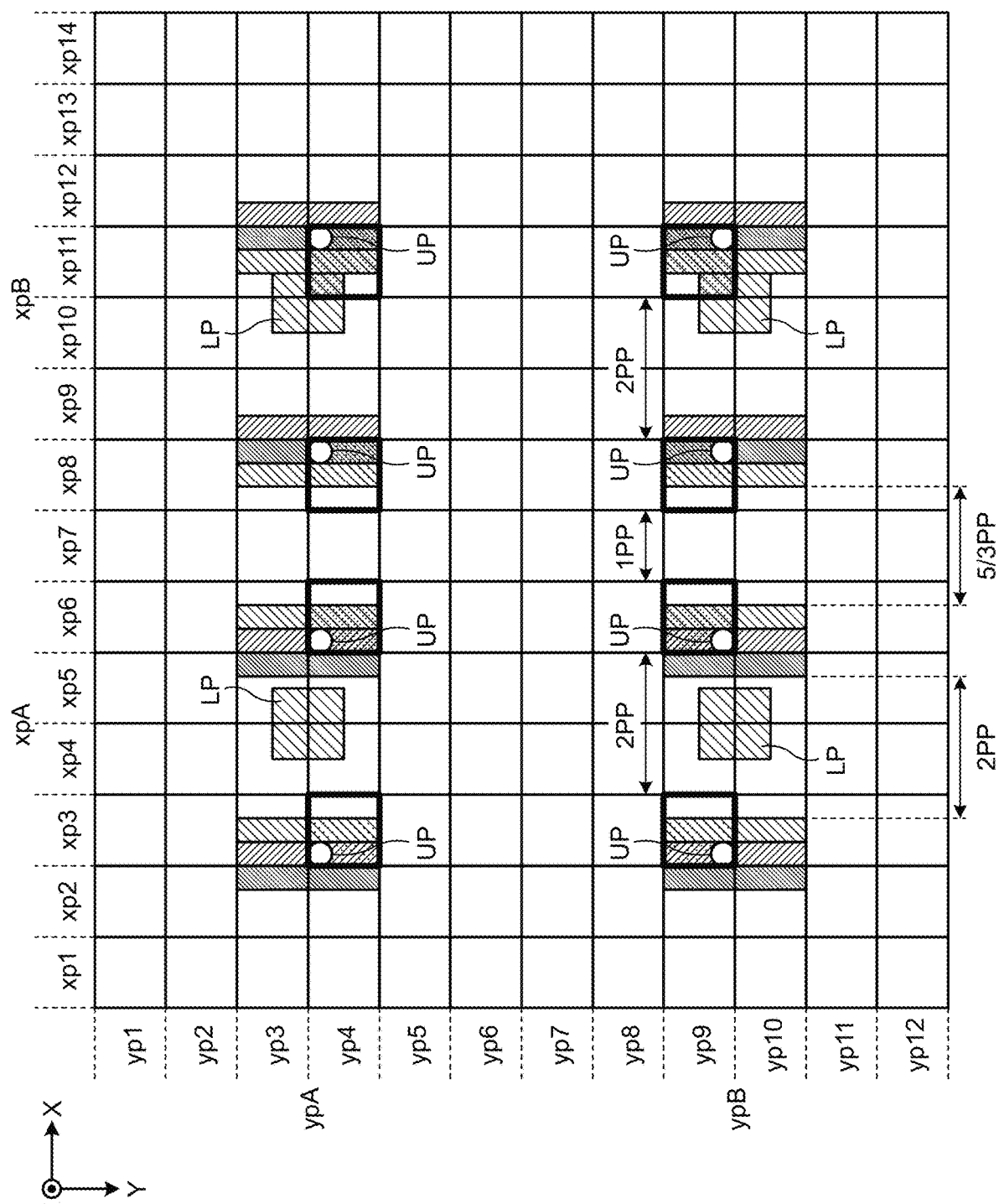
FIG. 19 is a diagram illustrating another example of display output to which the sub-pixel control described with reference to FIG. 17 is applied.

Application examples of the control described above with reference to FIGS. 16 and 17 will be described below with reference to FIGS. 18 and 19. FIGS. 18 and 19 and FIGS. 24, 25, and 26 to be described later illustrate an exemplary pixel region in which 14 pixels Pix in the X direction×12 pixels Pix in the Y direction are disposed. The position of a pixel Pix in the pixel region is expressed with a combination of an xp coordinate of xp1, xp2, . . . , xp14 and a yp coordinate of yp1, yp2, . . . , yp14. For example, a pixel Pix at (xp, yp)=(1, 1) means a pixel Pix positioned at xp1 in the X direction and at yp1 in the Y direction. In FIGS. 18 and 19 and FIGS. 24 to 26 to be described later, the position of the pixel PixU is indicated by a rectangle with a bold frame.

In FIGS. 18, 19, 24, 25, and 26, four light emission points LP are disposed at the planar viewpoint. A boundary line between xp4 and xp5 is denoted by xpA. A boundary line between xp10 and xp11 is denoted by xpB. A boundary line between yp3 and yp4 is denoted by ypA. A boundary line between yp9 and yp10 is denoted by ypB. One of the four light emission points LP is located at the position of intersection between xpA and ypA. Another one of the four light emission points LP is located at the position of intersection between xpA and ypB. Another one of the four light emission points LP is located at the position of intersection between xpB and ypA. The other one of the four light emission points LP is located at the position of intersection between xpB and ypB.

FIG. 18 illustrates display control at a central part of a display screen when the viewpoint middle point CP of a user matches the center of the display screen. In FIG. 18, the sub-pixel control described above with reference to FIG. 17 is applied. Specifically, in FIG. 18, based on the above-described calculation, (xp, yp)=(3, 4), (9, 4), (3, 9), (9, 9) are derived as four left-eye pixels Pix enclosing the passing point UP for the four light emission points in accordance with the positional relation between an emission line from each light emission point to each viewpoint and the pixel matrix. In addition, (xp, yp)=(6, 4), (12, 4), (6, 9), (12, 9) are derived as four right-eye pixels Pix enclosing the passing point UP for the four light emission points. In FIG. 18, the control pattern PaB is applied to the four pixels Pix at the coordinates (xp, yp)=(3, 4), (6, 4), (9, 4), (12, 4) among the coordinates above. In addition, in FIG. 18, the control pattern PaH is applied to the four pixels Pix at the coordinates (xp, yp)=(3, 9), (6, 9), (9, 9), (12, 9).

FIG. 19 illustrates display control on the right side of a display screen when the viewpoint middle point CP of a user coincides with the center of the display screen. In FIG. 19, the sub-pixel control described above with reference to FIG. 17 is applied. Specifically, in FIG. 19, based on the above-described calculation, (xp, yp)=(3, 4), (8, 4), (3, 9), (8, 9) are derived as four left-eye pixels Pix enclosing the passing point UP for the four light emission points in accordance with the positional relation between an emission line from each light emission point to each viewpoint and the pixel matrix. In addition, (xp, yp)=(6, 4), (11, 4), (6, 9), (11, 9) are derived as four right-eye pixels Pix enclosing the passing point UP for the four light emission points. In FIG. 19, the positions of right-eye and left-eye pixels for light emission points positioned on the outer side of the display screen are shifted by one pixel on the inner side as compared to those in FIG. 18 described above. Accordingly, the position of the passing point in each pixel is different, and as a result, display control is changed. In FIG. 19, the control pattern PaA is applied to the two pixels Pix at the coordinates (xp, yp)=(3, 4), (6, 4). The control pattern PaC is applied to the two pixels Pix at the coordinates (xp, yp)=(8, 4), (11, 4). In FIG. 19, the control pattern PaG is applied to the two pixels Pix at the coordinates (xp, yp)=(3, 9), (6, 9). In FIG. 19, the control pattern PaI is applied to two pixels Pix at the coordinates (xp, yp)=(8, 9), (11, 9).

Figure 20:
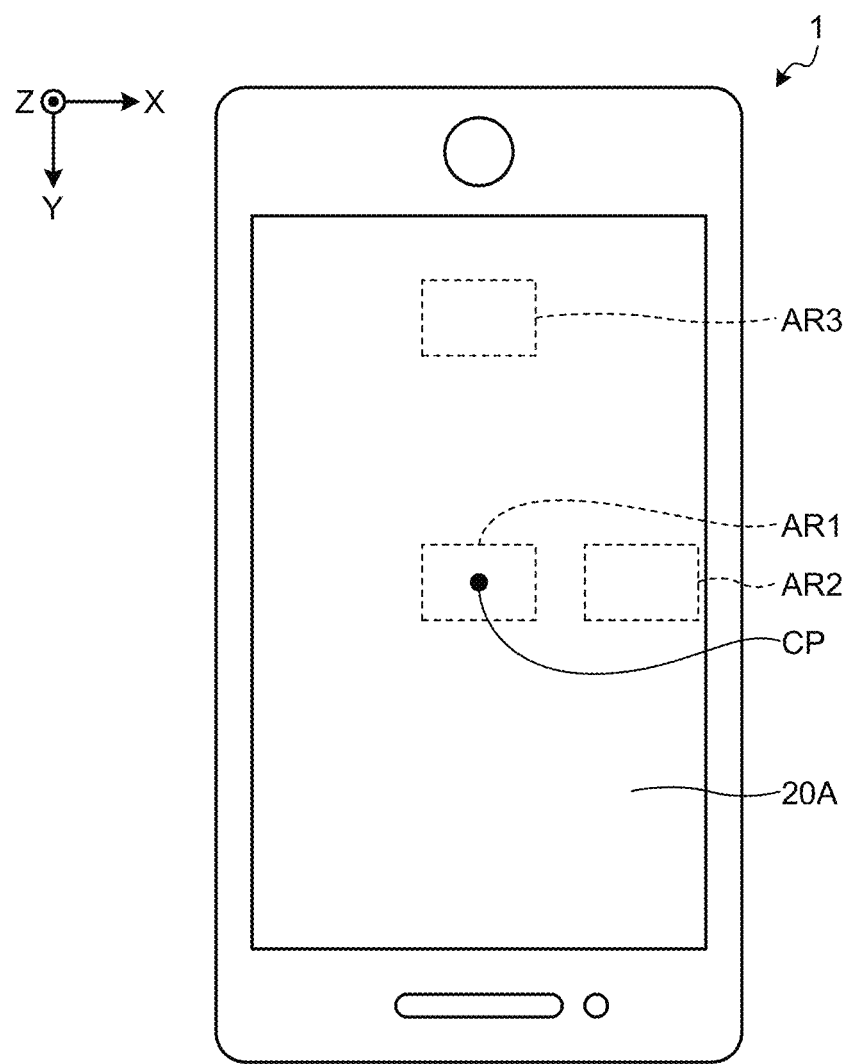
FIG. 20 is a diagram exemplarily illustrating partial regions in a display region of the display panel of the display device.

FIG. 20 is a diagram exemplarily illustrating partial regions AR1, AR2, and AR3 in the display region of the display panel 20A of the display device 1. The sub-pixel control described above with reference to FIG. 18 is applied, for example, at or near the middle point CP. For example, when the middle point CP overlaps the region AR1 of the display panel 20A at the planar viewpoint, the sub-pixel control described above with reference to FIG. 18 is applied to the region AR1. The sub-pixel control described above with reference to FIG. 19 is applied, for example, at a position closer to the viewpoint ER than the middle point CP in the X direction or at a position closer to the viewpoint EL than the middle point CP in the X direction. For example, when the middle point CP overlaps the region AR1 of the display panel 20A at the planar viewpoint, the sub-pixel control described above with reference to FIG. 19 is applied to the region AR2. Sub-pixel control in accordance with the position of the passing point UP in each pixel Pix is applied as described above with reference to FIGS. 17 to 19.

Moreover, with the sub-pixel control in accordance with the position of the passing point UP in each pixel Pix, it is possible to output an image with reduced variance in the interval between two adjacent pixels Pix each enclosing the passing point UP.

For example, in the example illustrated in FIG. 19, the X-directional interval between the pixel Pix at the xp coordinate of 3 and the pixel Pix at the xp coordinate of 6 and the X-directional interval between the pixel Pix at the xp coordinate of 8 and the pixel Pix at the xp coordinate of 11 each correspond to the length of two pixels Pix. This is referred to as a first example. The X-directional interval between the pixel Pix at the xp coordinate of 6 and the pixel Pix at the xp coordinate of 8 corresponds to the length of one pixel Pix. This is referred to as a second example. In other words, in view of the interval between two pixels Pix each enclosing the passing point UP, an interval difference corresponding to the length of one pixel Pix exists between the first example and the second example.

However, the X-directional interval between (xp, yp)=(3, 4), (6, 4) to which the control pattern PaA is applied and (xp, yp)=(8, 4), (11, 4) to which the control pattern PaC is applied, corresponds to 5/3 of the length of one pixel Pix. This is referred to as a third example. The X-directional interval between two pixels to which the control pattern PaA is applied and the X-directional interval between two pixels to which the control pattern PaC is applied, each correspond to the length of two pixels Pix. This is referred to as a fourth example. In other words, although the difference corresponding to the length of one pixel Pix exists between the first example and the second example, the difference corresponding to 1/3 of the length of one pixel Pix exists between the third example and the fourth example in which the sub-pixel control described above with reference to FIG. 17 is applied. In this manner, it is possible to more reliably prevent light transmitting through each pixel PixU from reaching a viewpoint different from an intended viewpoint by applying the sub-pixel control in accordance with the position of the passing point UP in each pixel Pix. In other words, crosstalk can be reduced. If pixels PixU that transmit light to different viewpoints are adjacent to each other or separated from each other by the length of one pixel Pix approximately when no sub-pixel control in accordance with the position of the passing point UP in each pixel Pix is applied, the probability that light transmitting through each pixel PixU reaches a viewpoint different from an intended viewpoint is considerably high. However, the probability can be lowered by applying the sub-pixel control in accordance with the position of the passing point UP in each pixel Pix.

The above describes the case in which the viewpoint EE is the viewpoint ER, using the example with R_x and R_y obtained by Expressions (21) and (22). This concept can be applied to a case in which the viewpoint EE is the viewpoint EL. Specifically, L_x and L_y obtained by Expressions (23) and (24) below may be applied in place of R_x and R_y described above.

$$L\_x = \text{shift}L\_x/pix - \text{int}(\text{shift}L\_x/pix) \quad (23)$$

$$L\_y = \text{shift}L\_y/pix - \text{int}(\text{shift}L\_y/pix) \quad (24)$$

The following describes display output control taking into consideration the orientation of a sight line from a user relative to the display panel 20A. The orientation of a sight line from a user is not necessarily orthogonal to the image display surface of the display panel 20A. Thus, with display output control assuming only a case in which the orientation of a sight line from a user is orthogonal to the image display surface of the display panel 20A, output of individual images to a plurality of viewpoints is not established in some cases.

Figure 21:
FIG. 21 is a schematic diagram illustrating an example in which output of individual images to a plurality of viewpoints is not established.

FIG. 21 is a schematic diagram illustrating an example in which output of individual images to a plurality of viewpoints is not established. The following first describes a case in which the relative angle rot is 0 degrees (°) in FIG. 21. A region Fo4 encloses no pixel Pix controlled to transmit light. Thus, output of individual images to a plurality of viewpoints is not established in the region Fo4. Such failure of output of individual images occurs more significantly when a sight line from a user points to a point of interest FaP, in particular, when the viewpoints ER and EL of the user are positioned opposite to the region Fo4 with the point of interest FaP interposed therebetween. Similarly, output of individual images to a plurality of viewpoints is not established in a region Fo5 where the relative angle rot is 45 degrees (°) and in a region Fo6 where the relative angle rot is 90 degrees (°).

Thus, in the embodiment, display output control with virtual light emission points set may be performed to increase the feasibility of individual image output to a plurality of viewpoints.

Figure 22:
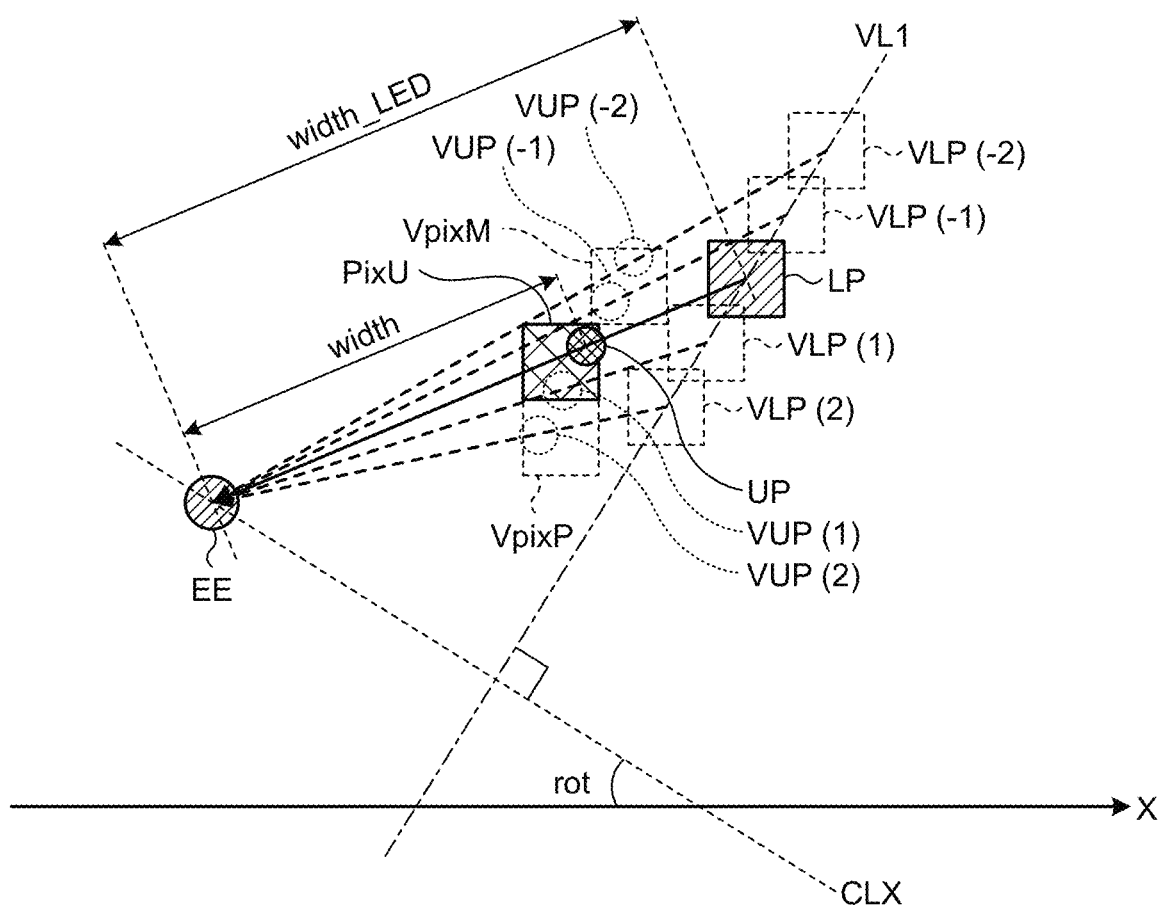
FIG. 22 is a diagram illustrating the principle of display output control with virtual light emission points set.

FIG. 22 is a diagram illustrating the principle of the display output control with virtual light emission points set. In the display output control with virtual light emission points set, virtual light emission points VLP(±k) are set with respect to the coordinates LP(i, j). The number k is a natural number. In FIG. 22, k is 1 or 2. The image output circuit 12 sets k to a natural number equal to or smaller than a predetermined maximum value (in FIG. 22, two) of k and sets the virtual light emission points VLP. When the maximum value of k is 2, virtual light emission points VLP(2), VLP(1), VLP(−1), and VLP(−2) are set as illustrated in FIG. 22.

The coordinates of each virtual light emission point VLP(+k) can be expressed as (x, y)=(itk, jtk) with respect to the coordinates LP(i, j). The number itk does not mean a shift of i by k pixels Pix in the X direction. The number itk is obtained by Expression (25) below. In addition, the number jtk does not mean a shift of i by k pixels Pix in the Y direction. The number jtk is obtained by Expression (26) below. In Expression (26), PPY represents the width of one pixel Pix in the Y direction.

$$itk = \text{offset} + (\text{pitch} \times i) + k \times PP \times \sin(rot) \quad (25)$$

$$jtk = \text{offset\_Y} + (\text{pitch\_Y} \times i) + k \times PPY \times \cos(rot) \quad (26)$$

As illustrated in FIG. 22, the virtual light emission points VLP(±k) are arranged on a virtual straight line VL1. The virtual straight line VL1 is a straight line passing through the light emission point LP and is orthogonal to the reference line CLX. The image output circuit 12 can derive the reference line CLX based on the coordinates of the middle point CP and the relative angle rot (or the angle pos_r and the angle dev_rot).

The image output circuit 12 regards, as the coordinates LP(i, j), (itk, jtk) expressed as (x, y)=(itk, jtk) and obtained by Expressions (23) and (24) described above, and calculates (shiftR_x, shiftR_y) and (shiftL_x, shiftL_y) based on Expressions (9) to (20) described above, thereby calculating the pixel PixU corresponding to the virtual light emission point VLP(+k). Specifically, the image output circuit 12 calculates (shiftR_x, shiftR_y) in a case in which the viewpoint EE illustrated in FIG. 22 is the viewpoint ER. The image output circuit 12 calculates (shiftL_x, shiftL_y) in a case in which the viewpoint EE illustrated in FIG. 22 is the viewpoint EL.

A pixel VpixP illustrated in FIG. 22 is the pixel PixU corresponding to the virtual light emission point VLP(2). A pixel VpixM illustrated in FIG. 22 is the pixel PixU corresponding to the virtual light emission point VLP(−1) and the virtual light emission point VLP(−2). A pixel PixU corresponds to the virtual light emission point VLP(1).

The image output circuit 12 provides a pixel signal obtained from the viewpoint correspondence image OP to the pixel PixU corresponding to a light emission point LP. In addition, the image output circuit 12 provides, to the pixels PixU (for example, the pixel VpixP and the pixel VpixM described above) corresponding to the virtual light emission point VLP(±k) derived based on the light emission point LP, a pixel signal identical to the pixel signal provided to the pixels PixU corresponding to the light emission point LP.

In FIG. 22, a total of four virtual light emission points VLP(2), VLP(1), VLP(−1), and VLP(−2) are set as virtual light emission points VLP(±k) in the case of k=2, but the derived pixels PixU are the two above-described pixels VpixP and pixel VpixM. This is because there can be a plurality of passing points UP (virtual passing points VUP (±k)) that pass through the same pixel Pix among the passing points UP corresponding to the respective virtual light emission points VLP(±k). In addition, among the passing points UP (virtual passing points VUP (k)) corresponding to the respective virtual light emission point VLP(±k), there can be a passing point UP positioned in a pixel PixU including a passing point UP derived corresponding to the position of an actual light emission point LP that is not virtual. In FIG. 22, the pixel PixU corresponding to the virtual light emission point VLP(1) is the same as a pixel PixU including a passing point UP derived corresponding to the position of an actual light emission point LP that is not virtual.

Figure 23:
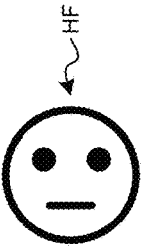
FIG. 23 is a schematic diagram illustrating an example in which the display output control with virtual light emission points set, which is described with reference to FIG. 22, is applied based on input of an image on which the display output control illustrated in FIG. 21 is performed.

FIG. 23 is a schematic diagram illustrating an example in which the display output control with virtual light emission points set, which is described above with reference to FIG. 22, is applied based on input of an image on which the display output control illustrated in FIG. 21 is performed. In FIG. 23, first pixels PixCC are a set of pixels Pix when the first pixels PixC illustrated in FIG. 21 are regarded as left-eye pixels PixU corresponding to light emission points LP and the processing in FIG. 22 is executed for each light emission point. In FIG. 23, second pixels PixDC are a set of pixels Pix when the second pixels PixD illustrated in FIG. 21 are regarded as right-eye pixels PixU corresponding to light emission points LP and the processing in FIG. 22 is executed for each light emission point.

When the display output control with virtual light emission points set, which is described above with reference to FIG. 22, is applied, light L3 passes through each first pixel PixCC and light L4 passes through each second pixel PixDC as illustrated in FIG. 23. Thus, the light L3 and the light L4 reach different viewpoints (for example, the first viewpoint EC and the second viewpoint ED), respectively, and whereby, output of individual images to a plurality of viewpoints is established. In this manner, when the display output control with virtual light emission points set is applied, the feasibility of individual image output to a plurality of viewpoints increases irrespective of the position of the point of interest FaP and a tilt of the point of interest FaP relative to the image display surface of the display panel 20A.

In FIG. 22, the passing points UP corresponding to the virtual light emission points VLP(±k) are illustrated as virtual passing point VUP(±k). For example, a virtual passing point VUP(2) is a passing point UP when it is regarded that a light emission point LP is positioned at the virtual light emission point VLP(2).

In display output control of the display panel 20A, the image output circuit 12 may apply both the display output control with virtual light emission points set, which is described above with reference to FIG. 22, and the sub-pixel control described above with reference to FIG. 17. Information indicating the positional relation between the passing points UP corresponding to the virtual light emission points VLP(±k) and pixels Pix including the passing points UP is obtained by Expressions (21) to (24) described above. Specifically, in a case in which the viewpoint EE is the viewpoint ER, the image output circuit 12 calculates the determination variables R_x and R_y based on Expressions (21) and (22). In a case in which the viewpoint EE is the viewpoint EL, the image output circuit 12 calculates the determination variables L_x and L_y based on Expressions (23) and (24). The image output circuit 12 may apply the sub-pixel control described above with reference to FIG. 17 in accordance with the determination variables R_x and R_y of each of the passing points UP for the pixels PixU including the passing points UP corresponding to the virtual light emission points VLP(±k). In this case, the image output circuit 12 applies the sub-pixel control described above with reference to FIG. 17 in accordance with the determination variables L_x and L_y of each of the passing points UP for the pixels PixU including the passing points UP corresponding to the virtual light emission points VLP(±k), as well.

In display output control of the display panel 20A, when the display output control with virtual light emission points set, which is described above with reference to FIG. 22, and the sub-pixel control described above with reference to FIG. 17 are both applied, the display output control with virtual light emission points set, which is described above with reference to FIG. 22, is applied first. Then, the sub-pixel control described above with reference to FIG. 17 is applied to the pixel PixU corresponding to the light emission point LP and the pixels PixU (for example, the pixel VpixP and the pixel VpixM illustrated in FIG. 22) corresponding to the respective virtual light emission points VLP(±k) derived based on the light emission point LP.

Figure 24:
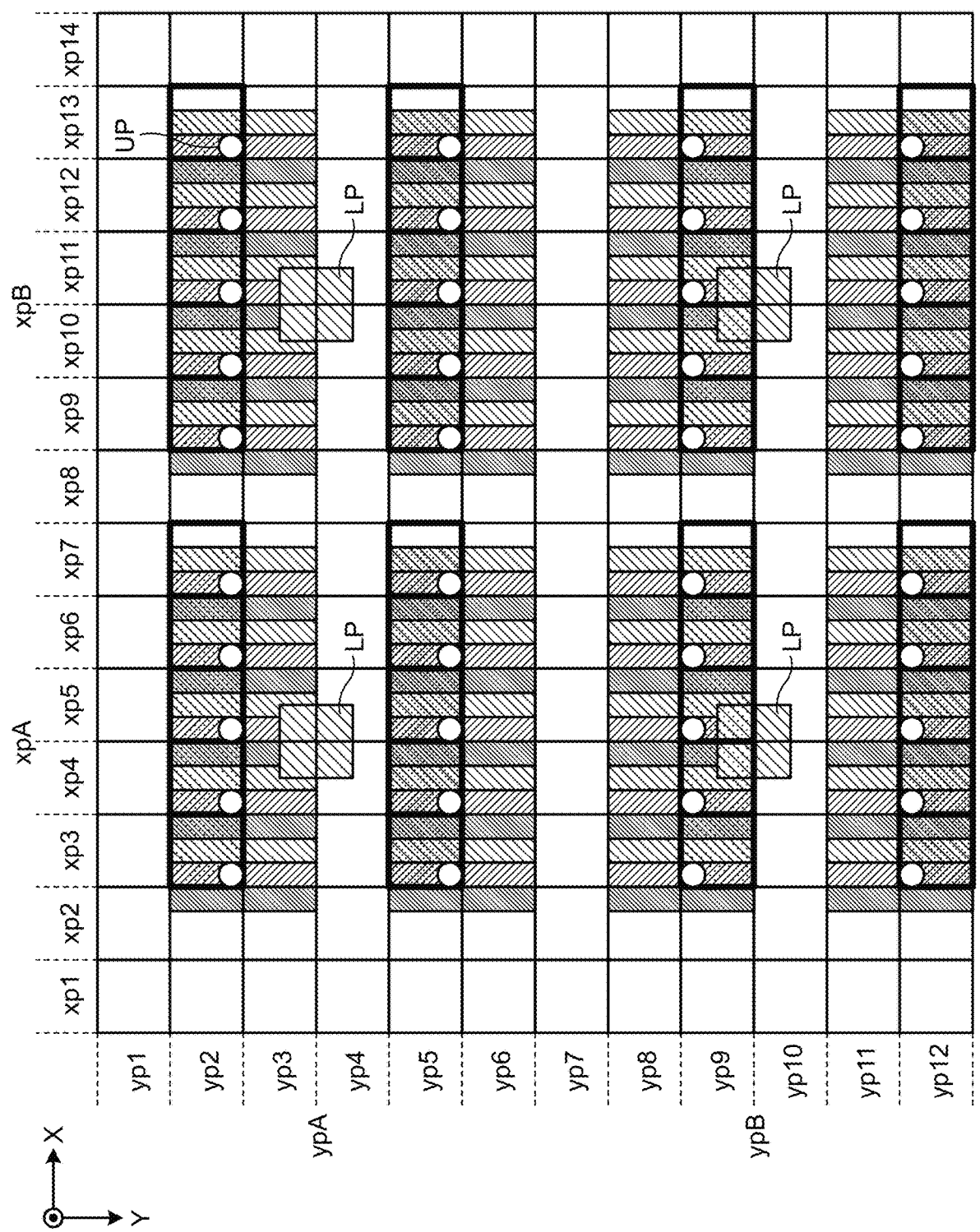
FIG. 24 is a diagram illustrating an example of display output in which the sub-pixel control described with reference to FIG. 17 and the display output control, with virtual light emission points set, described with reference to FIG. 22, are applied.
Figure 25:
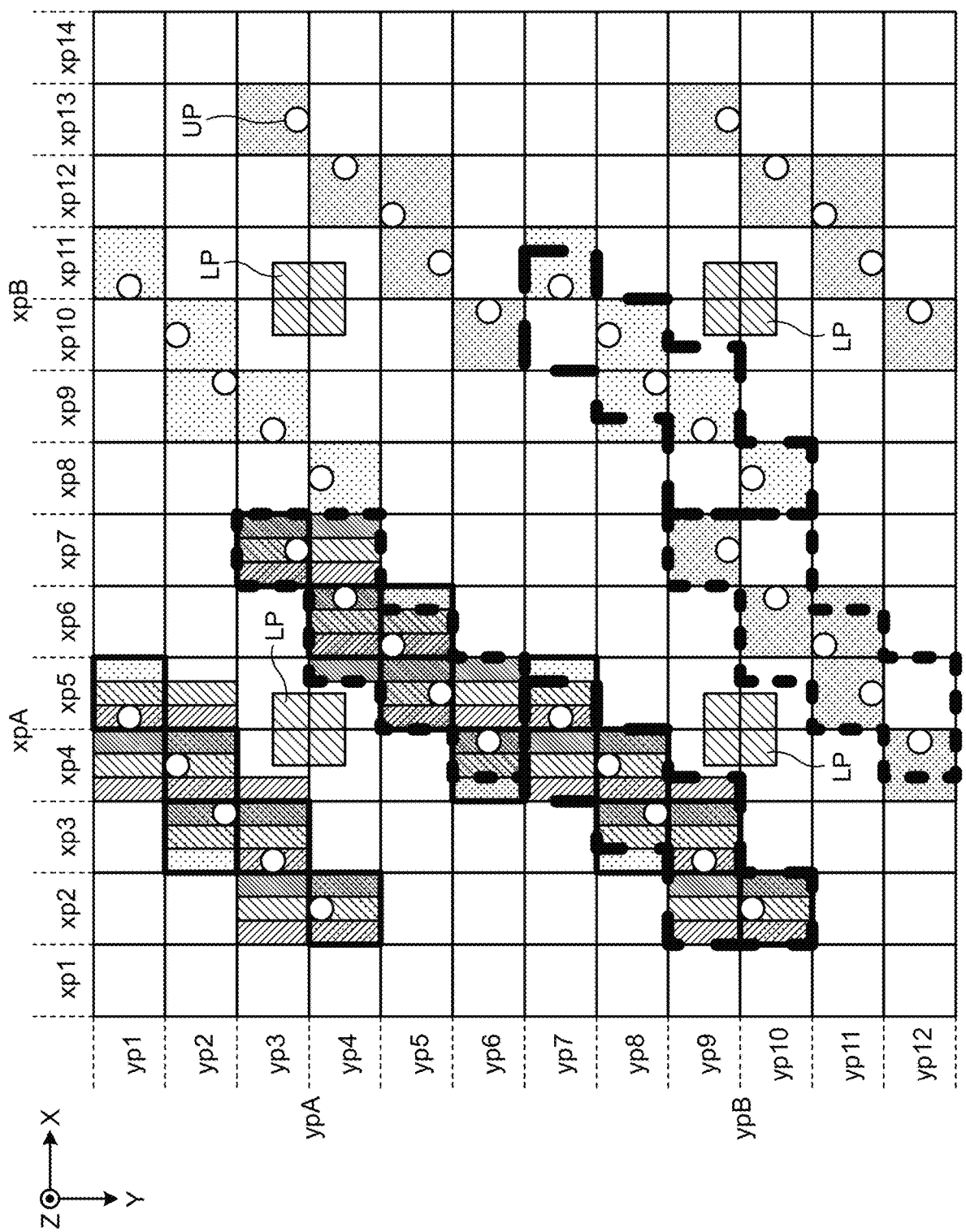
FIG. 25 is a diagram illustrating an example of display output in which the sub-pixel control described with reference to FIG. 17 and the display output control with virtual light emission points set, described with reference to FIG. 22, are applied.
Figure 26:
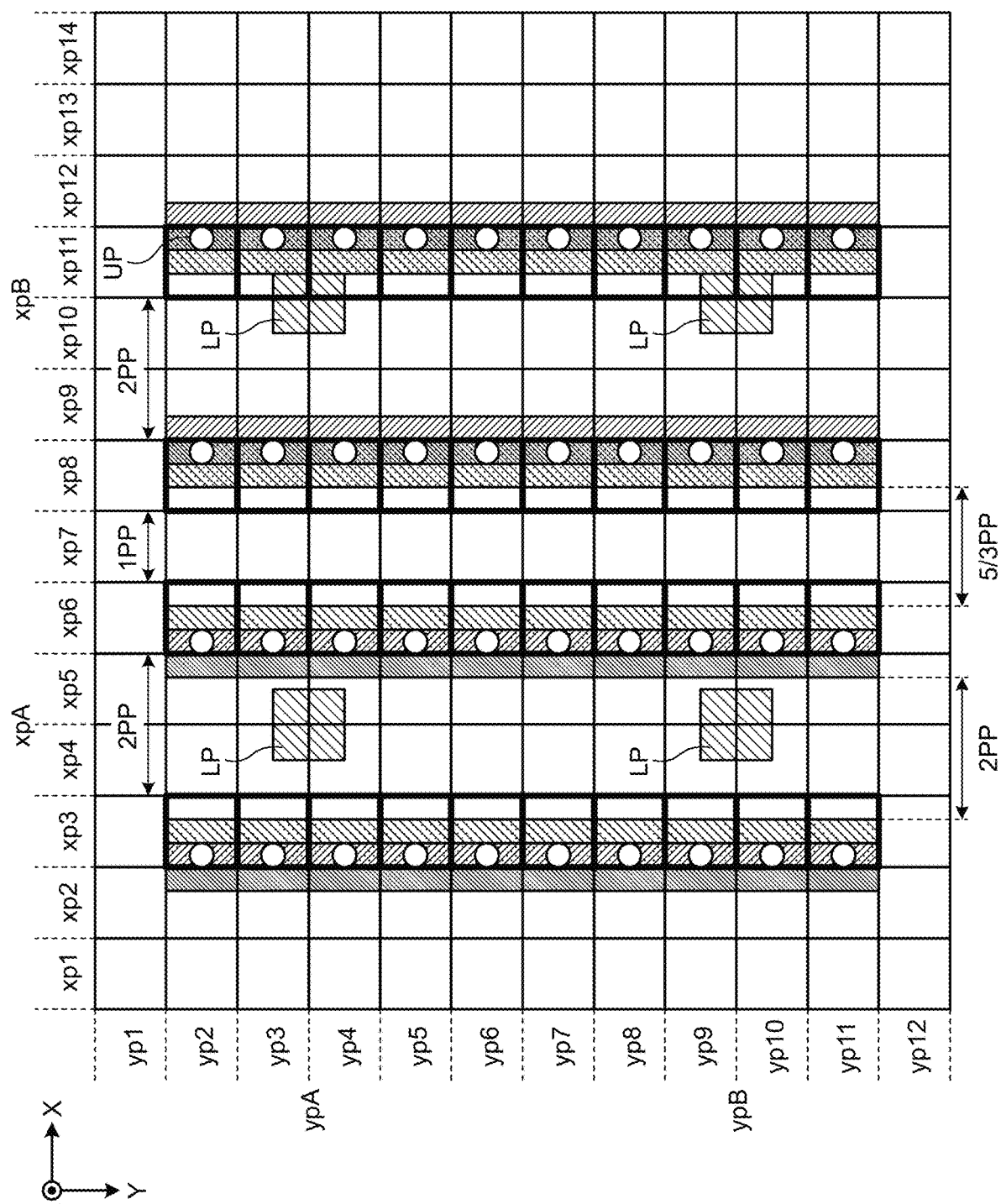
FIG. 26 is a diagram illustrating an example of display output in which the sub-pixel control described with reference to FIG. 17 and the display output control with virtual light emission points set, described with reference to FIG. 22, are applied.

FIGS. 24 to 26 are diagrams illustrating an example of display output in which the sub-pixel control described above with reference to FIG. 17 and the display output control with virtual light emission points set, which is described above with reference to FIG. 22, are applied. Each passing point UP illustrated in FIGS. 24 to 26 is a passing point UP corresponding to a light emission point LP or a passing point UP corresponding to each virtual light emission point VLP(±k). For example, when the middle point CP overlaps the region AR1 of the display panel 20A at the planar viewpoint, the sub-pixel control described above with reference to FIG. 24 is applied to the region AR1. In this case, the sub-pixel control described above with reference to FIG. 26 is applied to the region AR3.

For example, in FIG. 24, since the display output control with virtual light emission points set, which is described above with reference to FIG. 22, is applied, a passing point UP is positioned in a pixel PixU at coordinates having any of xp coordinates of 3 to 7 and 9 to 13 and any of yp coordinates of 2, 5, 9, and 12. The control pattern PaG in the sub-pixel control described above with reference to FIG. 17 is applied to the pixels PixU at the yp coordinates of 2 and 5 among the above-described pixels PixU. In addition, the control pattern PaA in the sub-pixel control described above with reference to FIG. 17 is applied to the pixels PixU at the yp coordinates of 9 and 12 among the above-described pixels PixU.

In FIG. 25, exemplary display output when the sub-pixel control described above with reference to FIG. 17 is applied and exemplary display output when the sub-pixel control described above with reference to FIG. 17 is not applied are illustrated intentionally in a comparative manner. The exemplary display output, when the sub-pixel control described above with reference to FIG. 17 is applied, is illustrated with solid lines or dashed lines thicker than lattice lines that partition coordinates.

In the same manner as FIG. 19, FIG. 26 illustrates an example in which image output with reduced variance in the interval between two adjacent pixels Pix each enclosing the passing point UP can be performed by applying the sub-pixel control in accordance with the position of the passing point UP in each pixel Pix.

When sub pixels controlled to transmit light by applying the sub-pixel control described above with reference to FIG. 17 overlap at a plurality of passing points UP, a pixel signal for controlling the sub pixel such that a higher degree of transmission is allocated to the sub pixel may be prioritized, or control adapted to the sum value of gradation values indicated by pixel signals for the same sub pixel may be applied to the sub pixel. However, when the sum value of the gradation values exceeds a highest gradation value, the highest gradation value is applied.

Figure 27:
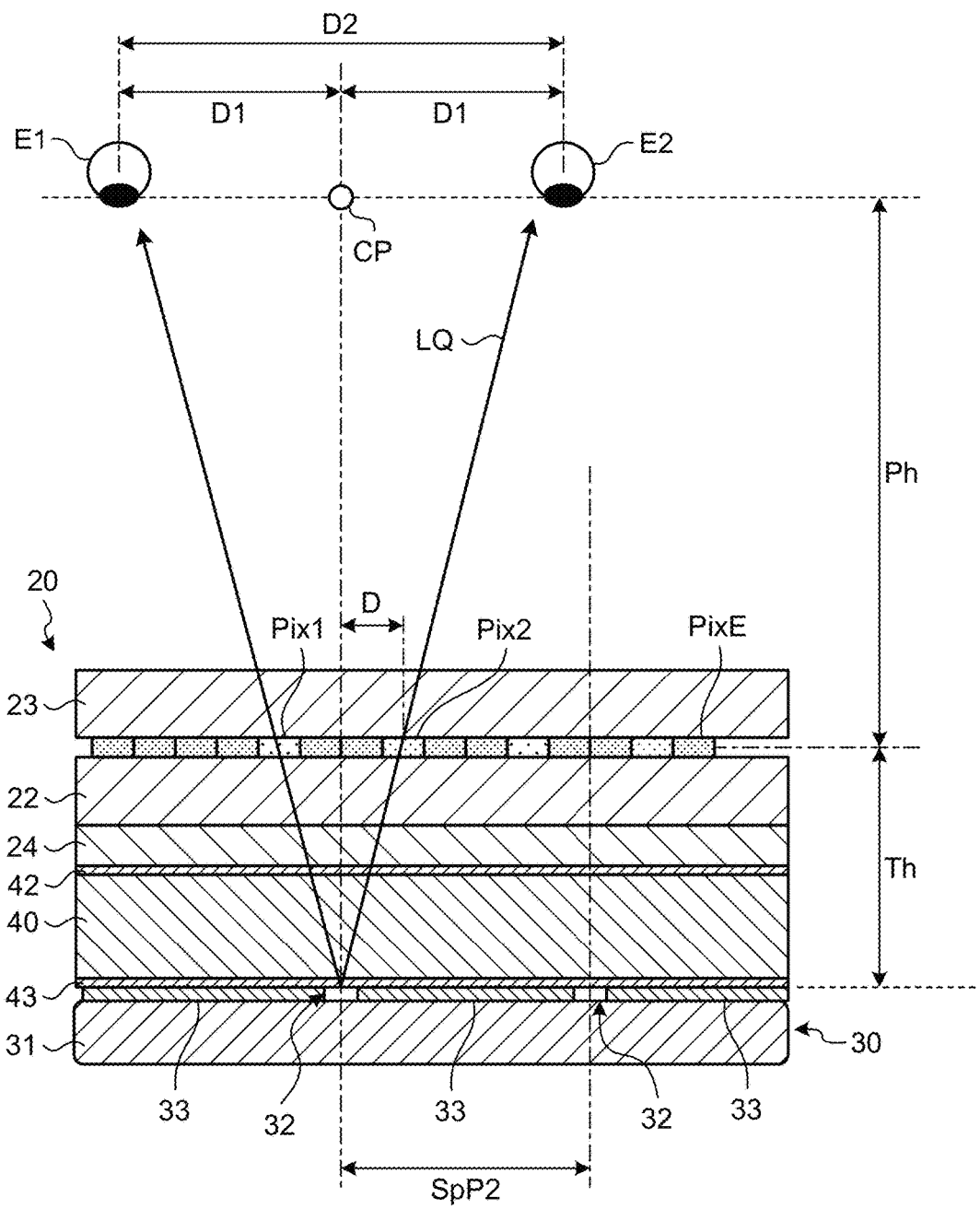
FIG. 27 is a schematic diagram illustrating a distance Th determined such that the ratio of the value of a distance D1 to the summed value of a distance Ph and the distance Th is equal to the ratio of the value of the distance Th to the value of a distance D.

The following describes the method of determining the distance Th when designing the display device with reference to FIG. 27.

FIG. 27 is a schematic diagram illustrating the distance Th determined so that the ratio of the value of the distance D1 to the summed value of the distance Ph and the distance Th is equal to the ratio of the value of the distance Th to the value of a distance D. The distance D in FIG. 27 is the X-directional distance from an intersection between the Z-directional center line of a pixel Pix and the emission line LQ to the middle point CP. The emission line LQ is the emission line of light reaching a viewpoint (for example, the second viewpoint E2) at the distance D1 in the X direction to the middle point CP at a position separated from a pixel Pix by the distance Ph in the Z direction and is the emission line of light emitted from a light emission point LP (for example, a light emission point 32) at a position opposite to the middle point CP in the Z direction. A straight line connecting the center of a light emission point as the start point of the emission line LQ and the middle point CP is parallel to the Z direction (orthogonal to the XY plane). In FIG. 27, Expression (27) of ratios below is satisfied. In Expression (27), D represents the value of the distance D.

$$(Th+Ph):D1=Th:D \quad (27)$$

Expression (28) below is satisfied based on Expression (27) described above.

$$D\times(Th+Ph)=D1\times Th \quad (28)$$

Expression (29) below is satisfied based on Expression (28) described above.

$$(D1-D)\times Th=D\times Ph \quad (29)$$

Expression (30) below is satisfied based on Expression (29) described above. As in Expression (30), the value of the distance Th can be derived based on the value (pos_h) of the distance Ph, the value of the distance D1, and the value of the distance D.

$$Th=Ph\times D/(D1-D) \quad (30)$$

The value of the distance Ph can be the value of a distance typically assumed as the distance between the display device 1 and a user viewing an image on the display device 1. For example, when the display device 1 is provided in a portable terminal device such as a smartphone, for example, 30 cm (300 mm) is assumed as the distance Ph. The value of the distance D1 can be ½ of the average value of the distance (distance D2) between the eyes of a human. As a specific example, D2=62.5 mm, in other words, D1=31.25 mm is assumed. The value of the distance Ph and the value of the distance D1 are merely exemplary and the present disclosure is not limited thereto, and thus the values are changeable as appropriate.

An assumed value can be derived for the value of the distance D in accordance with the relation between the pitch (for example, the light emission point pitch SpP or the light emission point pitch SpP2) of light emission points LP and the pixel pitch PP. For example, when the relation between the pitch of light emission points LP and the pitch of pixels Pix is 6n:1, the distance D is assumed to be about 1.5n times longer than the pixel pitch PP {D=(1.5n) PP} as illustrated in FIG. 27. When the relation between the pitch of light emission points LP and the pitch of pixels Pix is 4n:1, the distance D is assumed to be substantially equal to the pixel pitch PP (D=nPP). Thus, the distance Th can be derived based on the value of the distance Ph and the value of the distance D1 assumed as described above, the relation between the pitch of light emission points LP and the pitch of pixels Pix, and the pixel pitch PP. The Z-directional thickness of any component included in the spacer 40 is adjusted in accordance with the distance Th derived in this manner, thereby obtaining the display panel 20 in accordance with the distance Th corresponding to an assumed condition. The distance D and the distance Th can be derived by the same method for the display panel 20A as well. Depending on an actual use situation and the individual difference among users, the distance Ph and the distance D1 are likely to be different from the above-described values determined in designing in some degree, but it is needless to say that the above-described display device manufactured based on the design has redundancy corresponding to the difference in such usage.

The derivation of the value of the distance Th based on Expression (30) does not consider light refraction that occurs at the interface between the display panel 20 and air interposed between the display panel 20 and the user. Thus, it is possible to more highly accurately reduce crosstalk by determining the distance Th based on further consideration of influence of such refraction on the emission line of light.

The above description is made on a configuration in which the ratio of the pitch of a plurality of pixels arranged in a predetermined direction to the pitch of a plurality of light emission points arranged in the predetermined direction is 1:4n or 1:6n. The following description with reference to FIGS. 28 to 38 will be made on a configuration in which the ratio of the pitch of a plurality of pixels in a predetermined direction to the pitch of a plurality of light emission points in the predetermined direction that are "turned on when an image is displayed" for visual recognition of an individual image at each of a plurality of viewpoints is 1:4n or 1:6n and a larger number of a plurality of light emission points that are "not necessarily turned on when an image is displayed" are provided.

The above-described configuration of the display device 1 is merely an example of the embodiment and the present disclosure is not limited thereto. For example, a point light source may be provided at the position of each light emission point LP. Specifically, the specific configuration of each light emission point LP may be the point light source. The point light source is, for example, a minute LED called a mini LED or a micro LED, but the present disclosure is not limited thereto and the point light source may be achieved by another light-emitting element (for example, an organic light emitting diode (OLED)) or the like. When the point light source is provided at the position of each light emission point LP, the light source 30 has, for example, a configuration including a plurality of point light sources and a substrate on which the point light sources are mounted. In the following description with reference to FIGS. 28 to 38, each of a plurality of light emission points LP is a point light source that is individually switchable between a turned-on state and a turned-off state.

Figure 28:
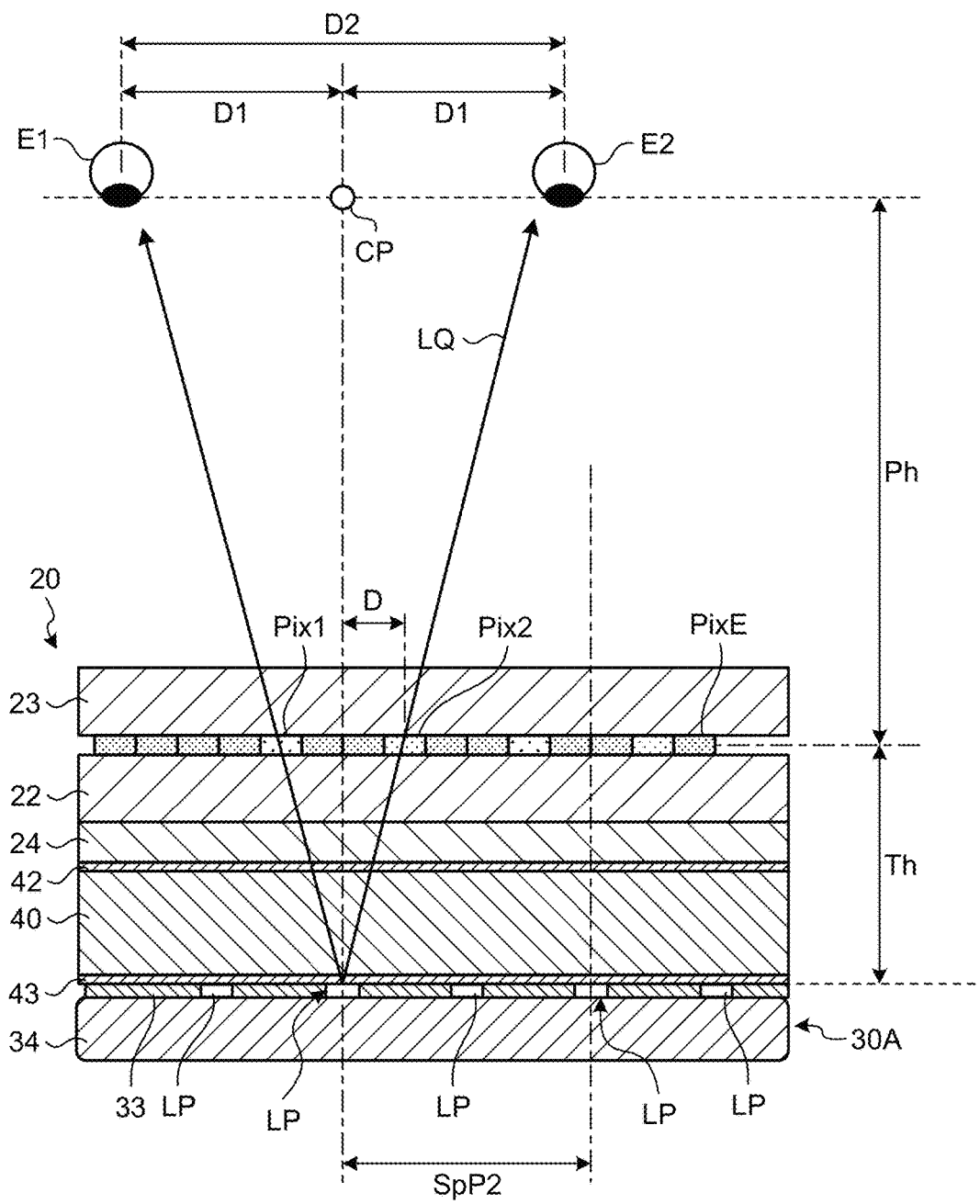
FIG. 28 is a schematic sectional view illustrating an exemplary configuration in which the ratio of the pitch of a plurality of pixels in a predetermined direction and the pitch of a plurality of light emission points in the predetermined direction that are "turned on when an image is displayed" for visual recognition of an individual image at each of a plurality of viewpoints is 1:4n or 1:6n and a larger number of a plurality of light emission points that are "not necessarily turned on when an image is displayed" are provided.

FIG. 28 is a schematic sectional view illustrating an exemplary configuration in which the ratio of the pitch of a plurality of pixels in a predetermined direction to the pitch of a plurality of light emission points in the predetermined direction that are "turned on when an image is displayed" for visual recognition of an individual image at each of a plurality of viewpoints is 1:4n or 1:6n and a larger number of a plurality of light emission points that are "not necessarily turned on when an image is displayed" are provided. In a light source 30A illustrated in FIG. 28, the light emission points 32 in the light source 30 illustrated in FIG. 27 are replaced with light emission points LP. In the light source 30A, the surface light source 31 in the light source 30 is replaced with a substrate 34. The substrate 34 is a substrate on which the light emission points LP as point light sources are mounted. The relation between the pitch of pixels Pix in the X direction and the pitch of light emission points LP included in the light source 30A in the X direction is 1:3. In the configuration illustrated in FIG. 28, the relation between the pitch of a plurality of pixels in a predetermined direction and the pitch of a plurality of light emission points in the predetermined direction that are "turned on when an image is displayed" for visual recognition of an individual image at each of a plurality of viewpoints is 1:6. Specifically, a light emission point LP that emits light and a light emission point LP that does not emit light when an image is displayed are alternately arranged in the X direction. In other words, not all the plurality of light emission points arranged in the predetermined direction are turned on but every other light emission point is turned on.

The relation between the pitch of pixels Pix and the pitch of light emission points LP in the X direction, which is illustrated in FIG. 28, may be the same in the Y direction. Moreover, the relation between the pitch of pixels Pix in a predetermined direction and the pitch of light emission points LP included in the light source 30A in the predetermined direction is not limited to 1:3 but may be, for example, 1:2n or 1:3n.

Figure 29:
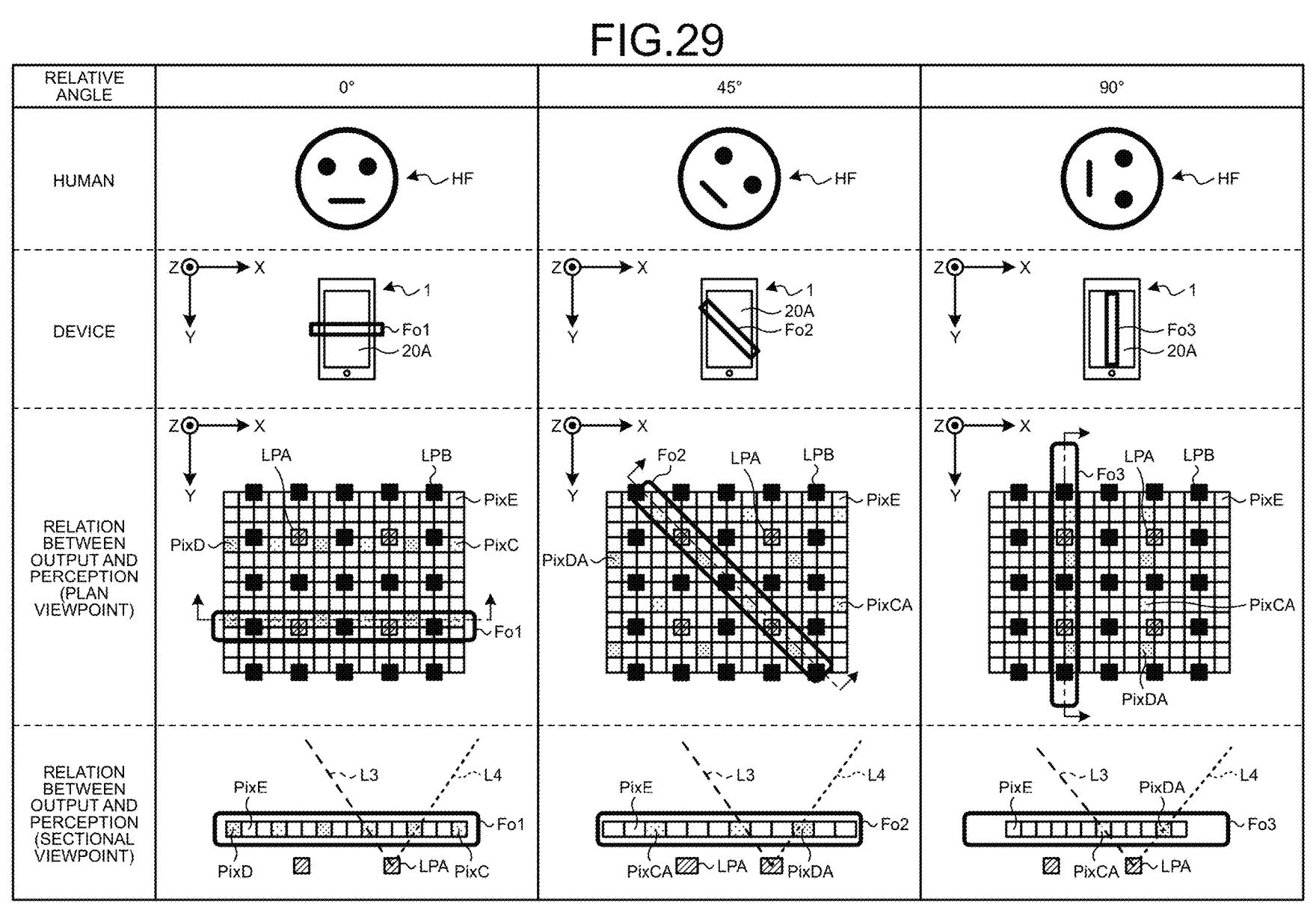

FIG. 29 is a schematic diagram illustrating an example of the relation between the relative angle rot and the feasibility of individual image output to a plurality of viewpoints when the disposition control described with reference to FIGS. 10 and 11 is reflected in a case in which the relation between the pitch of pixels Pix and the pitch of light emission points LP included in the light source 30A is 1:2 in each of the X and Y directions. In FIG. 29 and the other drawings, among the light emission points LP, light emission points LP controlled to emit light are referred to as turned-on points LPA, and light emission points LP controlled not to emit light are referred to as turned-off points LPB.

As illustrated in FIG. 29, the turned-on points LPA and the turned-off points LPB are alternately arranged in each of the X and Y directions. Specifically, the ratio of the pitch of pixels Pix to the pitch of light emission points LP is 1:2, whereas the ratio of the pitch of pixels Pix to the pitch of turned-on points LPA is 1:4. Accordingly, similarly to the case described with reference to FIG. 12, output of individual images to a plurality of viewpoints can be achieved.

It may be determined as appropriate which of the light emission points LP included in the light source 30A is set as a turned-on point LPA or a turned-off point LPB.

Figure 30:
FIG. 30 is a schematic view illustrating an example of the relation between turned-on points and turned-off points.

FIG. 30 is a schematic view illustrating an example of the relation between the turned-on points LPA and the turned-off points LPB. The turned-on points LPA can be selected in four patterns as illustrated in Examples 1, 2, 3 and 4 in FIG. 30 from among the light emission points LP disposed in a matrix of rows and columns in the X and Y directions in the light source 30A. Whichever Examples 1, 2, 3 and 4 are employed, output of individual images to a plurality of viewpoints can be achieved by applying, in accordance with the disposition of the turned-on points LPA, operation control of the display panel 20 or 20A based on the derivation of the coordinates R_(i, j) and L_(i, j) described with reference to FIG. 13.

In the configuration in which the ratio of the pitch of a plurality of pixels in a predetermined direction to the pitch of a plurality of light emission points in the predetermined direction that are "turned on when an image is displayed" for visual recognition of an individual image at each of a plurality of viewpoints is 1:4n or 1:6n and a larger number of a plurality of light emission points that are "not necessarily turned on when an image is displayed" are provided, a larger number of light emission points may be turned on in a range in which it is possible to maintain a visually recognizable state of an individual image at each of a plurality of viewpoints.

Figure 31:
FIG. 31 is a schematic diagram illustrating an exemplary application of control to turn on a larger number of light emission points in a range in which it is possible to maintain a visually recognizable state of an individual image at each of a plurality of viewpoints.

FIG. 31 is a schematic diagram illustrating an exemplary application of control to turn on a larger number of light emission points in a range in which it is possible to maintain a visually recognizable state of an individual image at each of a plurality of viewpoints. User recognition of regions Fo1, Fo2, and Fo3 illustrated in FIG. 31 is the same as described with reference to FIG. 12. A row of light emission points LP means a plurality of light emission points LP arranged in the X direction. Specifically, one row of light emission points LP includes a plurality of light emission points LP arranged in the X direction and one light emission point LP arranged in the Y direction. A column of light emission points LP means a plurality of light emission points LP arranged in the Y direction. Specifically, one column of light emission points LP includes one light emission point LP arranged in the X direction and a plurality of light emission points LP arranged in the Y direction.

In an example in which the relative angle rot is 0 degrees (°) or 45 degrees (°) among the examples illustrated in FIG. 31, all light emission points LP included in each column of light emission points LP in which a light emission point LP turned on in FIG. 12 is included are controlled to be turned-on points LPA. In addition, in the example in which the relative angle rot is 0 degrees (°) or 45 degrees (°), all light emission points LP included in each column of light emission points LP in which a light emission point LP not turned on in FIG. 12 is included are controlled to be turned-off points LPB.

In an example in which the relative angle rot is 90 degrees (°) among the examples illustrated in FIG. 31, all light emission points LP included in each row of light emission points LP in which a light emission point LP turned on in FIG. 12 is included are controlled to be turned-on points LPA. In addition, in the example in which the relative angle rot is 90 degrees (°) all light emission points LP included in each row of light emission points LP in which a light emission point LP not turned on in FIG. 12 is included are controlled to be turned-off points LPB.

In the examples illustrated in FIG. 31, operation control of the display panel 20 or 20A based on the derivation of the coordinates R_(i, j) and L_(i, j) described with reference to FIG. 13 is individually applied to all turned-on points LPA irrespective of the relative angle rot. Accordingly, in an example in which the relative angle rot is 0 degrees (°), output for visual recognition of an individual image at each of a plurality of viewpoints can be performed also in a region Fo7 different from the region Fo1. In an example in which the relative angle rot is 45 degrees (°), output for visual recognition of an individual image at each of a plurality of viewpoints can be performed in a region Fo8 different from the region Fo2. In an example in which the relative angle rot is 90 degrees (°), output for visual recognition of an individual image at each of a plurality of viewpoints can be performed in a region Fo9 different from the region Fo3.

In this manner, according to the examples illustrated in FIG. 31, a region in which output for visual recognition of an individual image at each of a plurality of viewpoints can be performed can be expanded as compared to the examples illustrated in FIG. 12. Moreover, according to the examples illustrated in FIG. 31, the amount of light from light emission points LP used for output for visual recognition of an individual image at each of a plurality of viewpoints can be increased as compared to the examples illustrated in FIG. 12. Thus, according to the examples illustrated in FIG. 31, a brighter image can be visually recognized at each of a plurality of viewpoints than in the examples illustrated in FIG. 12.

As illustrated in the row "light source control" in FIG. 31, Example 1+Example 2 or Example 3+Example 4 is employed in the example in which the relative angle rot is 0 degrees (°) or 45 degrees (°). Example 1+Example 3 or Example 2+Example 4 is employed in the example in which the relative angle rot is 90 degrees (°). An expression "Example Φ+Example Ψ" in the row of "light source control" means such control of light emission points LP that, among the plurality of light emission points LP included in the light source 30A, both the turned-on points LPA in "Example Φ" and the turned-on points LPA in "Example Ψ" described above with reference to FIG. 30 are controlled to be turned-on points LPA and the other light emission points LP are controlled to be turned-off points LPB. The symbols Φ and Ψ represent a natural number of 1 to 4. In addition, Φ and Ψ are different from each other. For example, "Example 1+Example 2" is such control of light emission points LP that, among the plurality of light emission points LP included in the light source 30A, both the turned-on points LPA in "Example 1" and the turned-on points LPA in "Example 2" described above with reference to FIG. 30 are controlled to be turned-on points LPA and the other light emission points LP are controlled to be turned-off point LPB.

Figure 32:
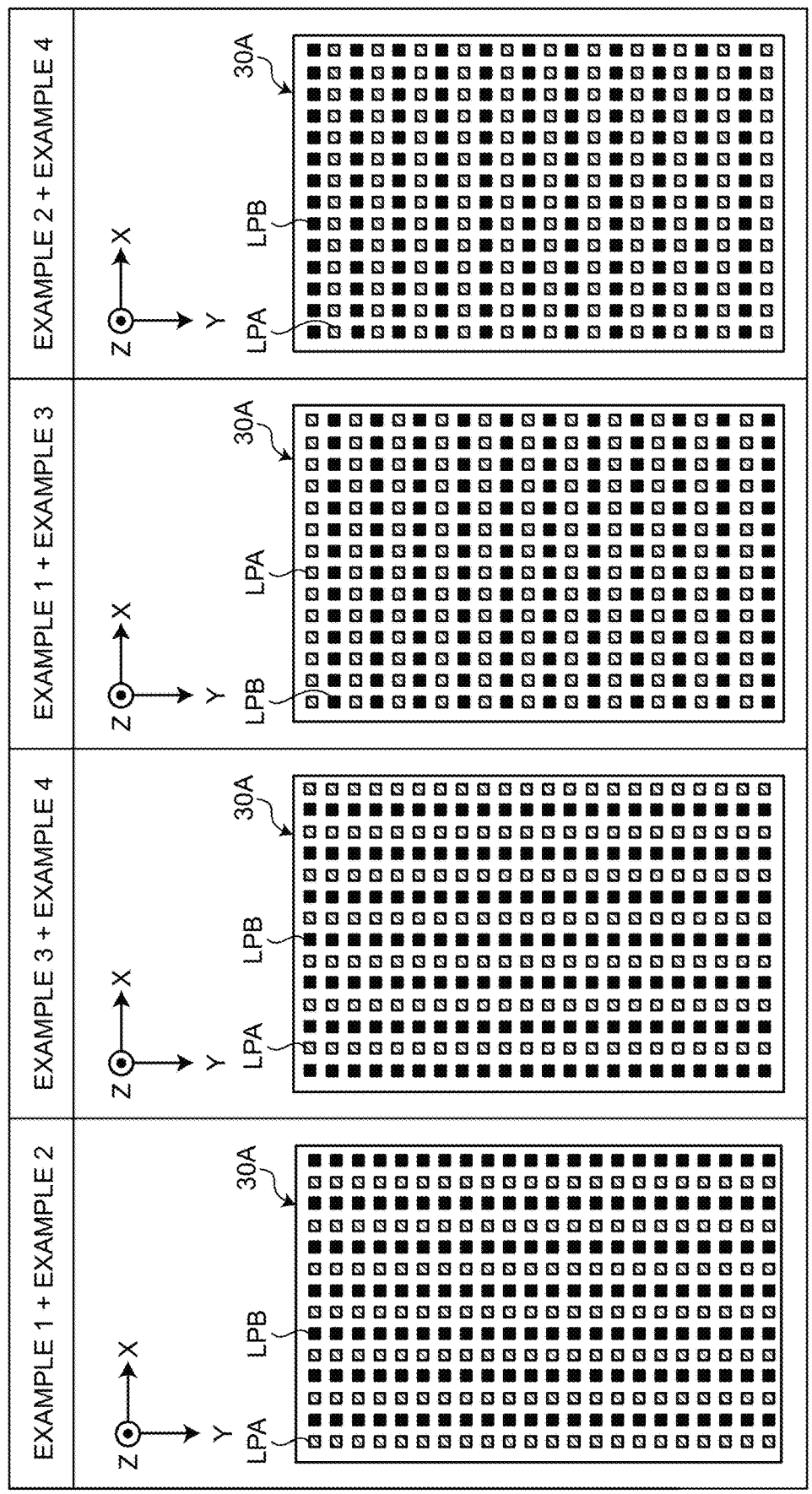
FIG. 32 is a schematic view illustrating positions of turned-on and turned-off points when light source control of Example Φ+Example Ψ is applied.

FIG. 32 is a schematic view illustrating positions of turned-on points LPA and turned-off points LPB when the light source control of Example Φ+Example Ψ is applied. In "Example 1+Example 2" and "Example 3+Example 4" in FIG. 32, columns of turned-on points LPA and columns of turned-off points LPB are alternately arranged in the X direction. A column of turned-on points LPA means a column of light emission points LP in which all included light emission points LP are turned-on points LPA. A column of turned-off points LPB means a column of light emission points LP in which all included light emission points LP are turned-off points LPB.

In "Example 1+Example 3" and "Example 2+Example 4" in FIG. 32, rows of turned-on points LPA and rows of turned-off points LPB are alternately arranged in the Y direction. A row of turned-on points LPA means a row of light emission points LP in which all included light emission points LP are turned-on points LPA. A row of turned-off points LPB means a row of light emission points LP in which all included light emission points LP are turned-off points LPB.

In the description with reference to FIG. 31, the display output control with virtual light emission points set, described above with reference to FIG. 22, is not applied in position determination of a first pixel PixC and a second pixel PixD (or a first pixel PixCA and a second pixel PixDA) corresponding to the position of a turned-on point LPA. The "display output control with virtual light emission points set" may be additionally applied in operation control of the display panel 20 or 20A in which the light source control to generate columns of turned-on points LPA or rows of turned-on points LPA as in the examples illustrated in FIG. 31 is applied to the light source 30A.

Figure 33:
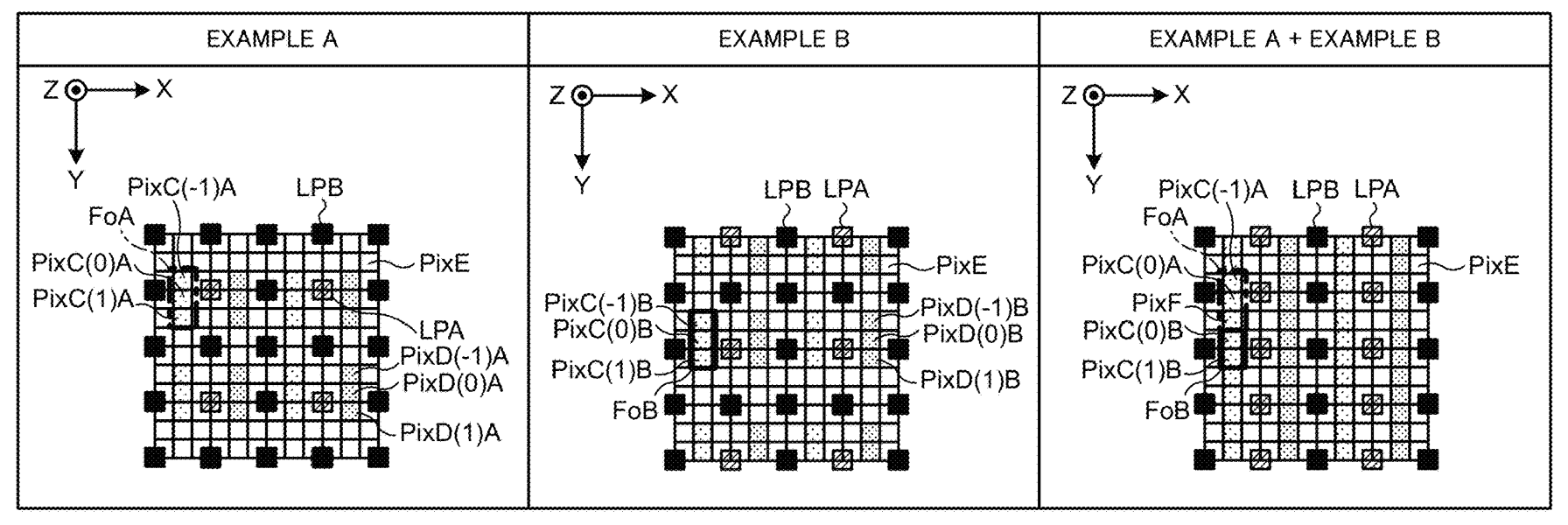

FIG. 33 is an explanatory diagram illustrating the principle of drive control of pixels Pix when the display output control with virtual light emission points set is applied in the operation control of the display panel 20 or 20A in which the light source control to generate columns of turned-on points LPA or rows of turned-on points LPA is applied to the light source 30A.

First, Example A in FIG. 33 will be described below. In Example A, four light emission points LP among 25 light emission points LP disposed in a matrix of rows and columns in the X and Y directions are controlled to be turned-on points LPA. Each of the four turned-on points LPA in Example A faces another turned-on point LPA adjacent in the X or Y direction with one turned-off point LPB interposed therebetween. In Example A, according to the principle described above with reference to FIG. 22, a virtual light emission point VLP($\pm1$) is set and a pixel Pix at a virtual passing point VUP($\pm1$) is subjected to display drive as a first pixel PixC($\pm1$) or a second pixel PixD($\pm1$) based on the positional relation between the virtual light emission point VLP($\pm1$) and a viewpoint.

First pixels PixC(0) A and PixC(0) B illustrated in FIG. 33 are pixels PixU corresponding to the positional relation the position of one turned-on point LPA and one of two viewpoints. First pixels PixC(1)A and PixC(1)B are pixels PixU corresponding to the positional relation between the position of a virtual light emission point VLP($\pm1$) set based on the position of the one turned-on point LPA and the one viewpoint. First pixels PixC(−1)A and PixC(−1)B are pixels PixU corresponding to the positional relation between the position of a virtual light emission point VLP(−1) set based on the position of the one turned-on point LPA and the one viewpoint.

Second pixels PixD(0)A and PixD(0)B are pixels PixU corresponding to the positional relation between the position of one turned-on point LPA and the other of two viewpoints. Second pixels PixD(1)A, A, and PixD(1)B pixels PixU corresponding to the positional relation between the position of a virtual light emission point VLP($\pm1$) set based on the position of the one turned-on point LPA and the other viewpoint. Second pixels PixD(−1)A, A, and PixD(−1)B are pixels PixU corresponding to the positional relation between the position of a virtual light emission point VLP(−1) set based on the position of the one turned-on point LPA and the other viewpoint. Note that (1) can be expressed as (+1).

Example B in FIG. 33 will be described below. In Example B, six light emission points LP among 25 light emission points LP disposed in a matrix of rows and columns in the X and Y directions are controlled to be turned-on points LPA. A light emission point LP controlled to be a turned-on point LPA in Example B and a light emission point LP controlled to be a turned-on point LPA in Example A are included in the same column of light emission points LP but are included in different rows of light emission points LP. In this manner, the disposition of a light emission point LP controlled to be a turned-on point LPA is different between Examples B and A. Thus, the disposition of the first pixels PixC(0)B and PixC($\pm1$)B and the second pixels PixD(0)B and PixD($\pm1$)B in Example B, which is determined in accordance with the position of a turned-on point LPA, is different from the disposition of the first pixels PixC(0)A and PixC($\pm1$)A and the second pixels PixD(0)A and PixD($\pm1$)A in Example A. Except for the above-described matters, Example B is the same as Example A.

Example A+Example B will be described below. In Example A+Example B, 10 light emission points LP among 25 light emission points LP disposed in a matrix of rows and columns in the X and Y directions are controlled to be turned-on points LPA. The turned-on points LPA in Example A+Example B are the combination of the turned-on points LPA in Example A and the turned-on points LPA in Example B.

In a region FoA in Example A, the first pixels PixC (−1)A, PixC(0)A, and PixC(1)A are arranged in this order from one side toward the other side in the Y direction. In a region FoB in Example B, the first pixel PixC(−1)B, PixC(0)B, and PixC(1)B are arranged in this order from one side toward the other side in the Y direction. A turned-on point LPA from which light passing through the region FoA in Example A is emitted and a turned-on point LPA from which light passing through the region FoB in Example B is emitted are adjacent to each other in the Y direction. Accordingly, in Example A+Example B, the other side of the region FoA in the Y direction overlaps the one side of the region FoB in the Y direction. Specifically, the first pixel PixC(1)A included in the region FoA in Example A and the second pixel PixD(−1)B included in the region FoB in Example A overlap each other at the position of a pixel PixF in Example A+Example B.

In this manner, when the display output control with virtual light emission points set, described above with reference to FIG. 22, is applied to each of a plurality of turned-on points LPA included in a column of turned-on points LPA, the positions of pixels Pix as virtual passing points based on adjacent turned-on points LPA, respectively, overlap each other in some cases. Thus, in a case in which such overlapping of virtual passing points occurs, one of the overlapping virtual passing points may be applied in priority whereas the other virtual passing point may be discarded. For example, for the pixel PixF, gradation value control as the first pixel PixC(1)A included in the region FoA in Example A, in other words, sub pixel control may be applied, or gradation value control as the second pixel PixD(−1)B included in the region FoB in Example B may be applied. Which gradation value control is to be applied in priority is desirably determined in advance.

Although the description with reference to FIG. 33 is made on the relation between the regions FoA and FoB, the above-described overlapping of virtual passing points is not limited to the regions FoA and FoB but can occur in a plurality of places when the display output control with virtual light emission points set, described above with reference to FIG. 22, is applied to each of a plurality of turned-on points LPA included in a column of turned-on points LPA. The overlapping is not limited to a column of turned-on points LPA but can occur when the display output control with virtual light emission points set, described above with reference to FIG. 22, is applied to each of a plurality of turned-on points LPA included in a row of turned-on points LPA. When overlapping of virtual passing points occurs for these reasons, one of the overlapping virtual passing points may be applied in priority whereas the other virtual passing point may be discarded by the same principle as described above with reference to FIG. 33.

FIG. 34 is a schematic diagram illustrating an example in which both the control to turn on a larger number of light emission points in a range in which it is possible to maintain a visually recognizable state of an individual image at each of a plurality of viewpoints and the display output control with virtual light emission points set, described above with reference to FIG. 22, are applied. A first pixel PixC(β) illustrated in FIG. 34 and FIG. 38 to be described later is a pixel PixU corresponding to the positional relation between one of two viewpoints and the position of a turned-on point LPA or a virtual light emission point VLP(+1) set based on the position of the turned-on point LPA. A second pixel PixD(β) is a pixel PixU corresponding to the positional relation between the other of two viewpoints and the position of a turned-on point LPA or a virtual light emission point VLP(+1) set based on the position of the turned-on point LPA.

As illustrated in FIG. 34, an individual image can be visually recognized at each of a plurality of viewpoints even when both the control to turn on a larger number of light emission points in a range in which it is possible to maintain a visually recognizable state of an individual image at each of a plurality of viewpoints and the display output control with virtual light emission points set, described above with reference to FIG. 22, are applied.

Excess points of light emission points LP provided at the light source 30A over a minimum number necessary for achieving a visually recognizable state of an individual image at each of a plurality of viewpoints may be used for visual recognition of the same image at a plurality of viewpoints.

Figure 35:
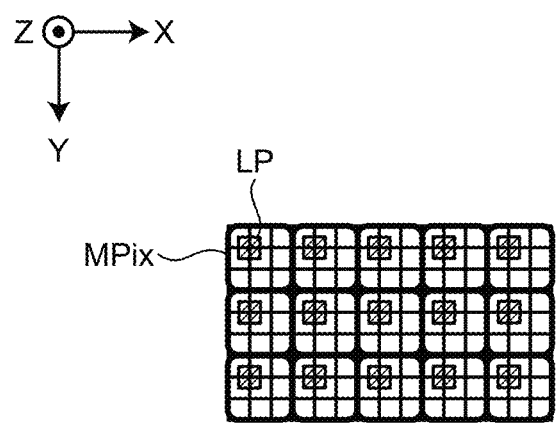
FIG. 35 is a diagram illustrating an exemplary application of display output control that enables visual recognition of the same image at a plurality of viewpoints.

FIG. 35 is a diagram illustrating an exemplary application of display output control that enables visual recognition of the same image at a plurality of viewpoints. A pixel region MPix illustrated in FIG. 35 includes nine (=3×3) pixels Pix of three in the X direction and three in the Y direction. In the display output control illustrated in FIG. 35, 3×3 pixels Pix are regarded as one pixel region MPix, and control of using a light emission point LP as a light source individually provided at each pixel region MPix is applied. In the display output control, pixel signals corresponding to a plurality of pixels included in image data input from the outside are applied in the units of pixel regions MPix. In other words, each pixel region MPix is regarded as a control target corresponding to one pixel signal. Thus, identical pixel signals are applied to a plurality of pixels Pix included in one pixel region MPix. Accordingly, a display device as a combination of the display panel 20 or 20A and the light sources 30A of Example 1+Example 2+Example 3+Example 4 (FIG. 30) can perform not only display output for visual recognition of an individual image at each of a plurality of viewpoints but also display output for visual recognition of the same image at a plurality of viewpoints.

Thus, two-dimensional image display can be performed with this control of pixels and light sources. In this manner, according to the present embodiment, it is possible to switch between three-dimensional image display (displays of different images for respective viewpoints to provide a stereoscopic view of an image through parallax) and two-dimensional image display (display of the same image for any viewpoint) by controlling pixels and light sources. Moreover, it is possible to perform brighter display output that makes the maximum use of light emission capability of the plurality of light emission points LP included in the light source 30A.

In the description so far, the length of each light emission point LP in the X direction and the length of the light emission point LP in the Y direction are not distinguished from each other but may be equal to each other or different from each other.

Figure 36:
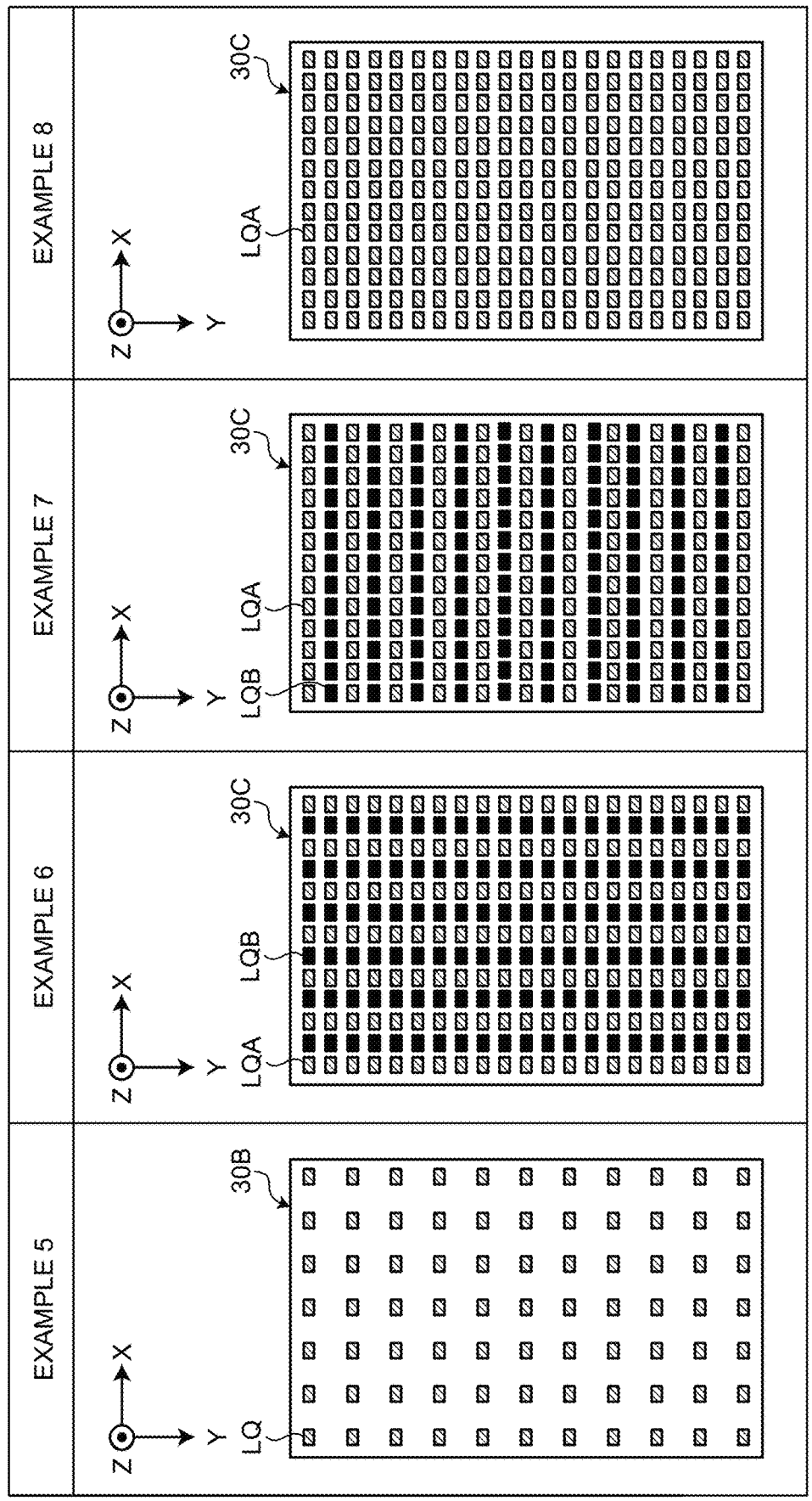
FIG. 36 is a schematic view illustrating an exemplary configuration in which the length of each light emission point in the X direction is different from the length of the light emission point in the Y direction.

FIG. 36 is a schematic view illustrating an exemplary configuration in which the length of each light emission point LP in the X direction and the length of the light emission point LP in the Y direction are different from each other. The light source 30 may be replaced with a light source 30B illustrated in Example 5 in FIG. 36. The light source 30B includes a plurality of light emission points LQ. Each light emission point LQ is the same as the light emission point LP except that the length in the X and Y directions are different from each other. In FIG. 36, the length of each light emission point LQ in the X direction is longer than its length in the Y direction, but the length of each light emission point LQ in the Y direction may be longer than its length in the X direction. The ratio of the disposition (pitch) of the light emission points LQ in the light source 30B illustrated in Example 5 to the pitch of a plurality of pixels Pix is 4n:1 or 6n: 1 in both the X and Y directions, and thus an individual image can be visually recognized at each of a plurality of viewpoints.

In Examples 6, 7, and 8 illustrated in FIG. 36, a light source 30C includes light emission points LQ more densely disposed than in the light source 30B illustrated in Example 5. Turned-on points LQA illustrated in Examples 6, 7, and 8 are light emission points LQ to be turned on. Turned-off points LOB are light emission points LQ not to be turned on. The ratio of the disposition (pitch) of light emission points LQ in Examples 6, 7, and 8 to the pitch of a plurality of pixels Pix is 2n:1 or 3n:1 in both the X and Y directions. In Examples 6 and 7, the relation between the pitch of a plurality of pixels Pix in a predetermined direction and the pitch of a plurality of turned-on points LQA in the predetermined direction that are "turned on when an image is displayed" for visual recognition of an individual image at each of a plurality of viewpoints are 1:4n or 1:6n. Example 6 corresponds to a case in which the predetermined direction is the X direction. Example 7 corresponds to a case in which the predetermined direction is the Y direction. Comparison with FIG. 32 indicates that Example 6 is "Example 1+Example 2" in which light emission points LP are replaced with light emission points LQ. Example 7 is "Example 1+Example 3" in which light emission points LP are replaced with light emission points LQ.

According to the same principle as in the example described above with reference to FIG. 35, a display device including a combination of the display panel 20 or 20A and the light source 30C can perform display output for visual recognition of the same image at a plurality of viewpoints by controlling all light emission points LQ to be turned-on points LQA as in Example 8. Specifically, display equivalent to two-dimensional image display can be performed.

Although FIGS. 28 to 36 illustrate examples in which the ratio of the pitch of provided light emission points to the pitch of light emission points turned on for visual recognition of an individual image at each of a plurality of viewpoints is 1:2, the pitch of provided light emission points is not limited thereto but is changeable as appropriate. However, the pitch of provided light emission points is desirably a natural number times the pitch of light emission points turned on for visual recognition of an individual image at each of a plurality of viewpoints. Specifically, the ratio of the pitch of a plurality of light emission points LP arranged in a predetermined direction (one or both of the X and Y directions) to the pitch of light emission points LP in the predetermined direction that are controlled to be turned-on points LPA when outputting an individual image to each of a plurality of viewpoints is desirably 1:q where q is a natural number of 2 or more.

FIG. 37 is an explanatory diagram for description of an example in which the pitch of light emission points turned on for visual recognition of an individual image at each of a plurality of viewpoints is three times larger than the pitch of provided light emission points. The ratio of the disposition (pitch) of light emission points LP in the light source 30 illustrated in Example 9 in FIG. 37 to the pitch of a plurality of pixels Pix is 4n:1 or 6n:1 in both the X and Y directions, and an individual image can be visually recognized at each of a plurality of viewpoints. In other words, Example 9 is a front view of the light source 30 in the configuration described with reference to FIGS. 1 to 27.

In Examples 10, 11, and 12 illustrated in FIG. 37, a light source 30E includes light emission points LP more densely disposed than in the light source 30 illustrated in Example 9. Turned-on points LSA illustrated in Examples 10, 11, and 12 are light emission points LP to be turned on. Turned-off points LSB are light emission points LP not to be turned on. The ratio of the disposition (pitch) of light emission points LP in Examples 10, 11, and 12 to the pitch of a plurality of pixels Pix is 2n:1 in both the X and Y directions. In Examples 10 and 11, the relation between the pitch of a plurality of pixels Pix in a predetermined direction and the pitch of a plurality of turned-on points LSA in the predetermined direction that are "turned on when an image is displayed" for visual recognition of an individual image at each of a plurality of viewpoints is 1:6n. Example 10 illustrates the light source 30E in a state in which columns of turned-on points LSA are formed by the same principle as in "Example 1+Example 2" in FIG. 32. Example 11 illustrates the light source 30E in a state in which rows of turned-on points LSA are formed by the same principle as in "Example 1+Example 3" in FIG. 32.

According to the same principle as in the example described above with reference to FIG. 35, a display device including a combination of the display panel 20 or 20A and the light source 30E can perform display output for visual recognition of the same image at a plurality of viewpoints by controlling all light emission points LP included in the light source 30E to be turned-on points LSA as in Example 12. Specifically, display equivalent to two-dimensional image display can be performed.

The above description with reference to FIGS. 31 to 34, 36, and 37 is made on a case in which control is applied to form "columns of turned-on light emission points" or "rows of turned-on light emission points" for visual recognition of an individual image at each of a plurality of viewpoints. When the relative angle rot is an angle at which an individual image can be visually recognized at each of a plurality of viewpoints whichever "columns of turned-on light emission points" or "rows of turned-on light emission points" are employed, the control aspect of light emission points necessary for visual recognition of an individual image at each of a plurality of viewpoints with the relative angle rot before reaching the angle may be maintained. Light source control employed in such a case is referred to as hysteresis control.

FIG. 38 is a schematic view illustrating an exemplary application of the hysteresis control. For example, when the relative angle is 45+σ degrees (°) (and 225+σ degrees)(°), display output for visual recognition of an individual image at each of a plurality of viewpoints is possible by any of light from rows of light emission points LP and light from columns of light emission points LP. In the embodiment, σ is 15 but not limited to this specific value and is changeable as appropriate depending on the specific design of a display device and an aspect corresponding to the design. Consider a case in which, when performing display output for visual recognition of an individual image at each of a plurality of viewpoints, a larger number of light emission points are turned on in a range in which it is possible to maintain a visually recognizable state of an individual image at each of a plurality of viewpoints. In this case, in the range of 0±(45−σ) degrees (°) (and 180±(45−σ) degrees)(°), light from columns of light emission points LP can be employed but light from rows of light emission points LP cannot be employed. In addition, in the range of 90±(45−σ) degrees (°) (and 270±(45−σ) degrees)(°), light from rows of light emission points LP can be employed but light from columns of light emission points LP cannot be employed.

In determination of whether to set the light emission pattern of light emission points LP to a pattern of columns of light emission points LP or a pattern of rows of light emission points LP, the light emission pattern of light emission points LP may be unchanged except for cases that cannot be applied without changing the light emission pattern of light emission points LP. In the example illustrated in FIG. 38, when the relative angle rot is 0 degrees (°), such a light emission pattern of light emission points LP is employed that columns of light emission points LP are formed with the arrangement of light emission points LP from which light is emitted. When the relative angle rot is 90 degrees (°), such a light emission pattern of light emission points LP is employed that rows of light emission points LP are formed with the arrangement of light emission points LP from which light is emitted. However, when the relative angle rot is 45 degrees (°), the arrangement of light emission points LP from which light is emitted may form rows of light emission points LP or columns of light emission points LP. Thus, when transition from a state in which the relative angle rot is 0 degrees (°) to a state in which the relative angle rot is 45 degrees (°) occurs, the pattern of columns of light emission points LP are maintained through the transition. However, when further transition to a state in which the relative angle rot is 90 degrees (°) occurs thereafter, the light emission pattern of light emission points LP changes from the pattern of columns of light emission points LP to a pattern of rows of light emission points LP. When transition from the state in which the relative angle rot is 90 degrees (°) to the state in which the relative angle rot is 45 degrees (°) occurs, the pattern of rows of light emission points LP are maintained through the transition. However, when further transition to a state in which the relative angle rot is 0 degrees (°) occurs thereafter, the light emission pattern of light emission points LP changes from the pattern of rows of light emission points LP to the pattern of columns of light emission points LP.

As described above, in the embodiment, a plurality of light emission points LP are arranged in a matrix of rows and columns in the X direction and the Y direction orthogonal to the X direction; in a case in which the ratio of the pitch of a plurality of pixels Pix arranged in the X direction to the pitch of light emission points LP in the X direction controlled to be turned-on points LPA when outputting an individual image to each of a plurality of viewpoints is 1:4n or 1:6n, the turned-on points LPA form columns that are each continuous in the Y direction; and in a case in which the ratio of the pitch of a plurality of pixels Pix arranged in the Y direction to the pitch of light emission points LP in the Y direction controlled to be turned-on points LPA when outputting an individual image to each of a plurality of viewpoints is 1:4n or 1:6n, the turned-on points LPA form rows that are each continuous in the X direction. Whether the turned-on points LPA form the columns or the rows when outputting an individual image to each of a plurality of viewpoints depends on the relative angle rot. However, when the relative angle rot becomes an angle included in a partial angle range in which an individual image can be output to each of a plurality of viewpoints from any of the columns and the rows, the light emission pattern of the columns or the rows applied to light emission points LP before the relative angle rot reaches the concerned angle is maintained.

Columns of light emission points LP to be turned on may be switched between different frame images in a case where an excess number of light emission points LP over a minimum number of light emission points LP necessary for visual recognition of an individual image at each of a plurality of viewpoints are disposed in both the X and Y directions as in the light sources 30A, 30C, and 30E according to the embodiment. For example, in a case where the relative angle rot changes but the light emission pattern of light emission points LP does not change from the pattern of columns of light emission points LP (or rows of light emission points LP) through the change of the relative angle rot, the positions of light emission points LP to be turned on may be changed before and after the change of the relative angle rot. As a more specific example, one of "Example 1+Example 2" and "Example 3+Example 4" in FIG. 32 may be applied before the change and the other may be applied after the change. Such control that "changes the positions of light emission points LP to be turned on" without changing "the light emission pattern of light emission points LP" may be performed on a predetermined cycle (for example, for each set of a predetermined number of frames; the predetermined number is a natural number of one or more), may be performed at each reactivation of the display device, or may be performed at each elapse of a constant time during operation of the display device.

According to the embodiment, the display device 1 includes a liquid crystal display panel (for example, the display panel 20 or the display panel 20A) provided with a plurality of pixels (for example, pixels Pix), a light source (for example, the light source 30) provided with a plurality of light emission points (light emission points LP) and configured to emit light to the plurality of pixels of the liquid crystal display panel, an acquirer (for example, the image capturer 2, the distance measurer 3, the gyro sensor 4, and the sight line following circuit 11) configured to acquire viewpoint information of a user viewing the liquid crystal display panel, and a controller (for example, the image output circuit 12) configured to control image display through operation of the plurality of pixels based on the viewpoint information. The viewpoint information includes information (for example, pos_x, pos_y, and pos_h) related to the positions of a plurality of viewpoints (for example, the first viewpoint E1 and the second viewpoint E2, and the first viewpoint EC and the second viewpoint ED) and information (for example, the relative angle rot) indicating the arrangement direction of the plurality of viewpoints. The controller performs light transmission through display drive of at least some or all of pixels (pixels Pix enclosing a passing point UP) positioned on straight lines connecting the light emission points to the viewpoints based on an angle (for example, the relative angle rot) between a predetermined direction (for example, the X or Y direction) of the liquid crystal display panel and the arrangement direction and the positional relation between the viewpoints and the light emission points. The plurality of light emission points are individually switchable between a turned-on state and a turned-off state. The ratio of the pitch of the plurality of pixels arranged in the predetermined direction to the pitch of light emission points (for example, turned-on points LPA) in the predetermined direction controlled to be turned on when outputting an individual image to each of the plurality of viewpoints is 1:4n or 1:6n. The number n is a natural number. The pitch of the plurality of light emission points (for example, light emission points LP) arranged in the predetermined direction is smaller than the pitch of light emission points (for example, turned-on points LPA) in the predetermined direction controlled to be turned on when outputting an individual image to each of a plurality of viewpoints.

With this configuration, display of the plurality of pixels can be performed in accordance with the angle between the predetermined direction of the liquid crystal display panel and the arrangement direction and the positional relation between each viewpoint and each light emission point. Display output of individual images to the plurality of viewpoints can be achieved even when the angle is not zero, in other words, when the arrangement direction of the plurality of viewpoints (two viewpoints of the right eye and the left eye) of the user does not correspond to the lateral direction of the liquid crystal display panel (for example, the X direction) assumed in advance. Thus, according to the embodiment, it is possible to more flexibly adapt to the relation between the arrangement direction of the plurality of viewpoints and the display device.

Since the ratio of the pitch of a plurality of light emission points (for example, light emission points LP) arranged in a predetermined direction (for example, the X or Y direction) to the pitch of light emission points (for example, turned-on points LPA) in the predetermined direction controlled to be turned on when outputting an individual image to each of a plurality of viewpoints (for example, the first viewpoint E1 and the second viewpoint E2, and the first viewpoint EC and the second viewpoint ED) is 1:q and q is a natural number, the ratio of the pitch of a plurality of pixels arranged in the predetermined direction to the pitch of light emission points (for example, turned-on points LPA) in the predetermined direction controlled to be turned on when outputting an individual image to each of the plurality of viewpoints can be more reliably set to 1:4n or 1:6n. Thus, it is possible to more reliably achieve display output of an individual image to each of the plurality of viewpoints.

The plurality of light emission points (light emission points LP) are arranged in a matrix of rows and columns in a first direction (for example, the X direction) and a second direction (for example, the Y direction) orthogonal to the first direction. Light emission points controlled to be turned on form columns that are each continuous in the second direction in a case where the ratio of the pitch of the plurality of pixels (for example, pixels Pix) arranged in a predetermined direction (for example, the X direction) to the pitch of light emission points (for example, turned-on points LPA) in the first direction controlled to be turned on when outputting an individual image to each of the plurality of viewpoints (for example, the first viewpoint E1 and the second viewpoint E2, and the first viewpoint EC and the second viewpoint ED) is 1:4n or 1:6n. Light emission points controlled to be turned on form rows that are each continuous in the first direction in a case where the ratio of the pitch of a plurality of pixels arranged in a direction (for example, the Y direction) different from the predetermined direction to the pitch of light emission points in the second direction controlled to be turned on when outputting an individual image to each of the plurality of viewpoints is 1:4n or 1:6n. Thus, it is possible to achieve brighter display output of an individual image to each of the plurality of viewpoints.

Whether light emission points (for example, turned-on points LPA) controlled to be turned on when outputting an individual image to each of the plurality of viewpoints (for example, the first viewpoint E1 and the second viewpoint E2, and the first viewpoint EC and the second viewpoint ED) form columns or rows depends on a relative rotation angle (for example, the relative angle rot). Thus, it is possible to more reliably achieve display output of an individual image to each of the plurality of viewpoints.

When the relative rotation angle (for example, the relative angle rot) becomes an angle included in a partial angle range in which an individual image can be output to each of a plurality of viewpoints in any of the columns and the rows of light emission points (for example, turned-on points LPA) controlled to be turned on, a lighting pattern of the columns or the rows applied to the light emission points before the relative rotation angle reaches the concerned angle is maintained. Thus, it is possible to further reduce the number of times that control of light emission points is switched. Thus, display output is more likely to be stabilized.

Moreover, the controller (for example, the image output circuit 12) performs, based on the positional relation between each viewpoint and a plurality of virtual light emission points (virtual light emission points VLP(±k)) arranged on a virtual straight line to one light emission point, display drive of pixels (for example, pixels Pix) positioned (at virtual passing points VUP(±k)) on the virtual straight line connecting the virtual light emission points and the viewpoint. The virtual straight line is a straight line extending along an image display surface of the liquid crystal display panel, orthogonal to the arrangement direction (reference line CLX) of the plurality of viewpoints, and passing through the one light emission point (light emission point LP). Thus, it is possible to more flexibly adapt to not only a viewpoint of the user but also the tilt of the viewpoint.

Moreover, the acquirer includes an image capturer (for example, the image capturer 2) configured to capture an image of the user, and a processor (for example, the sight line following circuit 11) configured to determine the arrangement direction of the right and left eyes of the user, the relative rotation angle between the liquid crystal display panel and the arrangement direction, and the positional relation between the right and left eyes based on the captured image of the user. Thus, viewpoint information of the user can be acquired from the captured image of the user.

Moreover, the acquirer includes a distance measurer (for example, the distance measurer 3) configured to measure the distance between the liquid crystal display panel (for example, the display panel 20 or the display panel 20A) and the user. Thus, the distance between the liquid crystal panel and the user can be included in the viewpoint information of the user. Thus, it is possible to perform display output more highly accurately adapted to the position of a viewpoint.

Moreover, each pixel (for example, a pixel Pix) may include a plurality of sub pixels, and the controller (for example, the image output circuit 12) may perform display drive of some or all of sub pixels positioned on the straight lines connecting the light emission points and the viewpoints and other sub pixels adjacent to the sub pixels on the straight lines. Thus, it is possible to achieve display output adapted to the position on a sub pixel basis. Thus, it is possible to more finely perform display output adapted to the position of a viewpoint than in the case where it is performed on a pixel basis.

Moreover, the controller (for example, the image output circuit 12) may cause, among sub pixels included in a pixel adjacent to a pixel including a sub pixel at a position (position of the passing point UP) intersecting with an optical axis between the viewpoint and the light emission point, a sub pixel disposed closer to an intersection with the optical axis between the viewpoint and the light emission point to transmit light therethrough. Thus, it is possible to perform display output more highly accurately adapted to the position.

Moreover, each pixel (for example, a pixel Pix) includes a plurality of sub pixels, and the controller performs display drive of some of sub pixels positioned (at virtual passing points VUP (+k)) on a virtual straight line connecting the virtual light emission point and the viewpoint and other sub pixels adjacent to the sub pixels on the virtual straight line. Thus, it is possible to more finely perform display output more flexibly adapted to a viewpoint and a sight line on a sub pixel basis.

Moreover, the controller (for example, the image output circuit 12) causes, among sub pixels included in a pixel adjacent to a pixel including a sub pixel at a position (virtual passing point VUP (+k)) intersecting an optical axis between the viewpoint and the virtual light emission point (virtual light emission point VLP(±k)), a sub pixel disposed closer to an intersection with the optical axis between the viewpoint and the virtual light emission point to transmit light therethrough. Thus, it is possible to perform display output more highly accurately adapted to the position.

Moreover, the controller (for example, the image output circuit 12) changes pixels to be subjected to display drive (for example, pixels Pix) in accordance with the arrangement direction of the liquid crystal display panel (for example, the display panel 20 or the display panel 20A) and the right and left eyes of the user, which is obtained by the processor (for example, the sight line following circuit 11). As a result of "change", for example, here means that display will be different between a case in which the relative angle rot is 45 degrees (°) and a case in which the relative angle rot is an angle (for example, 90 degrees)(°) different from 45°.

Moreover, the controller (for example, the image output circuit 12) increases the number of pixels to be subjected to display drive (for example, pixels Pix) in accordance with the arrangement direction of the liquid crystal display panel (for example, the display panel 20 or the display panel 20A) and the right and left eyes of the user, which is obtained by the processor (for example, the sight line following circuit 11). Here, "increase" is to, for example, drive pixels (for example, pixels Pix) positioned (at virtual passing points VUP (±k)) on virtual straight lines connecting the virtual light emission points and the viewpoints based on the positional relation between the viewpoints and the virtual light emission points (virtual light emission points VLP (±k)).

The drawings referred to in the above-described description specially illustrate examples in which the relative angle rot is 0 degrees (°), 45 degrees (°), and 90 degrees (°), but the relative angle rot is not limited to these angles and may be any angle in the range of −180 degrees (°) to 180 degrees (°) in accordance with the relation between the display panel 20A and the face HF.

The description with reference to FIGS. 8 to 26 is performed for an example in which the correspondence relation between the pitch of a plurality of pixels Pix and the pitch of a plurality of light emission points LP is 1:6, but the various kinds of control described above with reference to FIGS. 8 to 26 are also applicable to a case in which the correspondence relation is 1:4 as illustrated in FIGS. 3 and 27. Alternatively, the correspondence relation may be 1:6α or 1:4α. The number a is a natural number. Moreover, the center position of each light emission point LP is not limited to a position between two pixels Pix adjacent to each other at the planar viewpoint. For example, the center position of the light emission point LP may overlap the center position of a pixel Pix or may have any other positional relation therewith.

The form and number of sub pixels provided at each pixel Pix are not limited to those described above with reference to FIG. 16 and other diagrams. The number of sub pixels provided in each pixel Pix may be two or less, or may be four or more. An arrangement of sub pixels provided in each pixel Pix is not limited to the arrangement in the X direction and may be the arrangement in the Y direction or may be in a matrix. The shape of each sub pixel at the planar viewpoint is not limited to a rectangular shape and may be an arbitrary shape.

It should be understood that the present disclosure provides any other effects achieved by aspects described above in the present embodiment, such as effects that are clear from the description of the present specification or effects that could be thought of by the skilled person in the art as appropriate.

What is claimed is:

1. A display device comprising:
   a liquid crystal display panel provided with a plurality of pixels;
   a light source provided with a plurality of light emission points and configured to emit light to the plurality of pixels;
   an acquirer configured to acquire viewpoint information of a user viewing the liquid crystal display panel; and
   a controller configured to control image display on a basis of the viewpoint information,
   wherein
   the light source has a surface light source with a light emission surface that emits light, and a light-shielding member covering the light emission surface that emits light,
   the light-shielding member has holes through which light from the light source passes, each of the holes corresponding to a respective one of the light emission points,
   the viewpoint information includes information related to positions of a plurality of viewpoints and information indicating an arrangement direction of the plurality of viewpoints,
   the controller is configured to perform display drive of some or all of pixels positioned on straight lines each connecting a corresponding one of the light emission points to a corresponding one of the viewpoints on a basis of a relative rotation angle between the liquid crystal display panel and the arrangement direction and a relative positional relation between the viewpoints and the light emission points, the some or all of pixels included in the plurality of pixels,
   the plurality of light emission points are individually switchable between a turned-on state and a turned-off state, and
   a first pitch of the plurality of light emission points arranged in a predetermined direction is smaller than a second pitch of some of the light emission points in the predetermined direction, the some of the light emission points controlled to be turned on when outputting an individual image to each of the plurality of viewpoints.

2. The display device according to claim 1, wherein the ratio of the first pitch to the second pitch is 1:q, where q is a natural number equal to 2 or greater.

3. The display device according to claim 2, wherein the plurality of light emission points are arranged in a matrix of rows and columns in a first direction and a second direction orthogonal to the first direction,
   light emission points controlled to be turned on form columns that are each continuous in the second direction in a case in which the ratio of the pitch of the plurality of pixels arranged in the predetermined direction to the pitch of light emission points in the first direction controlled to be turned on when outputting an individual image to each of the plurality of viewpoints is 1:4n or 1:6n and n is a natural number, and
   light emission points controlled to be turned on form rows that are each continuous in the first direction in a case in which the ratio of the pitch of the plurality of pixels arranged in the predetermined direction to the pitch of light emission points in the second direction controlled to be turned on when outputting an individual image to each of the plurality of viewpoints is 1:4n or 1:6n and n is a natural number.

4. The display device according to claim 3, wherein whether light emission points controlled to be turned on form the columns or the rows when outputting an individual image to each of the plurality of viewpoints, depends on the relative rotation angle.

5. The display device according to claim 4, wherein when the relative rotation angle becomes an angle included in a partial angle range in which an individual image is able to be output to each of a plurality of viewpoints in any of the columns and the rows, a lighting pattern of the columns or the rows applied to the light emission points before the relative rotation angle reaches the concerned angle is maintained.

6. The display device according to claim 2, wherein the controller sets one or more virtual light emission points arranged on a virtual straight line to one light emission point and performs display drive of some or all of pixels positioned on the virtual straight line connecting the one or more virtual light emission points and the viewpoint, and
   the virtual straight line is a straight line extending along an image display surface of the liquid crystal display panel, orthogonal to the arrangement direction, and passing through the one light emission point.

7. The display device according to claim 2, wherein the acquirer includes
   an image capturer configured to capture an image of the user, and a processor configured to determine the arrangement direction, the relative rotation angle, and the positional relation of right and left eyes of the user based on the captured image of the user.

8. The display device according to claim 7, wherein the acquirer includes a distance measurer configured to measure a distance between the liquid crystal display panel and the user.

9. The display device according to claim 1, wherein
the plurality of light emission points are arranged in a matrix of rows and columns in a first direction and a second direction orthogonal to the first direction,
light emission points controlled to be turned on form columns that are each continuous in the second direction in a case in which the ratio of the pitch of the plurality of pixels arranged in the predetermined direction to the pitch of light emission points in the first direction controlled to be turned on when outputting an individual image to each of the plurality of viewpoints is 1:4n or 1:6n and n is a natural number, and
light emission points controlled to be turned on form rows that are each continuous in the first direction in a case in which the ratio of the pitch of the plurality of pixels arranged in the predetermined direction to the pitch of light emission points in the second direction controlled to be turned on when outputting an individual image to each of the plurality of viewpoints is 1:4n or 1:6n and n is a natural number.

10. The display device according to claim 9, wherein whether light emission points controlled to be turned on form the columns or the rows when outputting an individual image to each of the plurality of viewpoints, depends on the relative rotation angle.

11. The display device according to claim 10, wherein when the relative rotation angle becomes an angle included in a partial angle range in which an individual image is able to be output to each of a plurality of viewpoints in any of the columns and the rows, a lighting pattern of the columns or the rows applied to the light emission points before the relative rotation angle reaches the concerned angle is maintained.

12. The display device according to claim 1, wherein
the controller sets one or more virtual light emission points arranged on a virtual straight line to one light emission point and performs display drive of some or all of pixels positioned on the virtual straight line connecting the one or more virtual light emission points and the viewpoint, and
the virtual straight line is a straight line extending along an image display surface of the liquid crystal display panel, orthogonal to the arrangement direction, and passing through the one light emission point.

13. The display device according to claim 1, wherein the acquirer includes
an image capturer configured to capture an image of the user, and
a processor configured to determine the arrangement direction, the relative rotation angle, and the positional relation of right and left eyes of the user based on the captured image of the user.

14. The display device according to claim 13, wherein the acquirer includes a distance measurer configured to measure a distance between the liquid crystal display panel and the user.

* * * * *